(12) United States Patent
Inoue et al.

(10) Patent No.: US 6,465,548 B1
(45) Date of Patent: Oct. 15, 2002

(54) STABILIZER FOR ORGANIC POLYMER MATERIAL AND ORGANIC POLYMER MATERIAL COMPOSITION

(75) Inventors: Takeshi Inoue, Chikujo-gun; Shoichi Horie, Mie-gun, both of (JP)

(73) Assignee: Yoshitomi Fine Chemicals, Ltd., Osaka (JP)

( * ) Notice: Subject to any disclaimer, the term of this patent is extended or adjusted under 35 U.S.C. 154(b) by 0 days.

(21) Appl. No.: 09/549,495

(22) Filed: Apr. 14, 2000

Related U.S. Application Data

(63) Continuation-in-part of application No. 09/509,895, filed on Apr. 3, 2000, and a continuation-in-part of application No. PCT/JP99/01999, filed on Apr. 14, 1999, and a continuation-in-part of application No. PCT/JP98/05829, filed on Dec. 21, 1998, and a continuation-in-part of application No. PCT/JP98/04462, filed on Oct. 2, 1998.

(30) Foreign Application Priority Data

| Oct. 2, 1997 | (JP) | 9-269735 |
|---|---|---|
| Apr. 17, 1998 | (JP) | 10-108260 |
| Jun. 26, 1998 | (JP) | 10-181174 |
| Sep. 10, 1999 | (JP) | 11-258012 |
| Mar. 14, 2000 | (JP) | 2000-070793 |
| Mar. 31, 2000 | (JP) | 2000-099052 |

(51) Int. Cl.[7] .............................. C08K 5/15; C08K 5/52
(52) U.S. Cl. .......... 524/110; 252/389.23; 252/389.29; 524/119; 524/120; 524/141; 524/153; 524/291
(58) Field of Search ................. 524/110, 119, 524/120, 141, 153; 252/389.23, 389.24, 291

(56) References Cited

U.S. PATENT DOCUMENTS

| 4,806,580 A | 2/1989 | Bock et al. ................. 524/110 |
|---|---|---|
| 5,807,504 A | 9/1998 | Krockenberger et al. |

FOREIGN PATENT DOCUMENTS

| GB | 2 215 727 | 9/1989 |
|---|---|---|
| JP | 53-78248 | 7/1978 |
| JP | 53-114852 | 10/1978 |
| JP | 54-20056 | 2/1979 |
| JP | 54-55043 | 5/1979 |
| JP | 62-86036 | 4/1987 |
| JP | 62-158737 | 7/1987 |
| JP | 63-105060 | 5/1988 |
| JP | 63-137041 | 6/1988 |
| JP | 63-137941 | 6/1988 |
| JP | 2-225542 | 9/1990 |
| WO | 96/17886 | 6/1996 |
| WO | 97/00285 | 1/1997 |
| WO | WO 7/49758 | * 12/1997 |
| WO | 97/49758 | 12/1997 |

OTHER PUBLICATIONS

Patent Abstract of Japan, vol. 011, No. 398, Dec. 25, 1987 & JP 62 158737 A, Jul. 14, 1987 * Abstract *.
Patent Abstract of Japan, vol. 003, No. 079, Jul. 6, 1979 & JP 54 055043 A, May 1, 1979 * Abstract *.

* cited by examiner

*Primary Examiner*—Kriellion A. Sanders
(74) *Attorney, Agent, or Firm*—Wenderoth, Lind & Ponack, L.L.P.

(57) ABSTRACT

The present invention relates to a stabilizer composition for organic polymer material containing (a) 6-hydroxychroman compound, a phosphorus antioxidant and (c) phenolic antioxidant, wherein the component (a) is contained in a proportion of 0.5 wt %–10 wt % and the total amount of the component (b) and the component (c) is in a proportion of 99.5 wt %–90 wt %, of the total amount of the components (a), (b) and (c). The present invention also relates to an organic polymer material composition containing an organic polymer and the above-mentioned stabilizer composition for organic polymer material. The use of the stabilizer composition of the present invention as a stabilizer for organic polymer materials affords an industrially extremely useful stabilized organic polymer material composition superior in heat stability during processing.

45 Claims, No Drawings

STABILIZER FOR ORGANIC POLYMER MATERIAL AND ORGANIC POLYMER MATERIAL COMPOSITION

This application is a continuation-in-part of PCT/JP98/04462 filed Oct. 2, 1998, PCT/JP98/05829 filed Dec. 21, 1998 and PCT/JP99/01999 filed Apr. 14, 1999 and furthermore is a continuation-in-part of U.S. application Ser. No. 09/509,895 filed Apr. 3, 2000.

TECHNICAL FIELD

The present invention relates to a stabilized organic polymer material composition wherein the organic polymer material susceptible to degradation due to oxidation, heat or light has become hardly degraded in qualities, such as physical properties, appearance and the like, even after thermal hysteresis during processing and in use. The present invention also relates to a stabilizer composition for organic polymer material, which is an additive used for obtaining a stabilized organic polymer material composition.

BACKGROUND ART

An organic polymer material comprising organic compounds, such as natural polymer, synthetic polymer, fats and oils, lubricant oil, working oil and the like, is susceptible to degradation by oxidation, heat, light and the like, and loses utility. Therefore, various stabilizers called antioxidants are added to organic polymer materials to give organic polymer material compositions that are not easily degraded.

A compound of the formula

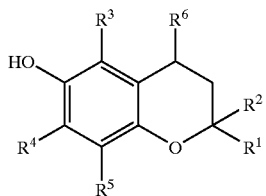

wherein $R^1$ is alkyl having 1 to 18 carbon atoms or alkenyl having 2 to 18 carbon atoms, $R^2$ is alkyl having 1 to 5 carbon atoms, $R^3$, $R^4$ and $R^5$ are the same or different and each is hydrogen atom or alkyl having 1 to 4 carbon atoms, and $R^6$ is hydrogen atom or alkyl having 1 to 5 carbon atoms, is widely known as an antioxidant for fats and oils and polyolefin.

For example, compounds of the formula (1), wherein $R^1$ and $R^2$ are both methyl, are disclosed in JP-B-42-11064, U.S. Pat. No. 3,476,772, Chemical Abstracts, vol. 70, 2500, ibid., vol. 50, 15104 and ibid., vol. 72, 13900, German Patent No. 114916 and JP-A-49-72338, as antioxidants. However, since marked coloring of organic polymer materials containing these 6-hydroxychroman compounds has not been overcome, these 6-hydroxychroman compounds have not been widely used as antioxidants.

Meanwhile, vitamin E (tocopherol), wherein $R^1$ is alkyl having 16 carbon atoms and $R^2$ is methyl, is a natural substance and is widely used for the prevention of oxidation of foodstuffs.

In 1940s, a phosphorus compound was studied as an antioxidant and some phosphorus antioxidants have since been used in an extremely broad range.

For example, JP-A-1-254744 discloses tetrakis(2,4-di-tert-butylphenyl)-4,4'-biphenylenediphosphonite.

JP-A-5-178870 discloses tetrakis(2,4-di-tert-butyl-5-methylphenyl)-4,4'-biphenylenediphosphonite and a composition containing this compound.

JP-A-8-231568 discloses (2,4-di-tert-butylphenoxy)bis[4'-[bis(2,4-di-tert-butylphenoxy)phosphino]biphenyl-4-yl]phosphine, (2,4-di-tert-butyl-5-methylphenoxy)bis[4'-[bis(2,4-di-tert-butyl-5-methylphenoxy)phosphino]biphenyl-4-yl]phosphine and the like and the compositions containing these compounds.

JP-A-9-238490 discloses 2,4-di-tert-butylphenyl(biphenyl-4-yl)[4'-bis(2,4-di-tert-butylphenoxy)phosphanylbiphenyl-4-yl]phosphinite, 2,4-di-tert-butyl-5-methylphenyl(biphenyl-4-yl)[4'-bis(2,4-di-tert-butyl-5-methylphenoxy)phosphanylbiphenyl-4-yl]phosphinite and the like and the compositions containing these compounds.

The above-mentioned publications teach that these compounds and the compositions containing these compounds are effective stabilizers for organic polymer materials.

Besides these, aryl phosphite compounds such as tris(2,4-di-tert-butylphenyl)phosphite, bis(2,4-di-tert-butyl-6-methylphenyl)ethyl phosphite, triphenyl phosphite, diphenyl alkyl phosphite, phenyl dialkyl phosphite, tris(nonylphenyl)phosphite, trilauryl phosphite, trioctadecyl phosphite, bis(2,4-di-tert-butyl-6-methylphenyl) methyl phosphite and the like have been used as antioxidants.

In addition, pentaerythritol phosphite compounds such as bis(2,4-di-tert-butylphenyl) pentaerythritol diphosphite, bis(2,6-di-tert-butyl-4-methylphenyl) pentaerythritol diphosphite, distearyl pentaerythritol diphosphite, bis(2,4-di(1-phenyl-1,1-dimethylmethyl)phenyl) pentaerythritol diphosphite, (2,4,6-tri-tert-butylphenyl)-2-butyl-2-ethyl-1,3-propanediol phosphite, bisisodecyloxy pentaerythritol diphosphite, bis(2,4,6-tri-tert-butylphenyl)pentaerythritol diphosphite and the like have been used as antioxidants.

Moreover, bisarylalkyl phosphite (oxaphosphocin) compounds such as 2,2-methylenebis(4,6-di-tert-butylphenyl) 2-ethylhexyl phosphite, 6-fluoro-2,4,8,10-tetra-tert-butyl-12-methyl-dibenzo[d,g]-1,3,2-dioxaphosphocin, 2,2',2"-nitrilo[triethyltris(3,3',5,5'-tetra-tert-butyl-1,1'-biphenyl-2,2'-diyl)phosphite] and the like have been used as phosphorus antioxidants.

In 1930s, a phenolic compound was studied as an antioxidant and some phenolic antioxidants have since been used in an extremely broad range.

For example, generally used phenolic antioxidants are exemplified by n-octadecyl 3-(3,5-di-tert-butyl-4-hydroxyphenyl)propionate, tetrakis[3-(3,5-di-tert-butyl-4-hydroxyphenyl)propionyloxymethyl]methane, 1,3,5-tris(3,5-di-tert-butyl-4-hydroxybenzyl) isocyanurate, and 1,3,5-trimethyl-2,4,6-tris(3,5-di-tert-butyl-4-hydroxybenzyl)benzene and the like.

In addition, plural kinds of antioxidants have been widely used in combination to allow simultaneous expression of different effects or synergistic effect.

For example, JP-A-53-78248 teaches a method for preventing yellowing by the use of a polyolefin composition containing a 6-hydroxychroman compound and a phenolic antioxidant, such as 2,6-di-tert-butyl-4-methylphenol and tetrakis[3-(3,5-di-tert-butyl-4-hydroxyphenyl)propionyloxymethyl]methane. In this specification, 0.005–0.5 part by weight, preferably 0.01–0.2 part by weight, of a 6-hydroxychroman compound, and 0.005–1 part by weight, preferably 0.01–0.5 part by weight, of a phenolic antioxidant are added to 100 parts by weight of a resin.

JP-A-54-20056 discloses a thermoplastic polymer having an improved heat stability, which contains a 6-hydroxychroman compound. It is taught that a 6-hydroxychroman compound is added in a proportion of 0.005–0.2 part by weight, preferably 0.01–0.1 part by weight, per 100 parts by weight of a resin. When the content is less than 0.005 part by weight, the heat stabilizing effect is taught to be little.

JP-A-53-114852 teaches that a polyolefin having superior stability can be obtained by adding a 6-hydroxychroman compound and a phenolic antioxidant (e.g., 2,6-di-tert-butyl-4-methylphenol, 2,2-methylenebis(4-ethyl-6-tert-butyl)phenol and the like). This publication teaches the addition of 0.005–0.5 part by weight, preferably 0.01–0.2 part by weight, of a 6-hydroxychroman compound and 0.01–5 parts by weight, preferably 0.05–1.0 part by weight, of a phenolic antioxidant to 100 parts by weight of a resin.

Since a phenolic antioxidant and a phosphorus antioxidant show different actions, a combined use of these has been proposed. A phosphorus compound is used as a secondary antioxidant and a hindered phenol compound is used as a primary antioxidant during the processing of a synthetic resin, thereby to improve coloring of an organic polymer material.

For example, JP-B-4-69657 discloses a polyolefin composition containing a 6-hydroxychroman compound and tetrakis(2,4-di-tert-butylphenyl)-4,4'-biphenylenediphosphite, both in a proportion of 0.01–1 wt%.

JP-A-63-137941 discloses a composition containing vitamin E (0.005–0.5 part by weight, preferably 0.03–0.3 part by weight) and tetrakis(2,4-di-tert-butylphenyl)-4,4'-biphenylenediphosphite (0.005–0.5 part by weight, preferably 0.03–0.3 part by weight) per 100 parts by weight of a resin, as a polyolefin composition superior in heat stability and hue. It also teaches that a vitamin E content of less than 0.005 part by weight per 100 parts by weight of a resin results in improved hue but insufficient heat stabilizing effect during forming processing.

JP-A-62-86036 teaches that addition of a 6-hydroxychroman compound (0.005–0.5 part by weight, preferably 0.01–0.2 part by weight) and a phosphorus antioxidant of distearyl pentaerythritol phosphite or tris(2,4-di-tert-butylphenyl) phosphite (0.01–0.5 part by weight, preferably 0.02–0.3 part by weight) to 100 parts by weight of a resin results in improved stability of polyolefin, improved coloring property and a black spot problem. It also teaches that a phenolic antioxidant can be added.

JP-A-2-225542 teaches a polyolefin composition stabilized by the addition of a 6-hydroxychroman compound (0.01–1 part by weight, preferably 0.05–0.5 part by weight) and a phosphorus antioxidant of a specific phosphite compound (0.01–1 part by weight) to 100 parts by weight of a resin. It also teaches that, when a 6-hydroxychroman compound is added in a proportion of less than 0.01 part by weight relative to 100 parts by weight of a resin, the stability during processing cannot be improved sufficiently.

The technique disclosed in these publications aims at solving the problem of coloring of a resin, ignoring the superiority of a 6-hydroxychroman compound inclusive of vitamin E as an antioxidant or stabilizer during processing, and adds the smallest possible amount (0.005 part by weight or above per 100 parts by weight of a resin) of a 6-hydroxychroman compound inclusive of vitamin E along with other antioxidant.

The content of a 6-hydroxychroman compound inclusive of vitamin E is, as in the phenolic antioxidants conventionally used, taught to be 0.005 part by weight–0.5 part by weight relative to 100 parts by weight of an organic polymer, but the mixing ratio of a 6-hydroxychroman compound and a phosphorus antioxidant is not referred to or suggested.

That is, JP-A-53-78248 teaches a method for preventing yellowing but is silent on stability during processing. A phosphorus antioxidant is not contained, and the proportion of the 6-hydroxychroman compound relative to the total amount of the antioxidants in the case of Examples is calculated to be 22.2%–15.7%. In addition, JP-A-54-20056 teaches the synergistic effect provided by the concurrent use of a 6-hydroxychroman compound and a phenolic antioxidant, but the amount of the phenolic antioxidant is 0.01–1 part by weight relative to 100 parts by weight of a resin, and no further disclosure is found even in Examples. In an Example, a 6-hydroxychroman compound alone is added to a resin.

JP-A-53-114852 discloses concurrent use of a 6-hydroxychroman compound and plural phenolic antioxidants, but in an Example, vitamin E was added in a proportion of 0.03 part by weight and two kinds of phenolic antioxidants were added respectively in a proportion of 0.1 part by weight relative to a resin, wherein the proportion of the 6-hydroxychroman compound to the total amount was about 13 wt %.

JP-A-63-137941 discloses, in Examples, the addition of vitamin E in a proportion of 0.03 part by weight or 0.10 part by weight, and tetrakis(2,4-di-tert-butylphenyl)-4,4'-biphenylenediphosphonite in a proportion of 0.03 part by weight, relative to 100 parts by weight of a resin, wherein the proportions of the 6-hydroxychroman compound to the total amount of the antioxidants are 50% and 77%.

JP-A-62-86036 discloses an example wherein vitamin E is added in a proportion of 0.05 part by weight, and distearyl pentaerythritol phosphite or tris(2,4-di-tert-butylphenyl) phosphite is added in a proportion of 0.05 part by weight, 0.2 part by weight and the like, relative to 100 parts by weight of a resin, and the proportions of the 6-hydroxychroman compound to the total amount of the antioxidants are 50% and 20%.

JP-A-2-222542 discloses an example wherein vitamin E is added in a proportion of 0.05 part by weight, and a specific phosphite compound (phosphorus antioxidant) is added in a proportion of 0.05 part by weight, relative to 100 parts by weight of a resin. The ratio of these is 1:1, wherein the proportion of the 6-hydroxychroman compound to the total amount of the antioxidants is 50%.

The above-mentioned publications disclose the concurrent use of two kinds of components of a 6-hydroxychroman compound and a phenolic antioxidant, or a 6-hydroxychroman compound and a phosphorus antioxidant, but three kinds of components of a 6-hydroxychroman compound, a phenolic antioxidant and a phosphorus antioxidant is only referred to without specific disclosure, not to mention any disclosure or suggestion of a mixing ratio of a 6-hydroxychroman compound and a phenolic or phosphorus antioxidant. Therefore, the above-mentioned publications do not disclose or suggest, unlike the present invention, that a phenolic antioxidant, a phosphorus antioxidant, and a small amount of a 6-hydroxychroman compound are added to an organic polymer material, thereby to inhibit coloring and to provide a remarkable synergistic effect on stability during processing.

For example, JP-A-63-105060 or U.S. Pat. No. 4,806,580 teaches that a stabilizer composition for a synthetic resin, which contains 1 part by weight of vitamin E and 5–14 parts by weight of a specific phosphorus antioxidant, such as tetrakis(2,4-di-tert-butylphenyl)-4,4'-biphenylenediphosphite and the like, shows improved stability with regard to coloring. It discloses, in a comparative example, a composition containing 1 part by weight of vitamin E and 15 or 16 parts by weight of a specific phosphorus antioxidant such as tetrakis(2,4-di-tert-butylphenyl)-4,4'-biphenylenediphosphite and the like.

JP-A-63-105060 teaches, at page 2, lower left column referring to the background of the invention, that a more preferable compound from the aspects of hygiene and safety is desired, and as a phenolic antioxidant, naturally occurring vitamin E and a 6-hydroxychroman compound having a similar structure to vitamin E can be used as substitutes for the previously used phenolic antioxidants.

The mixing ratio disclosed in this publication can be calculated into about 6.7 wt %–about 16.7 wt % of vitamin E of the total amount of vitamin E and the phosphorus antioxidant, and the compositions of comparative examples wherein the ratios are about 6.3 wt % and about 5.9 wt % are disclosed to show poor stabilizing effect.

This publication proposes an organic polymer material composition containing a 6-hydroxychroman compound and a phosphorus antioxidant, instead of a phenolic antioxidant and a phosphorus antioxidant previously used. This is a proposition of a mixture taking a 6-hydroxychroman compound under the category of phenolic compounds, and the mixing ratio of the antioxidants is different from that in the present invention.

That is, these prior art techniques are different from the resent invention which, by the use of a stabilizer composition containing a phenolic antioxidant, a phosphorus antioxidant having synergistic effect and an extremely small amount of a 6-hydroxychroman compound of the formula (1), aims at strikingly enhanced stability during processing while maintaining the heat resistance provided by the phenolic antioxidant and the coloring preventive effect provided by the phosphorus antioxidant. In the present invention, a 6-hydroxychroman compound can be considered an agent for reinforcing the stability during processing of a phenolic antioxidant and a phosphorus antioxidant.

In recent years, 3-arylbenzofuranone compound has been developed as a synergist of a phosphorus antioxidant and a phenolic antioxidant. In the meantime, JP-A-7-233160 in Example 14 shown at the paragraph No. 0226 discloses 3-(3,4-dimethylphenyl)-5,7-di-tert-butyl-3H-benzofuran-2-one (compound 103 in this application) that can be used for the object similar to the object of the present invention. This compound is also described in the material for the lecture by C. Krohnke entitled "A major breakthrough in polymer stabilization" reported in the international convention relating to polyolefin (Polyolefins X international conference) held in Houston, Tex. on Feb. 23–26, 1997, as a synergist for phenolic antioxidants and phosphorus antioxidants. However, the synergistic effect is not satisfactory, and a more effective synergist has been demanded.

A recent growing demand on an antioxidant effective for achieving superior heat stability and superior stability during processing, that permit higher temperature for high speed molding and high temperature molding of an alloy with an engineering plastic and the like, cannot be fully met by these known stabilizing compositions. Moreover, an antioxidant effective by the addition of a small amount thereof to achieve heat resistance and stability during processing has been increasingly demanded.

As a means to improve a stabilizing effect of an organic polymer material, WO97/49758 discloses a stabilizer composition containing a phenolic antioxidant, a phosphorus antioxidant and vitamin E (tocopherol), wherein the weight ratio of phenolic antioxidant:phosphorus antioxidant is 2:1–1:4, and the weight ratio of phenolic antioxidant:vitamin E is 2:1–10:1. This publication discloses that this stabilizer composition is highly effective for the prevention of decomposition, crosslinking and coloring of a polymer material due to heat or light. This publication also teaches that the weight ratio of phenolic antioxidant:phosphorus antioxidant is preferably 1:1 and the weight ratio of phenolic antioxidant:vitamin E is preferably 5:1.

Vitamin E is susceptible to oxidation by air, shows marked coloring and is a viscous liquid. It is defective in that the handling of vitamin E requires special facility and the like. In addition, vitamin E may be used in a small amount as an antioxidant of food in view of safety, but rarely applied to an industrial use such as a stabilizer for an organic polymer material to be added to a resin.

Since vitamin E is a viscous liquid, homogeneous dispersion of vitamin E in a composition to give the composition defined in the claims of WO97/49758 is difficult in an industrial large scale production. Particularly, homogeneous dispersion of vitamin E in a composition is very difficult, thus resulting in inconsistent property of the obtained compositions.

According to the study of the present inventors, a composition containing the phenol antioxidant, the phosphorus antioxidant and a small amount of vitamin E is powdery when mixed, but since the powder has moisture, it grows sticky in the course of long-term preservation and becomes extremely difficult to handle.

According to the study of the present inventors, moreover, the addition of vitamin E to the phenolic antioxidant and the phosphorus antioxidant has been found to cause blocking (agglomeration of powder) during long-term storage.

According to the study of the present inventors, a composition containing a phenolic antioxidant, a phosphorus antioxidant and a small amount of vitamin E showed a decreased content of the phosphorus antioxidant during a long term storage. When such a composition after a long term storage was added to an organic polymer material such as a synthetic resin, an improving effect of stability during processing of the organic polymer material and a coloring preventive effect were found to be degraded.

It has been found by the study of the present inventors that a composition containing a phenolic antioxidant, a phosphorus antioxidant and a small amount of vitamin E is associated with a problem of low stability during a long term storage.

SUMMARY OF THE INVENTION

It is an object of the present invention to provide a superior antioxidant (stabilizer for organic polymer material) effective for preserving stability during processing and heat resistance with a small amount thereof, while maintaining coloring preventive effect.

It is also an object of the present invention to provide an antioxidant (stabilizer for organic polymer material), which is stable during long-term storage.

The present inventors have conducted studies in an attempt to solve the above-mentioned problems and found that a stabilizer superior in improving a coloring preventive effect, heat resistance and stability during processing of an organic polymer material can be obtained by mixing a small amount of a 6-hydroxychroman compound of the following formula (1) with a stabilizer composition containing a phosphorus antioxidant and a phenolic antioxidant. The present inventors have further found that the stabilizer composition of the present invention prevents stickiness and blocking during a long term storage, and also suppresses reduction of an antioxidant component content, reduced improvement of stability during processing, and reduced coloring preventive effect. Thus, the stabilizer composition of the present invention is superior in stability of the stabilizer composition itself during long term storage, as compared to a stabilizer composition containing a phosphorus antioxidant, a phenolic antioxidant and vitamin E.

The present invention solves the above-mentioned problems and provides the following.

A stabilizer composition for an organic polymer material, which comprises (a) at least one member from the compounds of the formula (1)

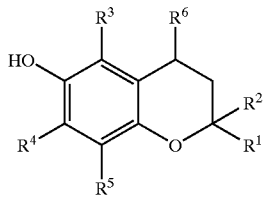

wherein $R^1$ is alkyl having 1 to 5 carbon atoms or alkenyl having 2 to 5 carbon atoms, $R^2$ is alkyl having 1 to 5 carbon atoms, $R^3$, $R^4$ and $R^5$ are the same or different and each is hydrogen atom or alkyl having 1 to 4 carbon atoms, and $R^6$ is hydrogen atom or alkyl having 1 to 5 carbon atoms (hereinafter also to be referred to as 6-hydroxychroman compound);

(b) a phosphorus antioxidant; and (c) a phenolic antioxidant, wherein the component (a) is contained in a proportion of 0.5 wt %–10 wt % and the total of the component (b) and the component (c) is in a proportion of 99.5 wt %–90 wt %, of the total amount of the component (a), the component (b) and the component (c).

The present invention provides the above-mentioned stabilizer composition, wherein the component (a) is contained in a proportion of 1.0 wt %–6.5 wt %, and the total amount of the component (b) and the component (c) is in a proportion of 99.0 wt %–93.5 wt %, of the total amount of the component (a), the component (b) and the component (c). The present invention also provides the above-mentioned stabilizer composition, wherein the component (a) is contained in a proportion of 1.0 wt %–4.5 wt %, and the total amount of the component (b) and the component (c) is in a proportion of 99.0 wt %–95.5 wt %, of the total amount of the component (a), the component (b) and the component (c).

The present invention provides the above-mentioned stabilizer composition, wherein the weight ratio of the component (b):component (c) is 9:1–1:9.

The stabilizer composition of the present invention may further contain a sulfuric antioxidant and/or a light stabilizer.

The present invention provides an organic polymer material composition comprising an organic polymer and the above-mentioned stabilizer composition. The organic polymer material composition of the present invention may further contain a sulfuric antioxidant and/or a light stabilizer.

The present invention also provides an organic polymer material composition comprising (a): at least one member from the compounds of the formula (1)

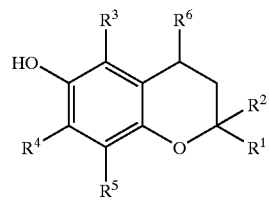

wherein $R^1$ is alkyl having 1 to 5 carbon atoms or alkenyl having 2 to 5 carbon atoms, $R^2$ is alkyl having 1 to 5 carbon atoms, $R^3$, $R^4$ and $R^5$ are the same or different and each is hydrogen atom or alkyl having 1 to 4 carbon atoms, and $R^6$ is hydrogen atom or alkyl having 1 to 5 carbon atoms;

(b): a phosphorus antioxidant;

(c): a phenolic antioxidant; and (d): an organic polymer, wherein the component (a) is contained in a proportion of 0.0005 part by weight–0.025 part by weight per 100 parts by weight of the organic polymer material composition.

The present invention provides the above-mentioned organic polymer material composition wherein the component (a) is contained in a proportion of 0.0005 part by weight–0.010 part by weight per 100 parts by weight of the organic polymer material composition.

The present invention provides the above-mentioned organic polymer material composition, wherein the weight ratio of component (b):component (c) is 9:1–1:9.

The organic polymer material composition of the present invention may further contain a sulfuric antioxidant and/or a light stabilizer.

In the present invention, a phosphorus antioxidant (the component (b)) can be a phosphorus antioxidant selected from the following (b-1), (b-2), (b-3) and (b-4). (b-1): A compound of the formula (2)

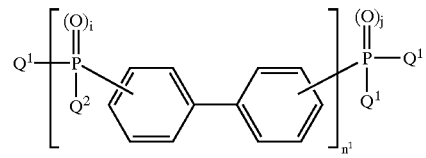

wherein $Q^1$ is a group of the formula (3)

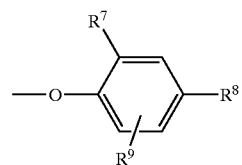

wherein $R^7$ and $R^8$ are the same or different and each is alkyl having 1 to 4 carbon atoms, and $R^9$ is hydrogen atom or methyl, $Q^2$ is, independently from other repeating units, a group of the formula (3)

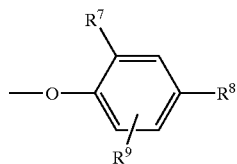

wherein each symbol is as defined above, i is, independently from other repeating units, 0 or 1, j is 0 or 1, and $n^1$ is an integer of 1 to 10, or of the formula (4)

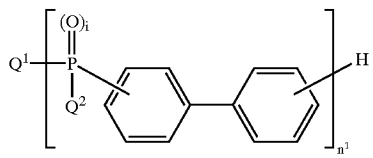

wherein each symbol is as defined above.

(b-2): A compound of the formula (5)

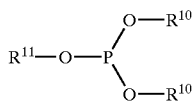

wherein each $R^{10}$ is the same or different and is alkyl having 1 to 18 carbon atoms, phenyl, phenyl substituted by alkyl having 1 to 9 carbon atoms, or a group of the formula (6)

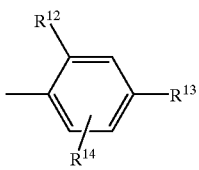

wherein $R^{12}$ and $R^{13}$ are the same or different and each is alkyl having 1 to 4 carbon atoms, and $R^{14}$ is hydrogen atom or methyl, and $R^{11}$ is alkyl having 1 to 18 carbon atoms, phenylalkyl having 7 to 9 carbon atoms, cyclohexyl, phenyl, phenyl substituted by alkyl having 1 to 9 carbon atoms, or a group of the formula (6)

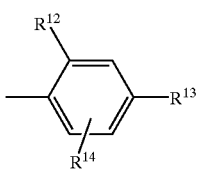

wherein $R^{12}$ and $R^{13}$ are the same or different and each is alkyl having 1 to 4 carbon atoms, and $R^{14}$ is hydrogen atom or methyl, or of the formula (7)

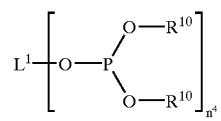

wherein $R^{10}$ is as defined above, $n^4$ is 3, and $L^1$ is 1,1,3-butanetriyl.

(b-3): A compound of the formula (8)

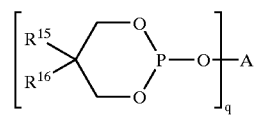

or of the formula (9)

wherein q is 1 or 2, wherein, when q is 1, A is a group of the formula (10)

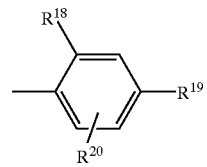

wherein $R^{18}$ and $R^{19}$ are the same or different and each is alkyl having 1 to 4 carbon atoms, and $R^{20}$ is hydrogen atom or alkyl having 1 to 4 carbon atoms, and when q is 2, A is alkylene having 2 to 18 carbon atoms, p-phenylene or p-biphenylene, $R^{15}$ and $R^{16}$ are each independently alkyl having 1 to 4 carbon atoms, and each $R^{17}$ is independently alkyl having 1 to 18 carbon atoms, phenylalkyl having 7 to 9 carbon atoms, cyclohexyl, phenyl, or a group of the formula (11)

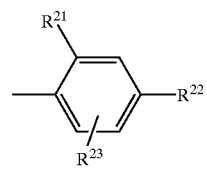

wherein $R^{21}$ and $R^{22}$ are the same or different and each is alkyl having 1 to 4 carbon atoms or phenylalkyl having 7 to 9 carbon atoms, and $R^{23}$ is hydrogen atom or alkyl having 1 to 4 carbon atoms. (b-4): A compound of the formula (12)

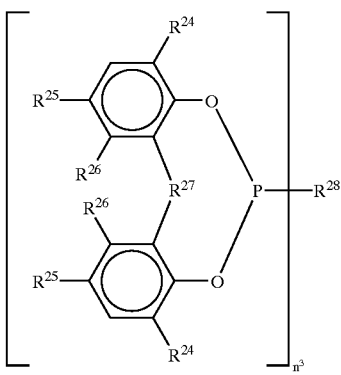

wherein each $R^{24}$ is the same or different and is alkyl having 1 to 5 carbon atoms, each $R^{25}$ is the same or different and is hydrogen atom or alkyl having 1 to 5 carbon atoms, each $R^{26}$ is the same or different and is hydrogen atom or methyl, $R^{27}$ is direct bond, methylene, —CH($R^{29}$)—($R^{29}$ is alkyl having 1 to 4 carbon atoms) or sulfur atom, and $n^3$ is 1 or 3, wherein when $n^3$ is 3, $R^{28}$ is a group of the formula $N(CH_2CH_2O)_3$, and when $n^3$ is 1, $R^{28}$ is alkyl having 1 to 18 carbon atoms, halogen atom, hydroxy or alkoxy having 1 to 8 carbon atoms.

In the present invention, the following phosphorus antioxidant (b-5) can be used as the phosphorus antioxidant (component (b)).

(b-5): At least one member from the compounds of the formula (17)

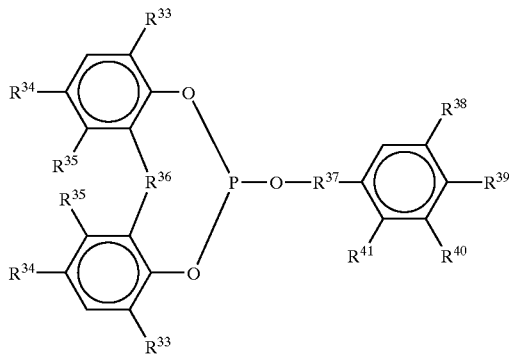

wherein
$R^{33}$ and $R^{34}$ are the same or different and each is hydrogen atom, alkyl having 1 to 8 carbon atoms, cycloalkyl having 5 to 8 carbon atoms, cycloalkyl having 5 to 8 carbon atoms substituted by alkyl having 1 to 4 carbon atoms, aralkyl having 7 to 12 carbon atoms or phenyl; each $R^{35}$ is the same or different and is hydrogen atom or alkyl having 1 to 8 carbon atoms;
$R^{36}$ is a direct bond, methylene, —CH($R^{42}$)— wherein $R^{42}$ is alkyl having 1 to 7 carbon atoms or cycloalkyl having 5 to 8 carbon atoms, or sulfur atom;
$R^{37}$ is alkylene having 2 to 8 carbon atoms, *-$R^{43}$—O—CO-$R^{44}$—or *—CO—$R^{44}$—wherein $R^{43}$ is alkylene having 1 to 8 carbon atoms, $R^{44}$ is a direct bond or alkylene having 1 to 8 carbon atoms and * means bond on the oxygen atom side; $R^{38}$ and $R^{40}$ are the same or different and each is hydrogen atom, alkyl having 1 to 8 carbon atoms, cycloalkyl having 5 to 8 carbon atoms, cycloalkyl having 5 to 8 carbon atoms substituted by alkyl having 1 to 4 carbon atoms, aralkyl having 7 to 12 carbon atoms or phenyl; and one of $R^{39}$ and $R^{41}$ is hydroxyl group, alkoxy having 1 to 8 carbon atoms or aralkyloxy having 7 to 12 carbon atoms and the other is hydrogen atom or alkyl having 1 to 8 carbon atoms.

A preferred phosphorus antioxidant (b-1) is a compound of the formula (13)

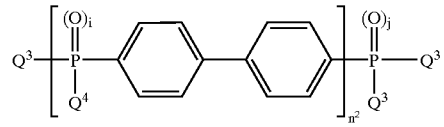

wherein $Q^3$ is a group of the formula (14)

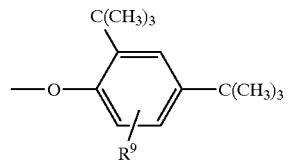

wherein $R^9$ is hydrogen atom or methyl, $Q^4$ is, independently from other repeating units, a group of the formula (14)

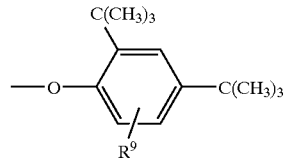

wherein $R^9$ is hydrogen atom or methyl, i is, independently from other repeating units, 0 or 1, j is 0 or 1, and $n^2$ is an integer of 1 to 3, or of the formula (15)

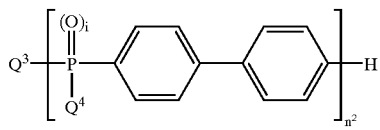

wherein each symbol is as defined above.

Preferable phosphorus antioxidant (b-1) is, for example, at least one member selected from the group consisting of tetrakis(2,4-di-tert-butylphenyl)-4,4'-biphenylenediphosphonite,
tetrakis(2,4-di-tert-butyl-5-methylphenyl)-4,4'-biphenylenediphosphonite,
(2,4-di-tert-butylphenoxy)bis{4'-(bis(2,4-di-tert-butylphenoxy)phosphino)biphenyl-4-yl}phosphine, and
(2,4-di-tert-butyl-5-methylphenoxy)bis{4-(bis(2,4-di-tert-butyl-5-methylphenoxy)phosphino)biphenyl-4-yl}phosphine.

Preferable phosphorus antioxidant (b-2) is, for example, at least one member selected from the group consisting of tris(2,4-di-tert-butylphenyl) phosphite,
bis(2,4-di-tert-butyl-6-methylphenyl) ethyl phosphite,
triphenyl phosphite,
diphenyl alkyl phosphite, phenyl dialkyl phosphite,
tris(nonylphenyl) phosphite,
trilauryl phosphite,
trioctadecyl phosphite and
bis(2,4-di-tert-butyl-6-methylphenyl) methyl phosphite.

Preferable phosphorus antioxidant (b-3) is, for example, at least one member selected from the group consisting of bis(2,4-di-tert-butylphenyl) pentaerythritol diphosphite,
bis(2,6-di-tert-butyl-4-methylphenyl) pentaerythritol diphosphite, distearyl pentaerythritol diphosphite,
bis(2,4-di(1-phenyl-1,1-dimethylmethyl)phenyl) pentaerythritol diphosphite,
(2,4,6-tri-tert-butylphenyl)-2-butyl-2-ethyl-1,3-propanediol phosphite,
bisisodecyl pentaerythritol diphosphite and
bis(2,4,6-tri-tert-butylphenyl) pentaerythritol diphosphite.

Preferable phosphorus antioxidant (b-4) is, for example, at least one member selected from the group consisting of 2,2-methylenebis(4,6-di-tert-butylphenyl)-2-ethylhexyl phosphite,
6-fluoro-2,4,8,10-tetra-tert-butyl-12-methyl-dibenzo[d,g]-1,3,2-dioxaphosphocin and
2,2', 2''-nitrilo[triethyltris(3,3', 5,5'-tetra-tert-butyl-1,1'-biphenyl-2,2'-diyl)phosphite].

Preferable phosphorus antioxidant (b-5) is, for example,
6-[3-(3-tert-butyl-4-hydroxy-5-methylphenyl)propoxy]-2,4,8,10-tetra-tert-butyldibenzo[d,f][1,3,2]dioxaphosphepin.

In the present invention, a phenolic antioxidant (component (c)) can be a compound having one or more structures shown by the following Formula (16)

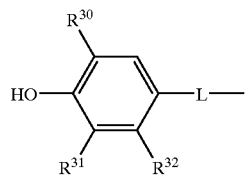

wherein $R^{30}$ is alkyl having 1 to 5 carbon atoms, $R^{31}$ is alkyl having 1 to 4 carbon atoms, $R^{32}$ is hydrogen atom or methyl, and L is

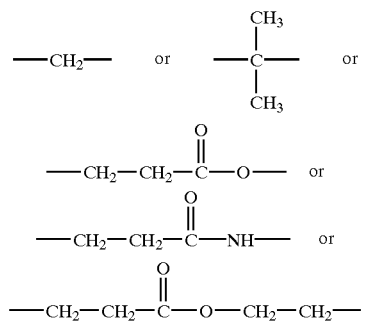

in a molecule.

Preferable phenolic antioxidant is, for example, at least one member selected from the group consisting of tetrakis[3-(3,5-di-tert-butyl-4-hydroxyphenyl) propionyloxymethyl]methane,
n-octadecyl 3-(3,5-di-tert-butyl-4-hydroxyphenyl) propionate,
1,3,5-tris(3,5-di-tert-butyl-4-hydroxybenzyl) isocyanurate and
1,3,5-trimethyl-2,4,6-tris(3,5-di-tert-butyl-4-hydroxybenzyl)benzene and the like.

More preferably, at least one member selected from the group consisting of tetrakis[3-(3,5-di-tert-butyl-4-hydroxyphenyl)propionyloxymethyl]methane and n-octadecyl 3-(3,5-di-tert-butyl-4-hydroxyphenyl) propionate.

The organic polymer in the organic polymer material composition of the present invention can be a synthetic resin. Preferably, this organic polymer is a polyolefin resin. More preferably, it is a polyethylene resin, a polypropylene resin, a mixture or a compatible polymer of a polyethylene resin and a polypropylene resin, a compatible polymer containing a polyethylene resin and/or a polypropylene resin, an ethylene-vinyl acetate copolymer or an ethylene-propylene copolymer.

According to the present invention, an organic polymer material composition comprising a synthetic resin and the stabilizer composition of the present invention wherein the weight ratio of component (b):component (c) is 9:1–1:9 can be provided. This synthetic resin is preferably a polyolefin resin. The component (c) is preferably at least one member selected from the group consisting of tetrakis[3-(3,5-di-tert-butyl-4-hydroxyphenyl)propionyloxymethyl]methane and n-octadecyl 3-(3,5-di-tert-butyl-4-hydroxyphenyl) propionate. The component (b) is preferably at least one member selected from the group consisting of tetrakis(2,4-di-tert-butylphenyl)-4,4'-biphenylenediphosphonite and tetrakis(2,4-di-tert-butyl-5-methylphenyl)-4,4'-biphenylenediphosphonite.

According to the present invention, an organic polymer material composition comprising a synthetic resin and the stabilizer composition of the present invention, wherein the component (a) is 2,2,5,7,8-pentamethyl-6-hydroxychroman and the weight ratio of component (b):component (c) is 9:1–1:9, is provided. This synthetic resin is preferably a polyolefin resin. The component (c) is preferably at least one member selected from the group consisting of tetrakis[3-(3,5-di-tert-butyl-4-hydroxyphenyl)propionyloxymethyl] methane and n-octadecyl 3-(3,5-di-tert-butyl-4-hydroxyphenyl)propionate. The component (b) is preferably at least one member selected from the group consisting of tetrakis(2,4-di-tert-butylphenyl)-4,4'-biphenylenediphosphonite and tetrakis(2,4-di-tert-butyl-5-methylphenyl)-4,4'-biphenylenediphosphonite.

The present invention also relates to a stabilizer composition or organic polymer material, which comprises
a): at least one member from the compounds of the formula

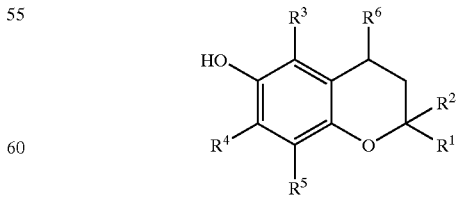

wherein $R^1$ is alkyl having 1 to 6 carbon atoms or alkenyl having 2 to 6 carbon atoms, $R^2$ is methyl, and $R^3$, $R^4$, $R^5$ and $R^6$ are the same or different and each is hydrogen atom or alkyl having 1 to 4 carbon atoms;

(b): a phosphorus antioxidant; and
(c): a phenolic antioxidant,
wherein the component (a) is contained in a proportion of 1 wt %–20 wt % and the component (c) is contained in a proportion of 99 wt %–80 wt %, relative to the total amount of the component (a) and the component (c).

DETAILED DESCRIPTION OF THE INVENTION

The substituents of the compound of the formula (1),

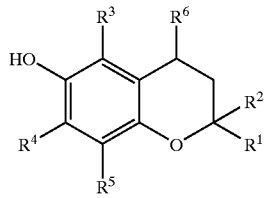

which is the constituent component of the stabilizer composition for organic polymer material of the present invention, are explained in the following.

$R^1$ of compound of the formula (1) is alkyl having 1 to 5 carbon atoms or alkenyl having 2 to 5 carbon atoms, and the alkyl and alkenyl may be a straight or branched chain. Examples thereof include methyl, ethyl, propyl, isopropyl, butyl, isobutyl, sec-butyl, tert-butyl, pentyl, 2-pentyl, 3-pentyl, 2-methylbutan-1-yl, 2-methylbutan-2-yl, 2-methylbutan-3-yl, 2-methylbutan-4-yl, neopentyl and the like.

A preferable group at $R^1$ of the compound of the formula (1) is methyl.

$R^2$ of the compound of the formula (1) is linear or branched alkyl having 1 to 5 carbon atoms, such as methyl, ethyl, propyl, isopropyl, butyl, isobutyl, sec-butyl, tert-butyl, pentyl, 2-pentyl, 3-pentyl, 2-methylbutan-1-yl, 2-methylbutan-2-yl, 2-methylbutan-3-yl, 2-methylbutan-4-yl, neopentyl and the like.

A preferable group at $R^2$ of the compound of the formula (1) is methyl.

$R^3$, $R^4$ and $R^5$ of the compound of the formula (1) are the same or different and each is hydrogen atom or linear or branched alkyl having 1 to 4 carbon atoms, such as methyl, ethyl, propyl, isopropyl, butyl, isobutyl, sec-butyl, tert-butyl and the like.

Preferable examples of $R^3$, $R^4$ and $R^5$ of the compound of the formula (1) include hydrogen atom, methyl, isopropyl and tert-butyl, more preferably hydrogen atom and methyl, particularly preferably methyl.

$R^6$ of the compound of the formula (1) is hydrogen atom or linear or branched alkyl having 1 to 5 carbon atoms, such as methyl, ethyl, propyl, isopropyl, butyl, isobutyl, sec-butyl, tert-butyl, pentyl, 2-pentyl, 3-pentyl, 2-methylbutan-1-yl, 2-methylbutan-2-yl, 2-methylbutan-3-yl, 2-methylbutan-4-yl, neopentyl and the like.

A preferable group at $R^6$ of the compound of the formula (1) is hydrogen atom.

The compound of the formula (1) is exemplified by, but not limited to, the following compounds:

2,2-dimethyl-6-hydroxychroman
2,2,5-trimethyl-7-tert-butyl-6-hydroxychroman
2,2,5-trimethyl-8-tert-butyl-6-hydroxychroman
2,2,7,8-tetramethyl-6-hydroxychroman
2,2,5,7-tetramethyl-6-hydroxychroman
2,2,5,8-tetramethyl-6-hydroxychroman
2,2-dimethyl-7-tert-butyl-6-hydroxychroman
4-isopropyl-2,2,5-trimethyl-7-tert-butyl-6-hydroxychroman
2,2,5,7,8-pentamethyl-6-hydroxychroman
4-isopropyl-2,2-dimethyl-7-tert-butyl-6-hydroxychroman
2,2-dimethyl-5-tert-butyl-6-hydroxychroman
2,5,7,8-tetramethyl-2-(4-methylpent-3-enyl)-6-hydroxychroman
2,5-dimethyl-8-tert-butyl-2-(4-methylpent-3-enyl)-6-hydroxychroman
2-methyl-2-(4-methylpent-3-enyl)-6-hydroxychroman,
2,2,5-trimethyl-6-hydroxychroman
2,2,7-trimethyl-6-hydroxychroman and
2,2,8-trimethyl-6-hydroxychroman.

The compound of the formula (1) is particularly preferably 2,2,5,7,8-pentamethyl-6-hydroxychroman.

In the present invention, component (a) may be one or more kinds of the compounds of the formula (1).

The substituents of the compound of the formula (2) or the formula (4), which is the constituent component of the stabilizer composition for organic polymer material of the present invention, are explained in the following.

In the formula (3)

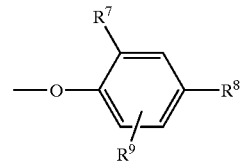

which is the substituent $Q^1$ or $Q^2$ in the formula (2)

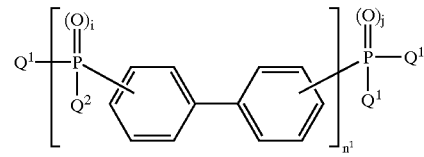

or the formula (4)

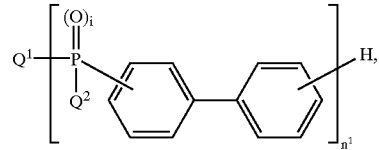

$R^7$ and $R^8$ are the same or different and each is alkyl having 1 to 4 carbon atoms, wherein alkyl may be a straight or branched chain. Examples of the alkyl include methyl, ethyl, propyl, isopropyl, butyl, isobutyl and tert-butyl, with preference given to tert-butyl. It is particularly preferable that both of $R^7$ and $R^8$ be tert-butyl.

In the group of the above-mentioned formula (3), $R^9$ is hydrogen atom or methyl, wherein, when R is methyl, $R^9$ is particularly preferably substituted at the 5- or 6-position, most preferably at the 5-position, on the phenyl ring of the formula (3).

Particularly preferable examples of the group of the formula (3) include 2,4-di-tert-butylphenoxy and 2,4-di-tert-butyl-5-methylphenoxy.

In the formula (2) and formula (4), $n^1$ is an integer of 1–10, preferably 1 or 2, particularly preferably 1. In the formula (2) and formula (4), i and j are 0 or 1, preferably 0.

When the component (b) is (b-1), the compound of the formula (2) is preferably the main component, wherein the compound of the formula (4) may not be contained.

Examples of the compound of the formula (2) or the formula (4), which is the constituent component of the stabilizer composition for organic polymer material of the present invention, include the following.

4,4'-Biphenylenediphosphonite compounds represented by tetrakis(2,4-di-tert-butylphenyl)-4,4'-biphenylenediphosphonite disclosed in JP-B-50-35096, a composition containing tetrakis(2,4-di-tert-butylphenyl)-4,4'-biphenylenediphosphonite and corresponding biphenylenemonophosphonite disclosed in JP-A-1-254744, a composition containing tetrakis(2,4-di-tert-butyl-6-methylphenyl)-4,4'-biphenylenediphosphonite and the like disclosed in JP-A-2-270892, a composition containing tetrakis(2,4-di-tert-butylphenyl)-4,4'-biphenylenediphosphonate and the like disclosed in JP-A-5-202078, tetrakis(2,4-di-tert-butyl-5-methylphenyl)-4,4'-biphenylenediphosphonite compound disclosed in JP-A-5-178870, and compounds disclosed in JP-A-8-231568 such as 2,4-di-tert-butylphenyl bis[4'-bis(2,4-di-tert-butylphenoxy)phosphanylbiphenyl-4-yl]phosphinite (or also called (2,4-di-tert-butylphenoxy)bis[4'-[bis(2,4-di-tert-butylphenoxy)phosphino]biphenyl-4-yl]phosphine), 2,4-di-tert-butylphenyl [4'-bis(2,4-di-tert-butylphenoxy)phosphanylbiphenyl-4-yl][4'-bis(2,4-di-tert-butylphenoxy)phosphorylbiphenyl-4-yl]phosphinite, 2,4-di-tert-butylphenyl bis[4'-bis(2,4-di-tert-5 butylphenoxy)phosphanylbiphenyl-4-yl]phosphinate, 2,4-di-tert-butylphenyl [4'-bis(2,4-di-tert-butylphenoxy)phosphanylbiphenyl-4-yl][4'-bis(2,4-di-tert-butylphenoxy)phosphorylbiphenyl-4-yl]phosphinate, 2,4-di-tert-butylphenyl bis[4'-bis(2,4-di-tert-butylphenoxy)phosphorylbiphenyl-4-yl]phosphinite, 2,4-di-tert-butylphenyl bis[4'-bis(2,4-di-tert-butylphenoxy)phosphorylbiphenyl-4-yl]phosphinate, 2,4-di-tert-butyl-5-methylphenyl bis[4'-bis(2,4-di-tert-butyl-5-methylphenoxy)phosphanylbiphenyl-4-yl]phosphinite (or also called (2,4-di-tert-butyl-5-methylphenoxy)bis[4'[bis(2,4-di-tert-butyl-5-methylphenoxy)phosphino]biphenyl-4-yl]phosphine), 2,4-di-tert-butyl-5-methylphenyl [4'-bis(2,4-di-tert-butyl-5-methylphenoxy)phosphanylbiphenyl-4-yl][4'-bis(2,4-di-tert-butyl-5-methylphenoxy)phosphorylbiphenyl-4-yl]phosphinite, 2,4-di-tert-butyl-5-methylphenyl bis[4'-bis(2,4-di-tert-butyl-5-methylphenoxy)phosphanylbiphenyl-4-yl]phosphinate, 2,4-di-tert-butyl-5-methylphenyl [4'-bis(2,4-di-tert-butyl-5-methylphenoxy)phosphanylbiphenyl-4-yl][4'-bis(2,4-di-tert-butyl-5-methylphenoxy)phosphorylbiphenyl-4-yl]phosphinate, 2,4-di-tert-butyl-5-methylphenyl bis[4'-bis(2,4-di-tert-butyl-5-methylphenoxy)phosphorylbiphenyl-4-yl]phosphinite, 2,4-di-tert-butyl-5-methylphenyl bis[4'-bis(2,4-di-tert-butyl-5-methylphenoxy)phosphorylbiphenyl-4-yl]phosphinate, 2,4-di-tert-butylphenyl(biphenyl-4-yl)[4'-bis(2,4-di-tert-butylphenoxy)phosphanylbiphenyl-4-yl]phosphinite, 2,4-di-tert-butyl-5-methylphenyl(biphenyl-4-yl)[4'-bis(2,4-di-tert-butyl-5-methylphenoxy)phosphanylbiphenyl-4-yl]phosphinite, 2,4-di-tert-butyl-6-methylphenyl(biphenyl-4-yl)[4'-bis(2,4-di-tert-butyl-6-methylphenoxy)phosphanylbiphenyl-4-yl]phosphinite, 2,4-di-tert-butylphenyl(biphenyl-4-yl)[4'-bis(2,4-di-tert-butylphenoxy)phosphorylbiphenyl-4-yl]phosphinite, 2,4-di-tert-butylphenyl(biphenyl-4-yl)[4'-bis(2,4-di-tert-butylphenoxy)phosphanylbiphenyl-4-yl]phosphinate, 2,4-di-tert-butylphenyl(biphenyl-4-yl)[4'-bis(2,4-di-tert-butylphenoxy)phosphorylbiphenyl-4-yl]phosphinate and the like.

The compound of the formula (2) is particularly preferably tetrakis(2,4-di-tert-butylphenyl)-4,4'-biphenylenediphosphonite, or tetrakis(2,4-di-tert-butyl-5-methylphenyl)-4,4'-biphenylenediphosphonite. A composition containing tetrakis(2,4-di-tert-butylphenyl)-4,4'-biphenylenediphosphonite as the main component (50–85 wt %), and also (2,4-di-tert-butylphenoxy)bis[4'-[bis(2,4-di-tert-butylphenoxy)phosphino]biphenyl-4-yl]phosphine (5–15 wt %), [(2,4-di-tert-butylphenoxy)phosphino] biphenyl (5–20 wt %), tris(2,4-di-tert-butylphenyl) phosphite and the like (5–15 wt %), or a composition containing tetrakis(2,4-di-tert-butyl-5-methylphenyl)-4,4'-biphenylenediphosphonite as the main component (50–85 wt %), and also (2,4-di-tert-butyl-5-methylphenoxy)bis[4'-[bis(2,4-di-tert-butyl-5-methylphenoxy)phosphino] biphenyl-4-yl]phosphine (5–15 wt %), [(2,4-di-tert-butyl-5-methylphenoxy)phosphino]biphenyl (5–20 wt %), tris(2,4-di-tert-butyl-5-methylphenyl)phosphite (5–15 wt %) and the like are most preferable.

The substituents of the compound of the formula (5) or of the formula (7), which is the constituent component of the stabilizer composition for organic polymer material of the present invention, are explained in the following.

The alkyl having 1 to 18 carbon atoms at $R^{10}$ of the formula (5) and the formula (7), and at $R^{11}$ of the formula (5) may be a straight or branched chain, and is exemplified by methyl, ethyl, propyl, isopropyl, butyl, isobutyl, sec-butyl, tert-butyl, pentyl, 2-pentyl, 3-pentyl, 2-methylbutan-1-yl, 2-methylbutan-2-yl, 2-methylbutan-3-yl, 2-methylbutan-4-yl, neopentyl, hexyl, isohexyl, heptyl, octyl, 2-ethylhexyl, nonyl, decyl, undecyl, dodecyl, tridecyl, tetradecyl, pentadecyl, hexadecyl, heptadecyl, octadecyl and the like, with preference given to octadecyl.

The phenyl substituted by alkyl having 1 to 9 carbon atoms at $R^{10}$ of the formula (5) and the formula (7) and at $R^{11}$ of the formula (5) is, for example, methylphenyl, ethylphenyl, propylphenyl, isopropylphenyl, butylphenyl, isobutylphenyl, sec-butylphenyl, tert-butylphenyl, pentylphenyl, hexylphenyl, heptylphenyl, octylphenyl, nonylphenyl and the like.

The phenylalkyl having 7 to 9 carbon atoms at $R^{11}$ of the formula (5) may have an alkyl moiety which may be a straight or branched chain. Examples thereof include benzyl, phenethyl, α-methylbenzyl, α,α-dimethylbenzyl and the like.

$R^{12}$ and $R^{13}$ of a group of the formula (6) are the same or different and each is alkyl having 1 to 4 carbon atoms. This alkyl may be a straight or branched chain and is exemplified by methyl, ethyl, propyl, isopropyl, butyl, isobutyl and tert-butyl, with preference given to tert-butyl. It is particularly preferable that $R^{12}$ and $R^{13}$ be both tert-butyl.

$R^{14}$ of a group of the formula (6) is hydrogen atom or methyl. When $R^{14}$ is methyl, $R^{14}$ is preferably substituted at the 5- or 6-position on the phenyl ring.

Preferable examples of the group of the formula (6) include 2,4-di-tert-butylphenyl and 2,4-di-tert-butyl-6-methylphenyl.

Preferable examples of $R^{10}$ of the formula (5) include dodecyl, octadecyl, phenyl, nonylphenyl, 2,4-di-tert-butylphenyl and 2,4-di-tert-butyl-6-methylphenyl.

Preferable examples of $R^{11}$ of the formula (5) include methyl, ethyl, dodecyl, octadecyl, phenyl, nonylphenyl, 2,4-di-tert-butylphenyl and 2,4-di-tert-butyl-6-methylphenyl.

Preferable examples of $R^{10}$ of the formula (7) include dodecyl, octadecyl, phenyl, nonylphenyl, 2,4-di-tert-butylphenyl and 2,4-di-tert-butyl-6-methylphenyl.

Specific examples of the compound of the formula (5) or of the formula (7) are tris(2,4-di-tert-butylphenyl) phosphite,
bis(2,4-di-tert-butyl-6-methylphenyl) ethyl phosphite,
triphenyl phosphite,
diphenyl alkyl phosphite,
phenyl dialkyl phosphite,
tris(nonylphenyl) phosphite,
trilauryl phosphite,
trioctadecyl phosphite,
bis(2,4-di-tert-butyl-6-methylphenyl) methyl phosphite and the like.

The substituents of the compound of the formula (8) or of the formula (9), which is the constituent component of the stabilizer composition for organic polymer material of the present invention, are explained in the following.

The definition of A in the formula (8) is first explained in the following. When q is 1, A is a group of the formula (10)

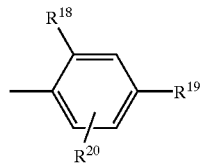

wherein
$R^{18}$ and $R^{19}$ may be the same or different and each is alkyl having 1 to 4 carbon atoms, and $R^{20}$ is hydrogen atom or alkyl having 1 to 4 carbon atoms, and when q is 2, A is alkylene having 2 to 18 carbon atoms, p-phenylene or p-biphenylene.

$R^{18}$ and $R^{19}$ of the group of the formula (10) are the same or different and each is alkyl having 1 to 4 carbon atoms. This alkyl may be a straight or branched chain and may be, for example, methyl, ethyl, propyl, isopropyl, butyl, isobutyl or tert-butyl, with preference given to methyl and tert-butyl.

$R^{20}$ of the group of the formula (10) is hydrogen atom or alkyl having 1 to 4 carbon atoms. This alkyl may be a straight or branched chain and may be, for example, methyl, ethyl, propyl, isopropyl, butyl, isobutyl or tert-butyl. $R^{20}$ is preferably hydrogen atom or tert-butyl.

When $R^{20}$ is alkyl having 1 to 4 carbon atoms, $R^{20}$ is particularly preferably substituted at the 5- or 6-position, most preferably at the 6-position, on the phenyl ring.

Preferable examples of the group of the formula (10) include 2,4,6-tri-tert-butylphenyl, 2,4-di-tert-butylphenyl and 2,6-di-tert-butyl-4-methylphenyl.

The alkylene having 2 to 18 carbon atoms at A of the formula (8) may be a straight or branched chain, and may be, for example, ethylene, ethylidene, trimethylene, isopropylidene, tetramethylene, pentamethylene, hexamethylene and the like.

When q is 1, preferable examples of A include 2,4,6-tri-tert-butylphenyl, 2,4-di-tert-butylphenyl and 2,6-di-tert-butyl-4-methylphenyl.

In the formula (8), q is preferably 1.

$R^{15}$ and $R^{16}$ of the formula (8) are the same or different and each is alkyl having 1 to 4 carbon atoms. This alkyl may be a straight or branched chain, and may be, for example, methyl, ethyl, propyl, isopropyl, butyl, isobutyl or tert-butyl.

The definition of $R^{17}$ in the formula (9) is explained in the following. $R^{17}$ is independently alkyl having 1 to 18 carbon atoms, phenylalkyl having 7 to 9 carbon atoms, cyclohexyl, phenyl, or a group of the formula (11)

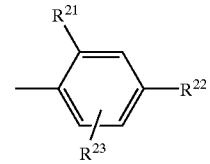

wherein $R^{21}$ and $R^{22}$ are the same or different and each is alkyl having 1 to 4 carbon atoms or phenylalkyl having 7 to 9 carbon atoms, and $R^{23}$ is hydrogen atom or alkyl having 1 to 4 carbon atoms.

The alkyl having 1 to 18 carbon atoms at $R^{17}$ of the formula (9) may be a straight or branched chain, and may be, for example, methyl, ethyl, propyl, isopropyl, butyl, isobutyl, sec-butyl, tert-butyl, pentyl, 2-pentyl, 3-pentyl, 2-methylbutan-1-yl, 2-methylbutan-2-yl, 2-methylbutan-3-yl, 2-methylbutan-4-yl, neopentyl, hexyl, isohexyl, heptyl, octyl, 2-ethylhexyl, nonyl, decyl, isodecyl, undecyl, dodecyl, tridecyl, tetradecyl, pentadecyl, hexadecyl, heptadecyl, octadecyl and the like, with preference given to octadecyl.

The phenylalkyl having 7 to 9 carbon atoms at $R^{17}$ of the formula (9) may have an alkyl moiety which may be a straight or branched chain.

Examples thereof include benzyl, phenethyl, α-methylbenzyl, α,α-dimethylbenzyl and the like.

The alkyl having 1 to 4 carbon atoms at $R^{21}$ and $R^{22}$ of the formula (11) may be a straight or branched chain, and may be, for example, methyl, ethyl, propyl, isopropyl, butyl, isobutyl or tert-butyl, with preference given to methyl and tert-butyl.

The phenylalkyl having 7 to 9 carbon atoms at $R^{21}$ and $R^{22}$ of the formula (11) may have an alkyl moiety which may be a straight or branched chain. Examples thereof include benzyl, phenethyl, α-methylbenzyl, α,α-dimethylbenzyl and the like.

$R^{23}$ of the group of the formula (11) is hydrogen atom or alkyl having 1 to 4 carbon atoms. This alkyl may be a straight or branched chain and may be, for example, methyl, ethyl, propyl, isopropyl, butyl, isobutyl or tert-butyl. Preferable examples of $R^{23}$ include hydrogen atom and tert-butyl. When $R^{23}$ is alkyl having 1 to 4 carbon atoms, $R^{23}$ is particularly preferably substituted at the 5- or 6-position, most preferably at the 6-position, on the phenyl ring.

Preferable examples of $R^{17}$ include 2,4-di-tert-butylphenyl, 2,6-di-tert-butyl-4-methylphenyl, 2,4-di(1-phenyl-1,1-dimethylmethyl)phenyl, 2,4,6-tri-tert-butylphenyl, octadecyl and isodecyl.

Specific examples of the compound of the formula (8) or of the formula (9) are bis(2,4-di-tert-butylphenyl) pentaerythritol diphosphite,
bis(2,6-di-tert-butyl-4-methylphenyl) pentaerythritol diphosphite, distearyl pentaerythritol diphosphite, bis(2,4-di(1-phenyl-1,1-dimethylmethyl)phenyl) pentaerythritol diphosphite,
(2,4,6-tri-tert-butylphenyl)-2-butyl-2-ethyl-1,3-propanediol phosphite,
bisisodecyl pentaerythritol diphosphite,
bis(2,4,6-tri-tert-butylphenyl) pentaerythritol diphosphite and the like.

The substituents of the compound of the formula (12), which is the constituent component of the stabilizer composition for organic polymer material of the present invention, are explained in the following.

In the formula (12), each $R^{24}$ is the same or different and is alkyl having 1 to 5 carbon atoms. This alkyl may be a straight or branched chain and may be, for example, methyl, ethyl, propyl, isopropyl, butyl, isobutyl, sec-butyl, tert-butyl, pentyl, 2-pentyl, 3-pentyl, 2-methylbutan-1-yl, 2-methylbutan-2-yl, 2-methylbutan-3-yl, 2-methylbutan-4-yl, neopentyl and the like. As $R^{24}$, tert-butyl is preferable.

In the formula (12), each $R^{25}$ is the same or different and is hydrogen atom or alkyl having 1 to 5 carbon atoms. This alkyl may be a straight or branched chain and is exemplified by methyl, ethyl, propyl, isopropyl, butyl, isobutyl and tert-butyl. As $R^{25}$, tert-butyl is preferable.

Each $R^{26}$ in the formula (12) is the same or different and is hydrogen atom or methyl, preferably hydrogen atom.

In the formula (12), $R^{29}$ is alkyl having 1 to 4 carbon atoms. This alkyl may be a straight or branched chain and is exemplified by methyl, ethyl, propyl, isopropyl, butyl, isobutyl and tert-butyl. As $R^{29}$ methyl is preferable.

Preferable examples of $R^{27}$ in the formula (12) include direct bond, methylene and ethylidene.

The alkyl having 1 to 18 carbon atoms at $R^{28}$ of the formula (12) may be a straight or branched chain and is exemplified by methyl, ethyl, propyl, isopropyl, butyl, isobutyl, sec-butyl, tert-butyl, pentyl, 2-pentyl, 3-pentyl, 2-methylbutan-1-yl, 2-methylbutan-2-yl, 2-methylbutan-3-yl, 2-methylbutan-4-yl, neopentyl, hexyl, isohexyl, heptyl, octyl, 2-ethylhexyl, nonyl, decyl, undecyl, dodecyl, tridecyl, tetradecyl, pentadecyl, hexadecyl, heptadecyl, octadecyl and the like.

The halogen atom at $R^{28}$ of the formula (12) is exemplified by chlorine atom, bromine atom, fluorine atom and iodine atom, preferably fluorine atom.

The alkoxy having 1 to 8 carbon atoms at $R^{28}$ of the formula (12) may be a straight or branched chain and is exemplified by methoxy, ethoxy, propoxy, isopropoxy, butoxy, sec-butyloxy, tert-butyloxy, pentyloxy, hexyloxy, heptyloxy, octyloxy, 2-ethylhexyloxy and the like, with preference given to 2-ethylhexyloxy.

When $n^3$ of the formula (12) is 1, preferable examples of $R^{28}$ include fluorine atom and 2-ethylhexyloxy.

The compound of the formula (12) is specifically exemplified by 2,2-methylenebis(4,6-di-tert-butylphenyl) 2-ethylhexyl phosphite (also called 6-isooctyloxy-2,4,8,10-tetra-tert-butyl-12H-dibenzo[d,g]-1,3,2-dioxaphosphocin),
6-fluoro-2,4,8,10-tetra-tert-butyl-12-methyl-dibenzo[d,g]-1,3,2-dioxaphosphocin,
2,2', 2"-nitrilo[triethyltris(3,3', 5,5'-tetra-tert-butyl-1,1'-biphenyl-2,2'-diyl)phosphite] and the like.

The substituents of the compound of the formula (17), which is the constituent component of the stabilizer composition of the present invention for organic polymer material, are explained in the following.

$R^{33}$ and $R^{34}$ are the same or different and each is hydrogen atom, alkyl having 1 to 8 carbon atoms, cycloalkyl having 5 to 8 carbon atoms, cycloalkyl having 5 to 8 carbon atoms substituted by alkyl having 1 to 4 carbon atoms, aralkyl having 7 to 12 carbon atoms or phenyl. The alkyl having 1 to 8 carbon atoms may be linear or branched and is exemplified by methyl, ethyl, propyl, isopropyl, butyl, isobutyl, sec-butyl, tert-butyl, pentyl, 2-pentyl, 3-pentyl, neopentyl, tert-pentyl, hexyl, isohexyl, heptyl, octyl, 6-methylheptyl, 1,1-dimethylhexyl, 2-ethylhexyl and the like. The cycloalkyl having 5 to 8 carbon atoms may be cyclopentyl, cyclohexyl, cycloheptyl, cyclooctyl and the like. The cycloalkyl having 5 to 8 carbon atoms substituted by alkyl having 1 to 4 carbon atoms may be substituted by 2 or more alkyl, preferably substituted by 1 to 3 alkyl. The alkyl having 1 to 4 carbon atoms, which is a substituent on cycloalkyl, may be linear or branched and is exemplified by methyl, ethyl, propyl, isopropyl, butyl, isobutyl, sec-butyl, tert-butyl and the like. The cycloalkyl having 5 to 8 carbon atoms substituted by alkyl having 1 to 4 carbon atoms may be 2-methylcyclopentyl, 2-methylcyclohexyl, 2-methyl-4-isopropylcyclohexyl and the like. The aralkyl having 7 to 12 carbon atoms contains a linear or branched alkyl having 1 to 6 carbon atoms, and is exemplified by benzyl, phenethyl, 3-phenylpropyl, α-methylbenzyl, α,α-dimethylbenzyl and the like.

$R^{33}$ is preferably tert-butyl, tert-pentyl, 1,1-dimethylhexyl, cyclohexyl or 2-methylcyclohexyl.

$R^{34}$ is preferably methyl, tert-butyl or tert-pentyl.

Each $R^{35}$ is the same or different and is hydrogen atom or alkyl having 1 to 8 carbon atoms. The alkyl having 1 to 8 carbon atoms may be linear or branched and is exemplified by methyl, ethyl, propyl, isopropyl, butyl, isobutyl, sec-butyl, tert-butyl, pentyl, 2-pentyl, 3-pentyl, neopentyl, tert-pentyl, hexyl, isohexyl, heptyl, octyl, 6-methylheptyl, 1,1-dimethylhexyl, 2-ethylhexyl and the like.

$R^{35}$ is preferably hydrogen atom or methyl.

$R^{33}$, $R^{34}$ and $R^{35}$ may be the same or different.

$R^{36}$ is a direct bond, methylene, —CH ($R^{42}$)— where $R^{42}$ is alkyl having 1 to 7 carbon atoms or cycloalkyl having 5 to 8 carbon atoms, or sulfur atom. The alkyl having 1 to 7 carbon atoms at $R^{42}$ may be linear or branched, and is exemplified by methyl, ethyl, propyl, isopropyl, butyl, isobutyl, sec-butyl, tert-butyl, pentyl, 2-pentyl, 3-pentyl, neopentyl, tert-pentyl, hexyl, isohexyl, heptyl and the like. The cycloalkyl having 5 to 8 carbon atoms at $R^{42}$ is exemplified by cyclopentyl, cyclohexyl, cycloheptyl, cyclooctyl and the like.

$R^{36}$ may be preferably a direct bond, methylene or —CH ($R^{42}$)— wherein $R^{42}$ is methyl, ethyl, propyl, isopropyl, butyl, isobutylortert-butyl.

$R^{37}$ is alkylene having 2 to 8 carbon atoms, *—$R^{43}$—O—CO—$R^{44}$— or *—CO—$R^{44}$— wherein $R^{43}$ is alkylene having 1 to 8 carbon atoms, $R^{44}$ is a direct bond or alkylene having 1 to 8 carbon atoms, and * means a bond on the oxygen atom side. The alkylene having 2 to 8 carbon atoms may be linear or branched, and is exemplified by ethylene, propylene, trimethylene, tetramethylene, pentamethylene, hexamethylene, octamethylene, 2,2-dimethyl-1,3-trimethylene and the like, with preference given to trimethylene. The alkylene having 1 to 8 carbon atoms at $R^{43}$ or $R^{44}$ may be linear or branched and is exemplified by methylene, ethylene, propylene, trimethylene, tetramethylene, pentamethylene, hexamethylene, octamethylene, 2,2-dimethyl-1,3-trimethylene and the like. As $R^{43}$, ethylene is preferable. As $R^{44}$, a direct bond or ethylene is preferable.

$R^{37}$ is preferably alkylene having 2 to 8 carbon atoms or *—$R^{43}$—O—CO—$R^{44}$—, more preferably ethylene, trimethylene, 2,2-dimethyl-1,3-trimethylene or
*—CH$_2$CH$_2$—O—CO—CH$_2$CH$_2$—.

R$^{38}$ and R$^{40}$ are the same or different and each is hydrogen atom, alkyl having 1 to 8 carbon atoms, cycloalkyl having 5 to 8 carbon atoms, cycloalkyl having 5 to 8 carbon atoms substituted by alkyl having 1 to 4 carbon atoms, aralkyl having 7 to 12 carbon atoms or phenyl. Examples of R$^{38}$ and R$^{40}$ are those recited above for R$^{33}$ and R$^{34}$.

R$^{38}$ and R$^{40}$ are preferably hydrogen atom, methyl, ethyl, propyl, isopropyl, butyl, isobutyl, tert-butyl, sec-butyl and tert-pentyl.

One of R$^{39}$ and R$^{41}$ is hydroxyl group, alkoxy having 1 to 8 carbon atoms or aralkyloxy having 7 to 12 carbon atoms, and the other is hydrogen atom or alkyl having 1 to 8 carbon atoms. The alkoxy having 1 to 8 carbon atoms may be linear or branched and is exemplified by methoxy, ethoxy, propoxy, isopropoxy, butoxy, isobutyloxy, sec-butoxy, tert-butoxy and the like. The aralkyloxy having 7 to 12 carbon atoms contains linear or branched alkyl having 1 to 6 carbon atoms and is exemplified by benzyloxy, phenethyloxy, 3-phenylpropyloxy, α-methylbenzyloxy, α,α-dimethylbenzyloxy and the like. The alkyl having 1 to 8 carbon atoms may be linear or branched and is exemplified by methyl, ethyl, propyl, isopropyl, butyl, isobutyl, sec-butyl, tert-butyl, pentyl, 2-pentyl, 3-pentyl, neopentyl, tert-pentyl, hexyl, isohexyl, heptyl, octyl, 6-methylheptyl, 1,1-dimethylhexyl, 2-ethylhexyl and the like.

Preferably, one of R$^{39}$ and R$^{41}$ is hydroxyl group and the other is hydrogen atom or alkyl having 1 to 8 carbon atoms. More preferably, R$^{39}$ is hydroxyl group, and R$^{41}$ is hydrogen atom.

Examples of the compound of the formula (17) are as follows.

2,10-dimethyl-4,8-di-tert-butyl-6-{2-[3-(3-tert-butyl-4-hydroxy-5-methylphenyl)propionyloxy]ethoxy}-12H-dibenzo[d,g][1,3,2]dioxaphosphocin,
6-[3-(3-tert-butyl-4-hydroxy-5-methylphenyl)propoxy]-2,4,8,10-tetratert-butyldibenzo[d,f][1,3,2]dioxaphosphepin,
2,10-dimethyl-4,8-di-tert-butyl-6-[3-(3-tert-butyl-4-hydroxy-5-methylphenyl)propionyloxy]dibenzo[d,f][1,3,2]dioxaphosphepin and the like.

According to the present invention, one or more of these phosphorus antioxidants can be used in combination.

The phenolic antioxidant which is one of the constituent components of the stabilizer composition for organic polymer materials of the present invention is exemplified by a compound having one or more structures shown by the following formula (16)

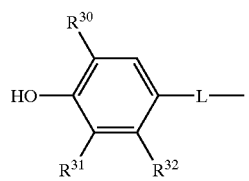

wherein R$^{30}$ is alkyl having 1 to 5 carbon atoms, R$^{31}$ is alkyl having 1 to 4 carbon atoms, R$^{32}$ is hydrogen atom or methyl, and L is

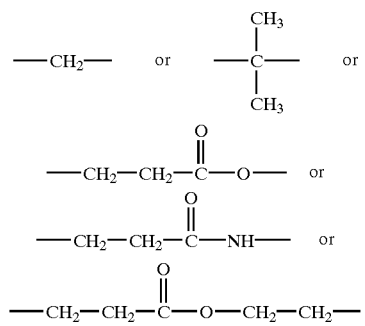

in a molecule and the like.

Specific examples of the phenolic antioxidant include, but not limited to, n-octadecyl 3-(3,5-di-tert-butyl-4-hydroxyphenyl) propionate,
tetrakis[3-(3,5-di-tert-butyl-4-hydroxyphenyl) propionyloxymethyl]methane,
1,3,5-tris(3,5-di-tert-butyl-4-hydroxybenzyl) isocyanurate,
1,3,5-trimethyl-2,4,6-tris(3,5-di-tert-butyl-4-hydroxybenzyl)benzene,
1,1,3-tris[2-methyl-4-[3-(3,5-di-tert-butyl-4-hydroxyphenyl)propionyloxy]-5-tert-butylphenyl]butane,
bis(3-tert-butyl-4-hydroxy-5-methylphenyl) dicyclopentadiene,
1,3,5-tris(4-tert-butyl-3-hydroxy-2,6-dimethylbenzyl) isocyanurate,
3,9-bis[2-[3-(3-tert-butyl-4-hydroxy-5-methylphenyl) propionyloxy]-1,1-dimethylethyl]-2,4,8,10-tetraoxaspiro [5.5]undecane,
2,6-di-tert-butyl-4-methylphenol,
2,4-dimethyl-6-tert-butylphenol,
2,6-di-tert-butyl-4-hydroxymethylphenol,
2,6-di-tert-butyl-4-ethylphenol,
2,4,6-tri-tert-butylphenol,
butylated hydroxyanisole,
isooctyl 3-(4-hydroxy-3,5-di-tert-butylphenyl)propionate,
distearyl (4-hydroxy-3-methyl-5-tert-butyl)benzylmalonate,
2,2'-methylenebis(4-methyl-6-tert-butylphenol),
2,2'-methylenebis(4-ethyl-6-tert-butylphenol),
4,4'-methylenebis(2,6-di-tert-butylphenol),
2,2'-butylidenebis(4-ethyl-6-tert-butylphenol),
4,4'-butylidenebis(3-methyl-6-tert-butylphenol),
2,2'-thiobis(4-methyl-6-tert-butylphenol),
4,4'-thiobis(3-methyl-6-tert-butylphenol),
styrenated phenol,
N,N'-hexamethylenebis(3,5-di-tert-butyl-4-hydroxyhydrocynnamide),
bis(3,5-di-tert-butyl-4-hydroxybenzylphosphonic acid ethyl) calcium,
1,1,3-tris(2-methyl-4-hydroxy-5-tert-butylphenyl)butane,
1,6-hexanediol-bis[3-(3,5-di-tert-butyl-4-hydroxyphenyl) propionate],
2,2'-methylenebis(4-methyl-6-cyclohexylphenol),
2,2'-methylenebis[6-(1-methylcyclohexyl)-4-methylphenol],
triethylene glycol-bis[3-(3-tert-butyl-4-hydroxy-5-methylphenyl)propionate],
ethylene glycol-bis(3,3-bis(3-tert-butyl-4-hydroxyphenyl) butyrate),
2-tert-butyl-6-(3-tert-butyl-5-methyl-2-hydroxybenzyl)-4-methylphenyl acrylate,
2,2'-oxamido-bis[ethyl 3-(3,5-di-tert-butyl-4-hydroxyphenyl)propionate], 6-(4-hydroxy-3,5-di-tert-butylanilino)-2,4-dioctylthio-1,3,5-triazine, bis[2-tert-butyl-4-methyl-6-(2-hydroxy-3-tert-butyl-5-methylbenzyl)phenyl] terephthalate, 3,9-bis[2-[3-(3,5-di-tert-butyl-4-hydroxyphenyl)propionyloxy]-1,1-dimethylethyl]-2,4,8,10-tetraoxaspiro[5.5]undecane, 1,3,5-tris[3-(3,5-di-tert-butyl-4-hydroxyphenyl)propionyloxy]ethyl isocyanate, 2,2-thiodiethylene-bis[3-(3,5-di-tert-butyl-4-hydroxyphenyl)propionate], 2-[1-(2-hydroxy-3,5-di-tert-pentylphenyl)ethyl]-4,6-di-tert-pentylphenyl acrylate, 1,3,5-tris(4-tert-butyl-3-hydroxy-2,6-dimethylbenzyl) isocyanurate, 2,4-di-octylthiomethyl-6-methylphenol and the like, as well as respective compounds of propyl gallate, octyl gallate or dodecyl gallate.

Preferable phenolic antioxidant is exemplified by n-octadecyl 3-(3,5-di-tert-butyl-4-hydroxyphenyl) propionate, tetrakis[3-(3,5-di-tert-butyl-4-hydroxyphenyl)propionyloxymethyl]methane, 1,3,5-tris(3,5-di-tert-butyl-4-hydroxybenzyl) isocyanurate, 1,3,5-trimethyl-2,4,6-tris(3,5-di-tert-butyl-4-hydroxybenzyl)benzene, 1,1,3-tris[2-methyl-4-[3-(3,5-di-tert-butyl-4-hydroxyphenyl)propionyloxy]-5-tert-butylphenyl]butane, 2,4-di-octylthiomethyl-6-methylphenol bis(3-tert-butyl-4-hydroxy-5-methylphenyl) dicyclopentadiene, 1,3,5-tris(4-tert-butyl-3-hydroxy-2,6-dimethylbenzyl) isocyanurate, 3,9-bis[2-[3-(3-tert-butyl-4-hydroxy-5-methylphenyl)propionyloxy]-1,1-dimethylethyl]-2,4,8,10-tetraoxaspiro[5.5]undecane and the like.

Particularly preferable phenolic antioxidant is exemplified by, but not limited to, n-octadecyl 3-(3,5-di-tert-butyl-4-hydroxyphenyl) propionate, tetrakis[3-(3,5-di-tert-butyl-4-hydroxyphenyl)propionyloxymethyl]methane, 1,3,5-tris(3,5-di-tert-butyl-4-hydroxybenzyl) isocyanurate, 1,3,5-trimethyl-2,4,6-tris(3,5-di-tert-butyl-4-hydroxybenzyl)benzene and the like.

According to the present invention, one or more of these phenolic antioxidants can be used in combination.

The organic polymer to be stabilized by the inventive stabilizer composition is exemplified by synthetic organic polymer and natural organic polymer.

The synthetic organic polymer is exemplified by synthetic resin such as thermoplastic resin, thermosetting resin and the like.

The thermoplastic resin is exemplified by olefin resin, halogen-containing polymer, styrene resin, acrylic resin, thermoplastic polyester resin, polyamide resin, aromatic polycarbonate resin, polyacetal resin, polyethylene oxide resin, polyphenylene ether resin, polysulfone resin, polyurethane resin, petroleum resin, polyvinyl acetate resin, vinyl acetal resin, cellulose resin, polyether sulfone resin, polyphenylene sulfide resin, polyether ketone resin, polyether imide resin, polyoxybenzoyl resin, polyimide resin, polymaleimide resin, polyamide-imide resin, polyarylate resin, fluororesin, ionomer, thermoplastic elastomer and the like, and mixtures thereof.

The aforementioned olefin resin is exemplified by homopolymer of α-olefin having 2 to 8 carbon atoms (e.g., low density polyethylene, linear low density polyethylene, medium density polyethylene, high density polyethylene, ultra high molecular weight polyethylene, polypropylene, polybutene-1, polypentene, poly-3-methylbutylene and the like); α-olefin copolymer (e.g., ethylene-propylene random copolymer, ethylene-propylene block copolymer, ethylene-butene-1 random copolymer, propylene-ethylene-butene-1 random copolymer and the like); copolymer of α-olefin and other monomer (e.g., maleic anhydride modified polypropylene, ethylene-vinyl acetate copolymer and the like), and the like. Two or more kinds thereof or a mixture of these and other compatible polymer may be used.

These olefin resins may be one obtained by removing a catalyst residue after polymerization and thus somewhat purified, one obtained by relatively high purification, olefin resin containing a catalyst residue, which is obtained by using a highly active catalyst but without a catalyst removal step or with a simplified catalyst removal step, or particularly crystalline olefin resin obtained by using a Ziegler catalyst using a halogen-containing magnesium compound as a catalyst carrier or a chromium catalyst and without a catalyst residue removal step (see JP-B-62-4418 and 3-56245, U.S. Pat. No. 4,115,639). In addition, it may be an olefin resin having a very narrow molecular weight distribution, which is obtained using a metallocene single site catalyst (Journal of Polymer Science. Polymer Chemistry Edition, Vol. 23, p. 2151 (1985)).

The above-mentioned halogen-containing polymer is, for example, polyvinyl chloride, poylvinylidene chloride, polyvinyl fluoride, polyvinylidene fluoride, vinyl chloride-acrylic acid alkyl ester copolymer, chlorinated polyethylene and the like.

The above-mentioned styrene resin is, for example, polystyrene, high-impact polystyrene, styrene-acrylonitrile copolymer, styrene-MMA copolymer, ABS resin, AES resin, ACS resin, AAS resin, EES resin and the like, and mixtures thereof and the like.

The above-mentioned acrylic resin is, for example, polyacrylate, polymethacrylate and the like.

The above-mentioned thermoplastic polyester resin is, for example, polyethylene terephthalate, polybutylene terephthalate and the like.

The above-mentioned polyamide resin is, for example, nylon 4, nylon 6, nylon 4/6, nylon 6/6, nylon 6/10, nylon 7, nylon 8, nylon 12, nylon 6/12, nylon 11/12, aramid and the like, mixtures of these and the like.

The thermosetting resin is, for example, unsaturated polyester resin, phenol resin, urea resin, melamine resin, epoxy resin, polyimide resin, silicone resin, diallyl phthalate resin, polyurethane resin, furan resin and the like.

In addition, the natural organic polymer is, for example, a natural rubber, a protein, a derivative of a cellulose and the like, mineral oil, animal or vegetable oil, wax, fats and oils and the like.

The organic polymer to be used for the inventive organic polymer material composition is particularly polyolefin resin, more particularly an α-olefin homopolymer or an α-olefin copolymer. When a stabilizer composition of the present invention is added to such organic polymer, a superior antioxidant effect can be achieved. The most preferable polyolefin resin is polyethylene or polypropylene.

The 6-hydroxychroman compound of the formula (1)

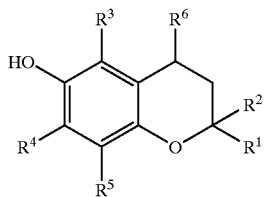

wherein $R^1$ is alkyl having 1 to 5 carbon atoms or alkenyl having 2 to 5 carbon atoms, $R^2$ is alkyl having 1 to 5 carbon atoms, $R^3$, $R^4$ and $R^5$ are the same or different and each is hydrogen atom or alkyl having 1 to 4 carbon atoms, and $R^6$ is hydrogen atom or alkyl having 1 to 5 carbon atoms, to be used in the present invention can be synthesized according to the method described in JP-B-45-23146.

In the present invention, a compound of the formula

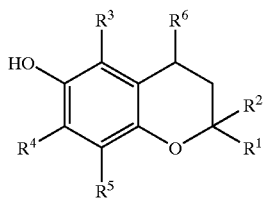

wherein $R^1$ is alkyl having 1 to 6 carbon atoms or alkenyl having 2 to 6 carbon atoms, $R^2$ is methyl, $R^3$, $R^4$, $R^5$ and $R^6$ are the same or different and each is hydrogen atom or alkyl having 1 to 4 carbon atoms, can be used as a 6-hydroxychroman compound.

The above-mentioned phosphorus antioxidant and phenolic antioxidant are known compounds, most of which are commercially available as antioxidants and can be obtained easily. The phosphorus antioxidant of the formula (17) can be synthesized according to the method described in JP-A-11-222493.

The proportions of the 6-hydroxychroman compound (component (a)) of the formula (1) and phenolic antioxidants (component (b)) and phosphorus antioxidants (component (c)), relative to the total amount of the components (a), (b) and (c), is 0.5 wt %–10 wt % of component (a), 99.5 wt %–90 wt % of the total amount of component (b) and component (c), preferably 1.0 wt %–10 wt % of component (a), 99.0 wt %–90 wt % of the total amount of component (b) and component (c), more preferably 1 wt %–8 wt % of component (a), 99 wt %–92 wt % of the total amount of component (b) and component (c), more preferably 1 wt %–6.5 wt % of component (a), 99 wt %–93.5 wt % of the total amount of component (b) and component (c), particularly preferably 1.0 wt %–5.5 wt % of component (a), 99.0 wt %–94.5 wt % of the total amount of component (b) and component (c), and most preferably 1.0 wt %–4.5 wt % of component (a), 99.0 wt %–95.5 wt % of the total amount of component (b) and component (c), from the economical aspect.

Alternatively, the component (a) may be contained in a proportion of 1 wt %–20 wt %, and the total amount of the component (b) and the component (c) may be 99 wt %–80 wt %, relative to the total amount of the component (a), the component (b) and the component (c).

By using the inventive stabilizer composition for organic polymer material containing the 6-hydroxychroman compound of the formula (1) in a small amount in the above-mentioned range, an organic polymer material hardly colored and is superior in stability during processing can be obtained.

In the present invention, the weight ratio of component (b):component (c) is 9:1–1:9, preferably 4:1–1:4, more preferably 1:0.3–1:3, still more preferably 1:0.5–1:2.

By using the inventive stabilizer composition for organic polymer material having the weight ratio of the component (b) and the component (c) within the above-mentioned range, an organic polymer material superior in coloring prevention and stability during processing can be obtained.

The inventive stabilizer composition for organic polymer material has a content of the 6-hydroxychroman compound of the formula (1) of 0.0005 part by weight–0.025 part by weight, preferably 0.0005 part by weight–0.0100 part by weight, more preferably 0.001 part by weight–0.007 part by weight, still more preferably 0.001 part by weight–0.0055 part by weight, relative to 100 parts by weight of the organic polymer material composition. The content is generally 0.001 part by weight–0.005 part by weight, and from the economic aspect, preferably 0.001 part by weight–0.0045 part by weight.

The total amount of the 6-hydroxychroman compound of the formula (1), a phosphorus antioxidant and a phenolic antioxidant relative to 100 parts by weight of the organic polymer material composition is 0.01 part by weight–1 part by weight, preferably 0.02 part by weight –0.2 part by weight. By setting the amount to 0.01 part by weight –1 part by weight, an organic polymer material superior in coloring preventive function and that shows superior stability during processing can be obtained.

By further adding a sulfur antioxidant to the stabilized organic polymer material composition of the present invention, an organic polymer material having more superior stability can be obtained.

The sulfur antioxidant is not particularly limited but preferred are dilauryl thiodipropionate,
lauryl stearyl thiodipropionate,
dimyristyl thiodipropionate,
distearyl thiodipropionate,
ditridecyl thiodipropionate,
tetrakis[(3-laurylthiopropionyloxy)methyl]methane,
tetrakis[(3-stearylthiopropionyloxy)methyl]methane,
bis[2-methyl-4-(3-n-alkyl($C_{12}$–$C_{14}$)thiopropionyloxy)-5-tert-butylphenyl]sulfide and the like.

The organic polymer material composition of the present invention can contain one or more sulfur antioxidants. The sulfur antioxidant can be added to an organic polymer material composition in an amount of preferably 0.005 part by weight–5 parts by weight, more preferably 0.01 part by weight–1 part by weight, per 100 parts by weight of the organic polymer material composition. When two or more kinds of the sulfur antioxidants are used, the total amount preferably falls within the above-mentioned range.

By further adding an ultraviolet absorber and a light stabilizer to the stabilized organic polymer material composition of the present invention, a more stabilized organic polymer material can be obtained.

Examples of the ultraviolet absorber and light stabilizer include salicylic acid compound, benzophenone compound, benzotriazole compound, benzoate compound, cyanoacrylate compound, nickel compound, piperidine compound and the like.

Examples of the salicylic acid compound that can be used as an ultraviolet absorber include, phenyl salicylate, p-tert-butylphenyl salicylate, p-octylphenyl salicylate and the like.

Examples of the benzophenone compound that can be used as an ultraviolet absorber include compounds such as 2,4-dihydroxybenzophenone,
2-hydroxy-4-methoxybenzophenone,
2,2'-dihydroxy-4,4'-dimethoxybenzophenone,
2-hydroxy-4-n-octyloxybenzophenone,
2-hydroxy-4-isooctyloxybenzophenone,
2-hydroxy-4-dodecyloxybenzophenone,
2-hydroxy-4-octadecyloxybenzophenone,
2-hydroxy-4-methoxy-2'-carboxybenzophenone,
bis(5-benzoyl-4-hydroxy-2-methoxyphenyl)methane,
2-hydroxy-4-methoxy-5-sulfobenzophenone trihydrate,
2,2',4,4'-tetrahydroxybenzophenone,
2-hydroxy-4-benzoyloxybenzophenone and the like.

Examples of the benzotriazole compound that can be used as an ultraviolet absorber include compounds such as 2-(2-hydroxy-5-methylphenyl)benzotriazole,
2-(2-hydroxy-3,5-di-tert-butylphenyl)benzotriazole,
2-(2-hydroxy-3-tert-butyl-5-methylphenyl)-5-chlrolobenzotriazole,
2-(2-hydroxy-3,5-di-tert-butylphenyl)-5-chlorobenzotriazole,
2-[2-hydroxy-5-(1,1,3,3-tetramethylbutyl)phenyl]benzotriazole,
2-[2-hydroxy-3,5-bis(α,α-dimethylbenzyl)phenyl]-2H-benzotriazole,
condensate of methyl 3-[3-tert-butyl-5-(2H-benzotriazol-2-yl)-4-hydroxyphenyl]propionate and polyethylene glycol,
2-(2-hydroxy-3,5-di-tert-amylphenyl)benzotriazole,
2,2-methylenebis[4-(1,1,3,3-tetramethylbutyl)-6-(2H-benzotriazol-2-yl)phenol],
2-(2-hydroxy-5-tert-octylphenyl)benzotriazole,
2-[2-hydroxy-3-(3,4,5,6-tetrahydrophthalimidomethyl)-5-methylphenyl]benzotriazole and the like.

Examples of the benzoate compound that can be used as a light stabilizer include compounds such as n-hexadecyl 3,5-di-tert-butyl-4-hydroxybenzoate,
2,4-di-tert-butylphenyl 3,5-di-tert-butyl-4-hydroxybenzoate and the like.

Examples of the cyanoacrylate compound that can be used as an ultraviolet absorber include compounds such as ethyl 2-cyano-3,3-diphenylacrylate,
octyl 2-cyano-3,3-diphenylacrylate and the like.

Examples of the nickel compound that can be used as an ultraviolet absorber include compounds such as 2-ethylhexylamine nickel,
nickel dimethyldithiocarbamate,
[2,2'-thiobis[4-(1,1,3,3-tetramethylbutyl)phenolate]]-n-butylamine nickel,
[2,2-thiobis[4-(1,1,3,3-tetramethylbutyl)phenolate]] nickel and the like.

Examples of the piperidine compound that can be used as a light stabilizer include compounds such as bis(2,2,6,6-tetramethyl-4-piperidyl) sebacate,
bis(1-octyloxy-2,2,6,6-tetramethyl-4-piperidyl) sebacate,
bis(1,2,2,6,6-pentamethyl-4-piperidyl)-2-(3,5-di-tert-butyl-4-hydroxybenzyl)-2-n-butylmalonate,
tetrakis(2,2,6,6-tetramethyl-4-piperidyl)-1,2,3,4-butanetetracarboxylate,
tetrakis(1,2,2,6,6-pentamethyl-4-piperidyl)-1,2,3,4-butanetetracarboxylate,
poly[[6-(1,1,3,3-tetramethylbutyl)imino-s-triazine-2,4-diyl][(2,2,6,6-tetramethyl-4-piperidyl)imino]hexamethylene-[(2,2,6,6-tetramethyl-4-piperidyl)imino]],
poly[(6-morpholino-s-triazine-2,4-diyl)[(2,2,6,6-tetramethyl-4-piperidyl)imino]hexamethylene[(2,2,6,6-tetramethyl-4-piperidyl)imino]](cyanuric chloride/tert-octylamine/1,6-bis(2,2,6,6-tetramethyl-4-piperidylamino)hexane condensate),
1-hydroxyethyl-2,2,6,6-tetramethyl-4-piperidinol/succinic acid condensate,
N,N'-bis(3-aminopropyl)ethyldiamine/2,4-bis[N-butyl-N-(1,2,2,6,6-pentamethyl-4-piperidyl)amino]-6-chloro-1,3,5-triazine condensate and the like.

Examples of preferable compound that can be used as an ultraviolet absorber and light stabilizer include compounds such as 2-hydroxy-4-n-octyloxybenzophenone,
2-(2-hydroxy-5-methylphenyl)benzotriazole,
2-(2-hydroxy-3-tert-butyl-5-methylphenyl)-5-chlorobenzotriazole,
2-(2-hydroxy-3,5-di-tert-butylphenyl)-5-chlorobenzotriazole,
bis(2,2,6,6-tetramethyl-4-piperidyl) sebacate,
poly[[6-(1,1,3,3-tetramethylbutyl)imino-s-triazine-2,4-diyl][(2,2,6,6-tetramethyl-4-piperidyl)imino]hexamethylene-[(2,2,6,6-tetramethyl-4-piperidyl)imino]](cyanuric chloride/tert-octylamine/1,6-bis(2,2,6,6-tetramethyl-4-piperidylamino)hexane condensate) and the like.

The organic polymer material composition of the present invention can contain one or more kinds of ultraviolet absorbers or light stabilizers. The ultraviolet absorber or light stabilizer can be added in an amount of preferably 0.005 part by weight–5 parts by weight, more preferably 0.01 part by weight–1 part by weight, per 100 parts by weight of organic polymer material composition. When two or more kinds of ultraviolet absorbers or light stabilizers are used, the total amount thereof is preferably within the above-mentioned range.

Where necessary, one or more kinds of other additives, that do not markedly impair the properties of the stabilized organic polymer material composition of the present invention, can be used concurrently, such as hydrotalcites, metal soap (e.g., calcium stearate), heavy metal inactivating agent (e.g., hydrazine compound), organic tin stabilizer [e.g., monoalkyltin tris(octyl thioglycolate), dialkyltin bis(octyl thioglycolate), monoalkyltin tris(monoalkyl maleate) and dialkyltin bis(monoalkyl maleate)], epoxy compound (e.g., epoxidized soybean oil and epoxyoctyl stearate), various organic pigments, flame retardant (e.g., phosphate), antistatic agent (e.g., cationic or anionic surfactant), lubricant (e.g., fatty acid amide and lower alcohol esters of fatty acid), acrylic polymer processing aid, plasticizer (e.g., di-2-ethylhexyl phthalate and di-2-ethylhexyl adipate), filler (e.g., aluminum oxide), blowing agent (e.g., sodium bicarbonate and azodicarbonamide) and the like.

The stabilized organic polymer material composition of the present invention can, where necessary, contain crystalline nucleating agent, clarifying agent and the like.

Examples of the crystalline nucleating agent and clarifying agent include, bis(p-tert-butyl benzoate)hydroxyalminum,
sodium bis(4-tert-butylphenyl)phosphate,
sodium 2,2'-methylenebis(4,6-di-tert-butylphenyl) phosphate, dibenzylidenesorbitol,
2,2'-methylenebis(4,6-di-tert-butylphenyl)phosphate hydroxyaluminum,
a composition containing 2,2'-methylenebis(4,6-di-tert-butylphenyl)phosphate hydroxyaluminum and lithium stearate (1:1),
bis(p-methylbenzylidene)sorbitol,
bis(p-ethylbenzylidene)sorbitol,
bis(p-chlorobenzylidene)sorbitol and the like.

The organic polymer material composition of the present invention can be prepared by mixing a 6-hydroxychroman compound, a phenolic antioxidant, a phosphorus antioxidant, and where necessary, a sulfuric antioxidant, an ultraviolet absorber, a light stabilizer or other additive, upon weighing predetermined amounts thereof, with an organic polymer. Alternatively, a 6-hydroxychroman compound, a phenolic antioxidant, a phosphorus antioxidant, and where necessary, a sulfuric antioxidant, an ultraviolet absorber, a light stabilizer or other additive are mixed upon weighing predetermined amounts thereof, to give the stabilizer composition of the present invention. The obtained stabilizer composition is mixed with an organic polymer to give the organic polymer material composition of the present invention. The organic polymer material composition may be kneaded after mixing or may be subjected to extrusion and the like.

For mixing, a mixer conventionally used for mixing additives with an organic polymer, such as a ball mill, a pebble mill, a tumbling mixer, a change-can mixer, a super-mixer (Henschel mixer) and the like can be used. For admixing, a kneader conventionally used for kneading additives with an organic polymer, such as a mixing roll, a Banbury mixer, a Σ blade mixer, a high-speed biaxial continuous mixer, an extruder type kneader and the like can be used.

The organic polymer material composition thus obtained can be formed into a desired product by various molding methods conventionally known for organic polymer material, such as an injection molding method, an extrusion molding method, a calendar molding method, a blow molding method, a compression molding method and the like. The product is free of particular limitation, and may be used outdoor or indoor, which use is specifically exemplified by parts of electric appliances, parts of electronic products, parts of agricultural machinery, products for agricultural use, parts of fishery machines, products for fishery use, parts of automobile vehicles, daily needs, sundries and the like.

EXAMPLES

The present invention is explained in more detail in the following by referring to examples. The present invention is not limited in any way by these examples.

As a fluidity scale, melt index (hereinafter also referred to as MI) is industrially used predominantly for anticipating a forming processability of an organic polymer material or for indication of standard and quality control. MI shows a flow rate in weight (unit: g) for 10 min when a high molecular weight polymer melted at a given temperature is extruded from a circular die having standard length and diameter by applying a certain load, and is used as an index of melt viscosity. Of the high molecular weight polymers, polypropylene having a smaller MI value has better stability during processing, and that having a greater MI value has poor stability during processing. polymer showing less variation in the values upon repeat measurements of MI is considered to have greater MI retention effect and to be superior in the stability during processing.

When an additive is kneaded into an organic polymer material, the yellowness index (hereinafter also referred to as YI) is also widely used as a scale for evaluating discoloration. Yellowness index (YI) is measured by colorimeter, wherein a greater value means greater discoloration or color development and a smaller value means less coloring during processing, and therefore, superiority.

As a fluidity scale of a high molecular weight material, MI is generally measured. As to a material such as polyethylene resin associated with the progress of degradation by both molecular crosslinking and breakage of molecules due to thermal hysteresis, however, a single evaluation of MI is not sufficient to know the degree of degradation. Therefore, changes in torque during kneading is tracked using Labo Plastomill to determine the time until the torque starts to increase (hereinafter, torque increase start time), and a greater value obtained is considered to show better heat stability.

Moreover, the storage stability of the stabilizer composition is evaluated by testing the handling property after a long term storage, residual rate of antioxidant component, and stability during processing upon addition to an organic polymer material.

The handling property is tested as follows. A given amount of an antioxidant is weighed, and thoroughly mixed in a mortar to give a composition. The composition is placed in a polyethylene bag and the bag is heat sealed. It is preserved in a thermostat at 30° C., RH 75%. After storage for a predetermined time, the bag is taken out from the thermostat and cooled. The stabilizer composition was touched with hand after cooling to see if the composition is felt sticky, based on which the handling property is evaluated.

Synthetic Example 1

Production Example of 2,2,5,7,8-pentamethyl-6-hydroxychroman

In a 50 ml four-necked flask were charged 2,3,5-trimethylhydroquinone (5.0 g), zinc chloride (0.8 g), acetic acid (0.35 ml), methyl ethyl ketone (4 ml) and toluene (15 ml) and the mixture was heated. At 100° C., a solution of isoprene (2.5 g) in toluene (5 ml) was added dropwise under reflux over 2 hr. After the dropwise addition, the mixture was refluxed for 4 more hours and cooled to room temperature. The reaction mixture was transferred to a partition funnel, and, after washing 3 times with 50 ml of water, the solvent was evaporated to give 6.5 g of an oily substance.

This was recrystallized from petroleum ether (50 ml) to give 2.5 g of needle crystals of 2,2,5,7,8-pentamethyl-6-hydroxychroman (melting point 94–95° C.).

| Elemental analysis | carbon atom, | hydrogen atom |
|---|---|---|
| Calculated | 76.33% | 9.15% |
| Found | 76.34% | 9.10% |

Example 1

The mixtures shown in Table 1 were dry mixed for 5 min in a tumbler mixer. A strand was extruded from a 20 mm diameter extruder (die temperature set to 280° C.), cooled with water and cut to give pellets. This step was repeated 4 times. The stability during processing was evaluated by measuring, according to JIS K 7210, melt index (MI) of the pellets extruded each time. The temperature for measurement was 230° C. and measurement load was 2.16 kgf. The pellets extruded each time were measured for yellowness index (YI) according to JIS K 7103.

The symbols used in Table 1 are as follows.
PP: polypropylene (homopolymer)
Ca-St: calcium stearate
P-101: tetrakis(2,4-di-tert-butyl-5-methylphenyl)-4,4'-biphenylenediphosphonite (manufactured by Yoshitomi Fine Chemicals Ltd., trademark: GSY-P101)
T-TT: tetrakis[3-(3,5-di-tert-butyl-4-hydroxyphenyl)propionyloxymethyl]methane (manufactured by Yoshitomi Fine Chemicals Ltd., trademark: Tominox TT)
S-12: 2,2,5,7,8-pentamethyl-6-hydroxychroman (synthesized in Synthetic Example 1)
MI1: MI value of pellets obtained for the first time.
MI2: MI value of pellets obtained for the fourth time.
YI1: YI value of pellets obtained for the first time.
YI4: YI value of pellets obtained for the fourth time.

The mixing ratios were, as shown in Table 1, that polypropylene (homopolymer) was 99.825 parts by weight, calcium stearate was 0.075 part by weight, the total amount of a phosphorus antioxidant (P101), a phenolic antioxidant (T-TT) and a 6-hydroxychroman compound (S-12) was 0.100 part by weight, S-12 was not added or added in 9 proportions within 0.0002 part by weight–0.0150 part by weight, and the phosphorus antioxidant content and the phenolic antioxidant content were calculated to be equal according to "(0.100 part by weight-(S-12 content))÷2" (parts by weight).

From the results shown in Table 1, it is known that, when the S-12 content relative to the total content of P101, T-TT and S-12 is 15 wt % (Mixture 10), the YI value increased remarkably to show noticeable coloring; when it was not less than 10 wt % (Mixtures 9, 10), MI value was barely improved; when it was 0.5 wt % (Mixture 3), MI value and YI value both showed slight effect but not enough; and when it was 0.2 wt % (Mixture 2), neither MI value or YI value showed any effects.

Therefore, the S-12 content relative to the total content of P101, T-TT and S-12 was known to be 0.5 wt %–10 wt % (Mixtures 3, 4, 5, 6, 7, 8, 9), preferably 1.0 wt %–8.0 wt % (Mixtures 4, 5, 6, 7, 8), more preferably 1 wt %–5.5 wt % (Mixtures 4, 5, 6), still more preferably 1 wt %–4.5 wt % (Mixtures 4, 5), at which range coloring hardly occurs, and a composition having a significantly improved stability during processing can be obtained.

TABLE 1

| | Mixtures | PP | Ca-St | (a) synergist (including Comp. Ex.) kind | amount | (b) phosphorus antioxidant kind | amount | (c) phenolic antioxidant kind | amount | (b):(c) weight ratio | Total amount added | Synergist (wt %) in antioxidant | Synergist (ppm) in organic polymer composition | MI1 | MI4 | YI1 | YI4 |
|---|---|---|---|---|---|---|---|---|---|---|---|---|---|---|---|---|---|
| Comp. Ex. | Mixture 1 | 99.825 | 0.075 | S-12 | 0 | P101 | 0.05000 | T-TT | 0.05000 | 1:1 | 0.100 | 0 | 0 | 3.1 | 11 | 1.6 | 9.3 |
| | Mixture 2 | 99.825 | 0.075 | S-12 | 0.0002 | P101 | 0.04990 | T-TT | 0.04990 | 1:1 | 0.100 | 0.2 | 2 | 3.0 | 10 | 1.7 | 9.0 |
| Ex. | Mixture 3 | 99.825 | 0.075 | S-12 | 0.0005 | P101 | 0.04975 | T-TT | 0.04975 | 1:1 | 0.100 | 0.5 | 5 | 3.0 | 7.5 | 1.7 | 8.4 |
| | Mixture 4 | 99.825 | 0.075 | S-12 | 0.0010 | P101 | 0.04950 | T-TT | 0.04950 | 1:1 | 0.100 | 1.0 | 10 | 2.9 | 5.9 | 1.8 | 8.4 |
| | Mixture 5 | 99.825 | 0.075 | S-12 | 0.0045 | P101 | 0.04775 | T-TT | 0.04775 | 1:1 | 0.100 | 4.5 | 45 | 2.8 | 4.9 | 2.0 | 8.3 |
| | Mixture 6 | 99.825 | 0.075 | S-12 | 0.0055 | P101 | 0.04725 | T-TT | 0.04725 | 1:1 | 0.100 | 5.5 | 55 | 2.7 | 4.9 | 2.6 | 8.3 |
| | Mixture 7 | 99.825 | 0.075 | S-12 | 0.0070 | P101 | 0.04650 | T-TT | 0.04650 | 1:1 | 0.100 | 7.0 | 70 | 2.7 | 5.5 | 2.6 | 9.3 |
| | Mixture 8 | 99.825 | 0.075 | S-12 | 0.0080 | P101 | 0.04600 | T-TT | 0.04600 | 1:1 | 0.100 | 8.0 | 80 | 2.6 | 5.5 | 3.3 | 10 |
| | Mixture 9 | 99.825 | 0.075 | S-12 | 0.0100 | P101 | 0.04500 | T-TT | 0.04500 | 1:1 | 0.100 | 10.0 | 100 | 2.7 | 5.0 | 3.3 | 10 |
| Comp. Ex. | Mixture 10 | 99.825 | 0.075 | S-12 | 0.0150 | P101 | 0.04250 | T-TT | 0.04250 | 1:1 | 0.100 | 15.0 | 150 | 2.8 | 6.3 | 5.2 | 18 |

Example 2

In the same manner as in Example 1, melt index (MI) was measured.

able effect. When a phosphorus antioxidant was not mixed (Mixtures 1, 2) and when a phenolic antioxidant was not mixed (Mixtures 13, 14) are shown as Comparative Examples.

TABLE 2

| | | | | Amount added (parts by weight) | | | | | | | Synergist (ppm) in | | | |
|---|---|---|---|---|---|---|---|---|---|---|---|---|---|---|
| | | | | | Antioxidant | | | | | | | | | |
| | | | | (a) synergist (including Comp. Ex.) | | (b) phosphorus antioxidant | | (c) phenolic antioxidant | | (b):(c) weight ratio | Total amount added | Synergist (wt %) in antioxidant | organic polymer composition | MI1 | MI4 |
| | Mixtures | PP | Ca-St | kind | amount | kind | amount | kind | amount | | | | | | |
| Comp. Ex. | Mixture 1 | 99.825 | 0.075 | S-12 | 0.0045 | — | — | T-TT | 0.09550 | 0:1 | 0.100 | 4.5 | 45 | 4.6 | X |
| | Mixture 2 | 99.825 | 0.075 | S-12 | 0 | — | — | T-TT | 0.10000 | 0:1 | 0.100 | 0 | 0 | 6.1 | X |
| Ex. | Mixture 3 | 99.825 | 0.075 | S-12 | 0.0045 | P101 | 0.00955 | T-TT | 0.08595 | 1:9 | 0.100 | 4.5 | 45 | 4.3 | 11 |
| Comp. Ex. | Mixture 4 | 99.825 | 0.075 | S-12 | 0 | P101 | 0.01000 | T-TT | 0.09000 | 1:9 | 0.100 | 0 | 0 | 4.1 | 17 |
| Ex. | Mixture 5 | 99.825 | 0.075 | S-12 | 0.0045 | P101 | 0.01910 | T-TT | 0.07640 | 2:8 | 0.100 | 4.5 | 45 | 3.0 | 7.6 |
| Comp. Ex. | Mixture 6 | 99.825 | 0.075 | S-12 | 0 | P101 | 0.02000 | T-TT | 0.08000 | 2:8 | 0.100 | 0 | 0 | 4.0 | 15 |
| Ex. | Mixture 7 | 99.825 | 0.075 | S-12 | 0.0045 | P101 | 0.04775 | T-TT | 0.04775 | 1:1 | 0.100 | 4.5 | 45 | 2.8 | 4.9 |
| Comp. Ex. | Mixture 8 | 99.825 | 0.075 | S-12 | 0 | P101 | 0.05000 | T-TT | 0.05000 | 1:1 | 0.100 | 0 | 0 | 3.1 | |
| Ex. | Mixture 9 | 99.825 | 0.075 | S-12 | 0.0045 | P101 | 0.07640 | T-TT | 0.01910 | 8:2 | 0.100 | 4.5 | 45 | 2.8 | 5.1 |
| Comp. Ex | Mixture 10 | 99.825 | 0.075 | S-12 | 0 | P101 | 0.08000 | T-TT | 0.02000 | 8:2 | 0.100 | 0 | 0 | 4.5 | 19 |
| Ex. | Mixture 11 | 99.825 | 0.075 | S-12 | 0.0045 | P101 | 0.08595 | T-TT | 0.00955 | 9:1 | 0.100 | 4.5 | 45 | 2.9 | 6.2 |
| Comp. Ex. | Mixture 12 | 99.825 | 0.075 | S-12 | 0 | P101 | 0.09000 | T-TT | 0.01000 | 9:1 | 0.100 | 0 | 0 | 4.7 | X |
| Comp. Ex. | Mixture 13 | 99.825 | 0.075 | S-12 | 0.0045 | P101 | 0.09550 | — | — | 1:0 | 0.100 | 4.5 | 45 | 4.2 | X |
| | Mixture 14 | 99.825 | 0.075 | S-12 | 0 | P101 | 0.10000 | — | — | 1:0 | 0.100 | 0 | 0 | 6.0 | X |

The mixing ratio and the symbols used in Table 2 are explained in the following.

PP:polypropylene (homopolymer)
Ca-St:calcium stearate
P-101:tetrakis(2,4-di-tert-butyl-5-methylphenyl)-4,4'-biphenylenediphosphonite (manufactured by Yoshitomi Fine Chemicals Ltd., trademark: GSY-P101)
T-TT:tetrakis[3-(3,5-di-tert-butyl-4-hydroxyphenyl)propionyloxymethyl]methane (manufactured by Yoshitomi Fine Chemicals Ltd., trademark: Tominox TT)
S-12:2,2,5,7,8-pentamethyl-6-hydroxychroman
MI1: MI value of pellets obtained for the first time.
MI4: MI value of pellets obtained for the fourth time.
X: means that the resin was degraded and pellets could not be obtained after extrusion of strands.

The mixing ratios were, as shown in Table 2, polypropylene (homopolymer) was 99.825 parts by weight, calcium stearate was 0.075 part by weight, the total amount of a phosphorus antioxidant (P101), a phenolic antioxidant (T-TT) and a 6-hydroxychroman compound (S-12) was 0.100 part by weight, S-12 was not added or added in a proportion of 0.0045 part by weight, and the P101 content and the T-TT content were calculated (both in parts by weight) to make the weight ratio of the phosphorus antioxidant:phenolic antioxidant 0:1, 1:9, 2:8, 1:1, 8:2, 9:1 or 1:0.

From the results shown in Table 2, it was known that, when the mixing ratio of P101:T-TT was 9:1–1:9, the compositions containing S-12 (Mixtures 3, 5, 7, 9 and 11) showed effect by concurrent use as compared to the compositions without S-12 (Mixtures 4, 6, 8, 10 and 12). Particularly, the mixing ratio of 8:2–2:8 showed more noticeable effect.

Example 3

To evaluate the heat stability of linear low density polyethylene (LLDPE) during processing, the torque increase start time was measured in the following manner. The Mixture shown in Table 3 was weighed and mixed in a beaker. Using Labo Plastomill (type 50C-150, manufactured by TOYOSEIKI CORPORATION), the torque increase start time was measured by mixing at 210° C., 60 rpm.

The mixing ratio and the symbols used in Table 3 are explained in the following.
LLDPE:linear low density polyethylene
Ca-St:calcium stearate
P101:tetrakis(2,4-di-tert-butyl-5-methylphenyl)-4,4'-biphenylenediphosphonite (manufactured by Yoshitomi Fine Chemicals Ltd., trademark: GSY-P101)
PEPQ:tetrakis(2,4-di-tert-butylphenyl)-4,4'-biphenylenediphosphonite (manufactured by Clariant, trademark:Sandostab P-EPQ)
T-SS:n-octadecyl 3-(3,5-di-tert-butyl-4-hydroxyphenyl)propionate (manufactured by Yoshitomi Fine Chemicals Ltd., trademark: Tominox SS)
S-12:2,2,5,7,8-pentamethyl-6-hydroxychroman The mixing ratios were, as shown in Table 3, that linear low density polyethylene was 99.825 parts by weight, calcium stearate was 0.075 part by weight, a 6-hydroxychroman compound (S-12) was not added or added in a proportion of 0.003 part by weight, and the phosphorus antioxidant (P101 or PEPQ) content and the phenolic antioxidant (T-SS) content were calculated to be equal according to "(0.100 part by weight-(S-12 content))÷2" (parts by weight).

From the results shown in Table 3, it was known that the inventive compositions (Mixtures 1, 3) containing S-12 showed a torque increase start time of 3 times or more longer as compared to the Comparative Example compositions without S-12 (Mixtures 2, 4).

content and the phenolic antioxidant (T-TT) content were calculated (both in parts by weight) to make the weight ratio of the (P101): (T-TT) 2:1. As Comparative Example, a

TABLE 3

| | | | | Amount added (parts by weight) | | | | | | | Synergist (wt %) in anti-oxidant | Synergist (ppm) in organic polymer composition | Torque increase start time (min) |
|---|---|---|---|---|---|---|---|---|---|---|---|---|---|
| | | | | | Antioxidant | | | | | | | | |
| | | | | (a) synergist (including Comp. Ex.) | | (b) phosphorus antioxidant | | (c) phenolic antioxidant | | (b):(c) weight ratio | Total amount added | | | |
| | Mixtures | LLDPE | Ca-St | kind | amount | kind | amount | kind | amount | | | | | |
| Ex. | Mixture 1 | 99.825 | 0.075 | S-12 | 0.003 | P101 | 0.0485 | T-SS | 0.0485 | 1:1 | 0.100 | 3.0 | 30 | 64 |
| Comp. Ex. | Mixture 2 | 99.825 | 0.075 | S-12 | 0 | P101 | 0.0500 | T-SS | 0.0500 | 1:1 | 0.100 | 0 | 0 | 16 |
| Ex. | Mixture 3 | 99.825 | 0.075 | S-12 | 0.003 | PEPQ | 0.0485 | T-SS | 0.0485 | 1:1 | 0.100 | 3.0 | 30 | 62 |
| Comp. Ex. | Mixture 4 | 99.825 | 0.075 | S-12 | 0 | PEPQ | 0.0500 | T-SS | 0.0500 | 1:1 | 0.100 | 0 | 0 | 18 |

Example 4

In the same manner as in Example 1, melt index (MI) was measured, wherein the number of repeats was 3.

The mixing ratio and the symbols used in Table 4 are explained in the following.
PP:polypropylene (homopolymer)
Ca-St:calcium stearate
P101: tetrakis(2,4-di-tert-butyl-5-methylphenyl)-4,4'-biphenylenediphosphonite (manufactured by Yoshitomi Fine Chemicals Ltd., trademark:GSY-P101)
T-TT:tetrakis[3-(3,5-di-tert-butyl-4-hydroxyphenyl) propionyloxymethyl]methane (manufactured by Yoshitomi Fine Chemicals Ltd., trademark: Tominox TT)
S-12:2,2,5,7,8-pentamethyl-6-hydroxychroman mixture containing a benzofuranone compound (R-10) instead of a 6-hydroxychroman compound (S-12) was tested.

From the results shown in Table 4, it was known that the composition (Mixture 1) of the present invention containing 6-hydroxychroman compound (S-12) showed superior stability during processing as compared to Comparative Example Mixture 2 containing the benzofuranone compound (R-10) and noticeably improved stability during processing as compared to Comparative Example Mixture 3 without a 6-hydroxychroman compound.

TABLE 4

| | | | | Amount added (parts by weight) | | | | | | | Synergist (wt %) in antioxidant | Synergist (ppm) in organic polymer composition | | | |
|---|---|---|---|---|---|---|---|---|---|---|---|---|---|---|---|
| | | | | | Antioxidant | | | | | | | | | | |
| | | | | (a) synergist (including Comp. Ex.) | | (b) phosphorus antioxidant | | (c) phenolic antioxidant | | (b):(c) weight ratio | Total amount added | | | | |
| | Mixtures | PP | Ca-St | kind | amount | kind | amount | kind | amount | | | | | MI1 | MI2 | MI3 |
| Ex. | Mixture 1 | 99.800 | 0.100 | S-12 | 0.002 | P101 | 0.0653 | T-TT | 0.0327 | 2:1 | 0.100 | 2 | 20 | 2.8 | 3.4 | 5.4 |
| Comp. Ex. | Mixture 2 | 99.800 | 0.100 | R-10 | 0.002 | P101 | 0.0653 | T-TT | 0.0327 | 2:1 | 0.100 | 2 | 20 | 3.0 | 6.5 | X |
| Ex. | Mixture 3 | 99.800 | 0.100 | — | — | P101 | 0.0667 | T-TT | 0.0333 | 2:1 | 0.100 | 0 | 0 | 2.9 | 5.8 | X |

R-10:3-(3,4-dimethylphenyl)-5,7-di-tert-butyl-3H-benzofuran-2-one (synthesized according to the method described in JP-A-7-233160)
MI1: MI value of pellets obtained for the first time.
MI2: MI value of pellets obtained for the second time.
MI3: MI value of pellets obtained for the third time.
X: means that the resin was degraded and pellets could not be obtained after extrusion of strands.

The mixing ratios were, as shown in Table 4, that polypropylene (homopolymer) was 99.800 parts by weight, calcium stearate was 0.100 part by weight, a 6-hydroxychroman compound (S-12) was not added or added in a proportion of 0.002 part by weight, and the phosphorus antioxidant (P101)

Example 5

In the same manner as in Example 1, melt index (MI) was measured, wherein the number of repeats was 3.

The mixing ratio and the symbols used in Table 5 are explained in the following.
PEPQ:tetrakis(2,4-di-tert-butylphenyl)-4,4'-biphenylenediphosphonite (manufactured by Clariant, trademark: Sandostab P-EPQ)
T-TT:tetrakis[3-(3,5-di-tert-butyl-4-hydroxyphenyl) propionyloxymethyl]methane (manufactured by Yoshitomi Fine Chemicals Ltd., trademark: Tominox TT)
Y314:1,3,5-tris(3,5-di-tert-butyl-4-hydroxybenzyl) isocyanurate (manufactured by Yoshitomi Fine Chemicals Ltd., trademark: Yoshinox 314)

1330:1,3,5-trimethyl-2,4,6-tris(3,5-di-tert-butyl-4-hydroxybenzyl)benzene (manufactured by Yoshitomi Fine Chemicals Ltd., trademark: Yoshinox 1330)

S-2:2,2,5-trimethyl-7-tert-butyl-6-hydroxychroman

Other symbols are as shown in Example 4.

The mixing ratios are shown in Table 5. From Table 5, the compositions (Mixtures 1–3) of the present invention containing 6-hydroxychroman compound (S-2) were extremely superior in stability during processing of repeat extrusion in the following comparisons, as compared to the compositions (Comparative Example Mixtures 4–6) without 6-hydroxychroman compound.

Comparison (A): the present invention composition Mixture 1 and Comparative Example composition Mixture 4

Comparison (B): the present invention composition Mixture 2 and Comparative Example composition Mixture 5

Comparison (C): the present invention composition Mixture 3 and Comparative Example composition Mixture 6

The mixing ratio and the symbols used in Table 6 are explained in the following.

PE: polyethylene (linear polyethylene)

P101: tetrakis(2,4-di-tert-butyl-5-methylphenyl)-4,4'-biphenylenediphosphonite (manufactured by Yoshitomi Fine Chemicals Ltd., trademark: GSY-P101)

T-SS:n-octadecyl 3-(3,5-di-tert-butyl-4-hydroxyphenyl)propionate (manufactured by Yoshitomi Fine Chemicals Ltd., trademark: Tominox SS)

S-2:2,2,5-trimethyl-7-tert-butyl-6-hydroxychroman

R-10:3-(3,4-dimethylphenyl)-5,7-di-tert-butyl-3H-benzofuran-2-one (synthesized according to the method described in JP-A-7-233160)

The mixing ratios are shown in Table 6. From Table 6, it is evident that the composition (Mixture 1) of the present invention containing 6-hydroxychroman compound (S-2) showed longer torque increase start time than Comparative Example Mixture 2 containing the same amount of benzofuranone compound (R-10) or Comparative Example Mixture 3 without 6-hydroxychroman compound, and therefore, fine heat stability during processing.

TABLE 5

| | | | | Amount added (parts by weight) | | | | | | | Synergist (wt %) in antioxidant | Synergist (ppm) in organic polymer composition | | | |
|---|---|---|---|---|---|---|---|---|---|---|---|---|---|---|---|
| | | | | | | Antioxidant | | | | | | | | | |
| | | | | (a) synergist (including Comp. Ex.) | | (b) phosphorus antioxidant | | (c) phenolic antioxidant | | (b):(c) weight ratio | Total amount added | | | | | |
| | Mixtures | PP | Ca-St | kind | amount | kind | amount | kind | amount | | | | | MI1 | MI2 | MI3 |
| Ex. | Mixture 1 | 99.850 | 0.050 | S-2 | 0.005 | PEPQ | 0.0475 | T-TT | 0.0475 | 1:1 | 0.100 | 5 | 50 | 2.7 | 3.2 | 5.3 |
| Comp. Ex. | Mixture 4 | 99.850 | 0.050 | — | — | PEPQ | 0.0500 | T-TT | 0.0500 | 1:1 | 0.100 | 0 | 0 | 2.9 | 6.3 | X |
| Ex. | Mixture 2 | 99.853 | 0.050 | S-2 | 0.002 | PEPQ | 0.0475 | Y314 | 0.0475 | 1:1 | 0.097 | 2.06 | 20 | 3.0 | 6.2 | 9.5 |
| Comp. Ex. | Mixture 5 | 99.850 | 0.050 | — | — | PEPQ | 0.0500 | Y314 | 0.0500 | 1:1 | 0.100 | 0 | 0 | 4.2 | 9.8 | X |
| Ex. | Mixture 3 | 99.853 | 0.050 | S-2 | 0.002 | PEPQ | 0.0475 | 1330 | 0.0475 | 1:1 | 0.097 | 2.06 | 20 | 2.9 | 4.3 | 6.8 |
| Comp. Ex. | Mixture 6 | 99.850 | 0.050 | — | — | PEPQ | 0.0500 | 1330 | 0.0500 | 1:1 | 0.100 | 0 | 0 | 3.4 | 7.2 | X |

Example 6

To evaluate the heat stability of polyethylene (linear polyethylene) during processing, the torque increase start time was measured in the same manner as in Example 3.

TABLE 6

| | | | Amount added (parts by weight) | | | | | | | | Synergist (wt %) in antioxidant | Synergist (ppm) in organic polymer composition | Torque increase start time (min) |
|---|---|---|---|---|---|---|---|---|---|---|---|---|---|
| | | | | | Antioxidant | | | | | | | | |
| | | | (a) synergist (including Comp. Ex.) | | (b) phosphorus antioxidant | | (c) phenolic antioxidant | | (b):(c) weight ratio | Total amount added | | | |
| | Mixtures | PE | kind | amount | kind | amount | kind | amount | | | | | |
| Ex. | Mixture 1 | 100 | S-2 | 0.0095 | P101 | 0.0095 | T-SS | 0.095 | 1:1 | 0.1995 | 4.76 | 94.8 | 60 |
| Comp. Ex. | Mixture 2 | 100 | R-10 | 0.0095 | P101 | 0.095 | T-SS | 0.095 | 1:1 | 0.1995 | 4.76 | 94.8 | 52 |
| | Mixture 3 | 100 | — | — | P101 | 0.100 | T-SS | 0.100 | 1:1 | 0.200 | 0 | 0 | 22 |

Example 7

In the same manner as in Example 1, melt index (MI) was measured, wherein the number of repeats was 5.

The mixing ratio and the symbols used in Table 7 are explained in the following.

P101:tetrakis(2,4-di-tert-butyl-5-methylphenyl)-4,4'-biphenylenediphosphonite (manufactured by Yoshitomi Fine Chemicals Ltd., trademark: GSY-P101)

PEPQ:tetrakis(2,4-di-tert-butylphenyl)-4,4'-biphenylenediphosphonite (manufactured by Clariant, trademark: Sandostab P-EPQ)

T-TT:tetrakis[3-(3,5-di-tert-butyl-4-hydroxyphenyl) propionyloxymethyl]methane (manufactured by Yoshitomi Fine Chemicals Ltd., trademark: Tominox TT)

S-12:2,2,5,7,8-pentamethyl-6-hydroxychroman

MI1: MI value of pellets obtained for the first time.
MI3: MI value of pellets obtained for the third time.
MI5: MI value of pellets obtained for the fifth time.

Other symbols are as shown in Example 1.

The mixing ratios were, as shown in Table 7, that polypropylene (homopolymer) was 99.800 parts by weight, calcium stearate was 0.100 part by weight, a 6-hydroxychroman compound (S-12) was not added or added in a proportion of 0.0025 part by weight, the phosphorus antioxidant (P101) content was equal to the total content of the phenolic antioxidant (T-TT) and S-12, and the total amount of the antioxidants was 0.100 part by weight.

From Table 7, it is evident that the compositions (Mixtures 1, 2) of the present invention containing 6-hydroxychroman compound (S-12) were fine in the stability during processing of repeat extrusion, as compared to the Comparative Example compositions (Mixtures 3, 4).

Comparison (A): the present invention composition Mixture 1 and comparative Example composition Mixture 3

Comparison (B): the present invention composition Mixture 2 and Comparative Example composition Mixture 4

Example 8

The heat stability during processing was evaluated at different weight ratios of phenolic antioxidant and phosphorus antioxidant. The torque increase start time of LLDPE was measured in the same manner as in Example 3.

The mixing ratio and the symbols used in Table 8 are explained in the following.

LLDPE: linear low density polyethylene

P101:tetrakis(2,4-di-tert-butyl-5-methylphenyl)-4,4'-biphenylenediphosphonite (manufactured by Yoshitomi Fine Chemicals Ltd., trademark: GSY-P101)

T-SS:n-octadecyl 3-(3,5-di-tert-butyl-4-hydroxyphenyl) propionate (manufactured by Yoshitomi Fine Chemicals Ltd., trademark: Tominox SS)

S-12:2,2,5,7,8-pentamethyl-6-hydroxychroman

The mixing ratios were, as shown in Table 8, LLDPE was 100 parts by weight, the total amount of a phosphorus antioxidant (P101), a phenolic antioxidant (T-SS) and a 6-hydroxychroman compound (S-12) was 0.1995 part by weight, S-12 was not added or added in a proportion of 0.0095 part by weight, and the P101 content and the T-SS content were calculated (both in parts by weight) to make the weight ratio of the phosphorus antioxidant:phenolic antioxidant 1:2, 1:1 or 2:1.

From Table 8, it is evident that the compositions (Mixtures 1–3) of the present invention containing 6-hydroxychroman compound showed about 3 times longer torque increase start time than did the compositions (Mixtures 4–6) without 6-hydroxychroman compound, and therefore, superior heat stability during processing.

Comparison (A): the present invention composition Mixture 1 and Comparative Example composition Mixture 4

Comparison (B): the present invention composition Mixture 2 and Comparative Example composition Mixture 5

Comparison (C): the present invention composition Mixture 3 and Comparative Example composition Mixture 6

TABLE 7

| | | | | Amount added (parts by weight) | | | | | | | Synergist | Synergist (ppm) | | | |
| | | | | Antioxidant | | | | | | | | in | | | |
| | Mixtures | PP | Ca-St | (a) synergist (including Comp. Ex.) kind | amount | (b) phosphorus antioxidant kind | amount | (c) phenolic antioxidant kind | amount | (b):(c) weight ratio | Total amount | (wt %) in antioxidant | organic polymer composition | MI1 | MI2 | MI3 |
|---|---|---|---|---|---|---|---|---|---|---|---|---|---|---|---|---|
| Ex. | Mixture 1 | 99.800 | 0.100 | S-2 | 0.0025 | P101 | 0.0500 | T-TT | 0.0475 | 20:19 | 0.100 | 2.5 | 25 | 3.2 | 4.4 | 8.4 |
| Comp. Ex. | Mixture 3 | 99.800 | 0.100 | — | — | P101 | 0.0500 | T-TT | 0.0500 | 20:20 | 0.100 | 0 | 0 | 3.5 | 5.2 | 10 |
| Ex. | Mixture 2 | 99.800 | 0.100 | S-12 | 0.0025 | PEPQ | 0.0500 | T-TT | 0.0475 | 20:19 | 0.100 | 2.5 | 25 | 3.2 | 4.4 | 8.5 |
| Comp. Ex. | Mixture 4 | 99.800 | 0.100 | — | — | PEPQ | 0.0500 | T-TT | 0.0500 | 20:20 | 0.100 | 0 | 0 | 3.5 | 5.1 | 10 |

TABLE 8

| | | | Antioxidant | | | | | | | | Synergist (ppm) in organic polymer composition | Torque increase start time (min) |
|---|---|---|---|---|---|---|---|---|---|---|---|---|
| | | | (a) synergist (including Comp. Ex.) | | (b) phosphorus antioxidant | | (c) phenolic antioxidant | | (b):(c) weight ratio | Total amount added | Synergist (wt %) in antioxidant | | |
| | Mixtures | LLDPE | kind | amount | kind | amount | kind | amount | | | | | |
| Ex. | Mixture 1 | 100 | S-12 | 0.0095 | P101 | 0.0633 | T-SS | 0.1266 | 1:2 | 0.1995 | 4.76 | 94.8 | 62 |
| Comp. Ex. | Mixture 4 | 100 | — | — | P101 | 0.0655 | T-SS | 0.1330 | 1:2 | 0.1995 | 0 | 0 | 20 |
| Ex. | Mixture 2 | 100 | S-12 | 0.0095 | P101 | 0.0950 | T-SS | 0.0950 | 1:1 | 0.1995 | 4.76 | 94.8 | 62 |
| Comp. Ex. | Mixture 5 | 100 | — | — | P101 | 0.09975 | T-SS | 0.09975 | 1:1 | 0.1995 | 0 | 0 | 18 |
| Ex. | Mixture 3 | 100 | S-12 | 0.0095 | P101 | 0.1266 | T-SS | 0.0633 | 2:1 | 0.1995 | 4.76 | 94.8 | 60 |
| Comp. Ex. | Mixture 6 | 100 | — | — | P101 | 0.1330 | T-SS | 0.0655 | 2:1 | 0.1995 | 0 | 0 | 18 |

Example 9

In the same manner as in Example 1, melt index (MI) and yellowness index (YI) were measured.

The mixing ratio and the symbols used in Table 9 are explained in the following.

T202:tris(2,4-di-tert-butylphenyl) phosphite (manufactured by Yoshitomi Fine Chemicals Ltd., trademark: Tomiphos 202)

T-TT:tetrakis[3-(3,5-di-tert-butyl-4-hydroxyphenyl) propionyloxymethyl]methane (manufactured by Yoshitomi Fine Chemicals Ltd., trademark: Tominox TT)

S-12:2,2,5,7,8-pentamethyl-6-hydroxychroman

Other symbols are as shown in Example 1.

The mixing ratios were, as shown in Table 9, that polypropylene (homopolymer) was 99.825 parts by weight, calcium stearate was 0.075 part by weight, the total amount of a phosphorus antioxidant (T202), a phenolic antioxidant (T-TT) and a 6-hydroxychroman compound (S-12) was 0.100 part by weight, S-12 was not added or added in 9 proportions within 0.0002 part by weight–0.0150 part by weight, and the phosphorus antioxidant content and the phenolic antioxidant content were calculated to be equal according to "(0.100 part by weight-(S-12 content))÷2" (parts by weight).

From the results in Table 9, the following are known.

(1) With regard to MI, an S-12 content of not less than 10 wt % relative to the total amount of S-12, T-TT and T202 scarcely improves MI, the content of 0.5 wt % shows certain effect but not enough, the content of 0.2 wt % scarcely shows an effect. With regard to YI, the content of 15 wt % results in marked coloring. (2) Therefore, an S-12 content of 0.5–10 wt % provides a composition hardly colored and having markedly improved stability during processing.

TABLE 9

| | | | | Antioxidant | | | | | | | Synergist (wt %) in antioxidant | Synergist (ppm) in organic polymer composition | | | | |
|---|---|---|---|---|---|---|---|---|---|---|---|---|---|---|---|---|
| | Mixtures | PP | Ca-St | (a) synergist (including Comp. Ex.) | | (b) phosphorus antioxidant | | (c) phenolic antioxidant | | (b):(c) weight ratio | Total amount added | | | MI1 | MI4 | YI1 | YI4 |
| | | | | kind | amount | kind | amount | kind | amount | | | | | | | | |
| Comp. Ex. | Mixture 1 | 99.825 | 0.075 | S-12 | 0 | T202 | 0.05000 | T-TT | 0.05000 | 1:1 | 0.100 | 0 | 0 | 4.6 | 18 | 2.0 | 13 |
| | Mixture 2 | 99.825 | 0.075 | S-12 | 0.0002 | T202 | 0.04990 | T-TT | 0.04990 | 1:1 | 0.100 | 0.2 | 2 | 4.5 | 16 | 2.1 | 11 |
| Ex. | Mixture 3 | 99.825 | 0.075 | S-12 | 0.0005 | T202 | 0.04975 | T-TT | 0.04975 | 1:1 | 0.100 | 0.5 | 5 | 4.2 | 15 | 2.0 | 9.8 |
| | Mixture 4 | 99.825 | 0.075 | S-12 | 0.0010 | T202 | 0.04950 | T-TT | 0.04950 | 1:1 | 0.100 | 1.0 | 10 | 4.1 | 13 | 2.2 | 9.9 |
| | Mixture 5 | 99.825 | 0.075 | S-12 | 0.0045 | T202 | 0.04775 | T-TT | 0.04775 | 1:1 | 0.100 | 4.5 | 45 | 3.2 | 8.5 | 2.6 | 9.6 |
| | Mixture 6 | 99.825 | 0.075 | S-12 | 0.0055 | T202 | 0.04725 | T-TT | 0.04725 | 1:1 | 0.100 | 5.5 | 55 | 3.1 | 8.0 | 2.7 | 10 |
| | Mixture 7 | 99.825 | 0.075 | S-12 | 0.0070 | T202 | 0.04650 | T-TT | 0.04650 | 1:1 | 0.100 | 7.0 | 70 | 3.1 | 7.3 | 2.8 | 11 |
| | Mixture 8 | 99.825 | 0.075 | S-12 | 0.0080 | T202 | 0.04600 | T-TT | 0.04600 | 1:1 | 0.100 | 8.0 | 80 | 3.1 | 7.1 | 3.5 | 13 |
| | Mixture 9 | 99.825 | 0.075 | S-12 | 0.0100 | T202 | 0.04500 | T-TT | 0.04500 | 1:1 | 0.100 | 10.0 | 100 | 3.3 | 6.9 | 4.2 | 14 |
| Comp. Ex. | Mixture 10 | 99.825 | 0.075 | S-12 | 0.0150 | T202 | 0.04250 | T-TT | 0.04250 | 1:1 | 0.100 | 15.0 | 150 | 4.4 | 8.6 | 6.4 | 21 |

Example 10

To examine stability during processing of polypropylene, melt index (MI) was measured in the same manner as in Example 1.

The mixing ratio and the symbols used in Table 10 are explained in the following.

T202:tris(2,4-di-tert-butylphenyl) phosphite (manufactured by Yoshitomi Fine Chemicals Ltd., trademark: Tomiphos 202)

T-TT:tetrakis[3-(3,5-di-tert-butyl-4-hydroxyphenyl) propionyloxymethyl]methane (manufactured by Yoshitomi Fine Chemicals Ltd., trademark: Tominox TT)

S-12:2,2,5,7,8-pentamethyl-6-hydroxychroman

Other symbols are as shown in Example 1 and Example 2.

The mixing ratios were, as shown in Table 10, polypropylene (homopolymer) was 99.825 parts by weight, calcium stearate was 0.075 part by weight, the total amount of a phosphorus antioxidant (T202), a phenolic antioxidant (T-TT) and a 6-hydroxychroman compound (S-12) was 0.100 part by weight, S-12 was not added or added in a proportion of 0.0045 part by weight, and the T202 content and the T-TT content were calculated (both in parts by weight) to make the weight ratio of the phosphorus antioxidant:phenolic antioxidant 0:1, 1:9, 2:8, 1:1, 8:2, 9:1 or 1:0.

From the results in Table 10, the following are known.

The composition the present invention containing S-12 showed an effect of the concurrent use at the T202:T-TT weight ratio of 9:1–1:9, and the effect becomes more noticeable at the 4:1–1:4 weight ratio.

Example 11

To evaluate the heat stability of linear low density polyethylene (LLDPE) during processing, the torque increase start time was measured in the same manner as in Example 3.

The mixing ratio and the symbols used in Table 11 are explained in the following.

T202:tris(2,4-di-tert-butylphenyl) phosphite (manufactured by Yoshitomi Fine Chemicals Ltd., trademark: Tomiphos 202)

T-SS:n-octadecyl 3-(3,5-di-tert-butyl-4-hydroxyphenyl) propionate (manufactured by Yoshitomi Fine Chemicals Ltd., trademark: Tominox SS)

S-12:2,2,5,7,8-pentamethyl-6-hydroxychroman

Other symbols are as shown in Example 3.

The mixing ratios were, as shown in Table 11, that linear low density polyethylene was 99.825 parts by weight, calcium stearate was 0.075 part by weight, a 6-hydroxychroman compound (S-12) was not added or added in a proportion of 0.003 part by weight, and the phosphorus antioxidant content (T202) and the phenolic antioxidant content (T-SS) were calculated to be equal according to "(0.100 part by weight- (S-12 content))÷2" (parts by weight).

From the results in Table 11, the following are known.

By the concurrent use of T-SS, T202 and S-12, the heat stability during processing can be remarkably improved.

TABLE 10

| | | | | Amount added (parts by weight) | | | | | | | Synergist (ppm) in | | |
| --- | --- | --- | --- | --- | --- | --- | --- | --- | --- | --- | --- | --- | --- |
| | | | | Antioxidant | | | | | | | | | |
| | | | | (a) synergist (including Comp. Ex.) | | (b) phosphorus antioxidant | | (c) phenolic antioxidant | | (b):(c) weight ratio | Total amount added | Synergist (wt %) in antioxidant | organic polymer composition |
| | Mixtures | PP | Ca-St | kind | amount | kind | amount | kind | amount | | | | | MI1 | MI4 |
| Comp. Ex. | Mixture 1 | 99.825 | 0.075 | S-12 | 0.0045 | — | — | T-TT | 0.09550 | 0:1 | 0.100 | 4.5 | 45 | 5.7 | X |
| | Mixture 2 | 99.825 | 0.075 | S-12 | 0 | — | — | T-TT | 0.10000 | 0:1 | 0.100 | 0 | 0 | 8.1 | X |
| Ex. | Mixture 3 | 99.825 | 0.075 | S-12 | 0.0045 | T202 | 0.00955 | T-TT | 0.08595 | 1:9 | 0.100 | 4.5 | 45 | 4.2 | 18 |
| Comp. Ex. | Mixture 4 | 99.825 | 0.075 | S-12 | 0 | T202 | 0.01000 | T-TT | 0.09000 | 1:9 | 0.100 | 0 | 0 | 5.6 | X |
| Ex. | Mixture 5 | 99.825 | 0.075 | S-12 | 0.0045 | T202 | 0.01910 | T-TT | 0.07640 | 2:8 | 0.100 | 4.5 | 45 | 3.8 | 13 |
| Comp. Ex. | Mixture 6 | 99.825 | 0.075 | S-12 | 0 | T202 | 0.02000 | T-TT | 0.08000 | 2:8 | 0.100 | 0 | 0 | 4.8 | 18 |
| Ex. | Mixture 7 | 99.825 | 0.075 | S-12 | 0.0045 | T202 | 0.04775 | T-TT | 0.04775 | 1:1 | 0.100 | 4.5 | 45 | 3.2 | 8.0 |
| Comp. Ex. | Mixture 8 | 99.825 | 0.075 | S-12 | 0 | T202 | 0.05000 | T-TT | 0.05000 | 1:1 | 0.100 | 0 | 0 | 4.5 | 14 |
| Ex. | Mixture 9 | 99.825 | 0.075 | S-12 | 0.0045 | T202 | 0.07640 | T-TT | 0.01910 | 8:2 | 0.100 | 4.5 | 45 | 3.6 | 10 |
| Comp. Ex. | Mixture 10 | 99.825 | 0.075 | S-12 | 0 | T202 | 0.08000 | T-TT | 0.02000 | 8:2 | 0.100 | 0 | 0 | 5.5 | X |
| Ex. | Mixture 11 | 99.825 | 0.075 | S-12 | 0.0045 | T202 | 0.08595 | T-TT | 0.00955 | 9:1 | 0.100 | 4.5 | 45 | 4.0 | 15 |
| Comp. Ex. | Mixture 12 | 99.825 | 0.075 | S-12 | 0 | T202 | 0.09000 | T-TT | 0.01000 | 9:1 | 0.100 | 0 | 0 | 6.8 | X |
| Comp. Ex. | Mixture 13 | 99.825 | 0.075 | S-12 | 0.0045 | T202 | 0.09550 | — | — | 1:0 | 0.100 | 4.5 | 45 | 5.5 | X |
| | Mixture 14 | 99.825 | 0.075 | S-12 | 0 | T202 | 0.10000 | — | — | 1:0 | 0.100 | 0 | 0 | 8.5 | X |

TABLE 11

| | | | | Amount added (parts by weight) | | | | | | | Synergist (ppm) in organic polymer composition | Torque increase start time (min) |
|---|---|---|---|---|---|---|---|---|---|---|---|---|
| | | | | Antioxidant | | | | | | Synergist (wt %) in anti-oxidant | | |
| | Mixtures | LLDPE | Ca-St | (a) synergist (including Comp. Ex.) | | (b) phosphorus antioxidant | | (c) phenolic antioxidant | | (b):(c) weight ratio | Total amount added | | |
| | | | | kind | amount | kind | amount | kind | amount | | | | |
| Ex. | Mixture 1 | 99.825 | 0.075 | S-12 | 0.003 | T202 | 0.0485 | T-SS | 0.0485 | 1:1 | 0.100 | 3.0 | 30 | 37 |
| Comp. Ex. | Mixture 2 | 99.825 | 0.075 | — | — | T202 | 0.0500 | T-SS | 0.0500 | 1:1 | 0.100 | 0 | 0 | 10 |

Example 12

In the same manner as in Example 1, melt index (MI) was measured, wherein the temperature of die was set to 260° C. In the same manner as in Example 1, yellowness index (YI) was measured.

The mixing ratio and the symbols used in Table 12 are explained in the following.

The mixing ratio is shown in Table 12. From the results in Table 12, the following are known.

By the addition of an extremely small amount of a chroman compound represented by S-12 as a synergist for a processing stabilizer to a combination of a phosphorus antioxidant and a phenolic antioxidant, a composition hardly colored and having markedly improved stability during processing can be obtained.

TABLE 12

| | Mixtures | PP | Ca-St | (a) synergist (including Comp. Ex.) | | (b) phosphorus antioxidant | | (c) phenolic antioxidant | | (b):(c) weight ratio | Total amount added | Synergist (wt %) in antioxidant | Synergist (ppm) in organic polymer composition | MI1 | MI4 | YI1 | YI4 |
|---|---|---|---|---|---|---|---|---|---|---|---|---|---|---|---|---|---|
| | | | | kind | amount | kind | amount | kind | amount | | | | | | | | |
| Ex. | Mixture 1 | 99.825 | 0.075 | S-12 | 0.0050 | T202 | 0.0475 | T-TT | 0.0475 | 1:1 | 0.100 | 5.0 | 50 | 2.6 | 4.7 | 3.0 | 12 |
| | Mixture 2 | 99.825 | 0.075 | S-12 | 0.0068 | T202 | 0.0641 | T-TT | 0.0641 | 1:1 | 0.135 | 5.0 | 68 | 2.6 | 4.4 | 3.2 | 12 |
| Comp. Ex. | Mixture 3 | 99.825 | 0.075 | S-12 | 0.1000 | — | — | — | — | — | 0.100 | 100 | 1000 | 3.2 | 7.0 | 14 | 38 |
| | Mixture 4 | 99.825 | 0.075 | — | — | T202 | 0.1000 | — | — | — | 0.100 | — | — | 3.5 | X | 2.5 | X |
| | Mixture 5 | 99.825 | 0.075 | — | — | — | — | T-TT | 0.1000 | — | 0.100 | — | — | 3.6 | 7.8 | 3.5 | 22 |
| | Mixture 6 | 99.825 | 0.075 | S-14 | 0.1000 | — | — | — | — | — | 0.100 | 100 | 1000 | 3.3 | 7.1 | 12 | 36 |
| | Mixture 7 | 99.825 | 0.075 | S-12 | 0.0500 | — | — | T-TT | 0.0500 | — | 0.100 | 50 | 500 | 3.0 | 6.5 | 8.1 | 38 |
| | Mixture 8 | 99.825 | 0.075 | S-12 | 0.0500 | T202 | 0.0500 | — | — | — | 0.100 | 50 | 500 | 3.0 | 5.7 | 8.2 | 33 |
| | Mixture 9 | 99.825 | 0.075 | — | — | T202 | 0.0500 | T-TT | 0.0500 | 1:1 | 0.100 | — | — | 1.1 | 6.2 | 3.1 | 20 |
| | Mixture 10 | 99.825 | 0.075 | S-14 | 0.0500 | T202 | 0.0500 | — | — | — | 0.100 | 50 | 500 | 3.1 | 5.6 | 8.0 | 32 |

T202 : tris (2,4-di-tert-butylphenyl) phosphite (manufactured by Yoshitomi Fine Chemicals Ltd., trademark: Tomiphos 202)
T-TT : tetrakis [3-(3,5-di-tert-butyl-4-hydroxyphenyl) propionyloxymethyl]methane (manufactured by Yoshitomi Fine Chemicals Ltd., trademark: Tominox TT)
S-12 : 2,2,5,7,8-pentamethyl-6-hydroxychroman
S-14 : vitamin E (manufactured by TOKYO CHEMICAL INDUSTRY CORPORATION, reagent)
Other symbols are as shown in Example 1 and Example 2.

Example 13

In the same manner as in Example 1, melt index (MI) and yellowness index (YI) were measured.

The mixing ratio and the symbols used in Table 13 are explained in the following.
U626 : bis(2,4-di-tert-butylphenyl) pentaerythritol diphosphite (manufactured by GE Specialty Chemicals, trademark: ULTRANOX 626)
T-TT : tetrakis[3-(3,5-di-tert-butyl-4-hydroxyphenyl) propionyloxymethyl]methane (manufactured by Yoshitomi Fine Chemicals Ltd., trademark: Tominox TT)

S-12: 2,2,5,7,8-pentamethyl-6-hydroxychroman

Other symbols are as shown in Example 1.

The mixing ratios were, as shown in Table 13, that polypropylene (homopolymer) was 99.825 parts by weight, calcium stearate was 0.075 part by weight, the total amount of a phosphorus antioxidant (U626), a phenolic antioxidant (T-TT) and a 6-hydroxychroman compound (S-12) was 0.100 part by weight, S-12 was not added or added in 9 proportions within 0.0002 part by weight–0.0150 part by weight, and the phosphorus antioxidant content and the phenolic antioxidant content were calculated to be equal according to "(0.100 part by weight-(S-12 content))÷2" (parts by weight).

From the results in Table 13, the following are known.

(1) With regard to MI, an S-12 content of not less than 10 wt % relative to the total amount of S-12, T-TT and U626 scarcely improves MI, the content of 0.5 wt % shows certain effect but not enough, the content of 0.2 wt % scarcely shows an effect. With regard to YI, the content of 15 wt % results in marked coloring. (2) Therefore, an S-12 content of 0.5–10 wt % provides a composition hardly colored and having markedly improved stability during processing.

The mixing ratio and the symbols used in Table 14 are explained in the following.

U626: bis(2,4-di-tert-butylphenyl) pentaerythritol diphosphite (manufactured by GE Specialty Chemicals, trademark: ULTRANOX 626)

T-TT: tetrakis[3-(3,5-di-tert-butyl-4-hydroxyphenyl) propionyloxymethyl]methane (manufactured by Yoshitomi Fine Chemicals Ltd., trademark: Tominox TT)

S-12: 2,2,5,7,8-pentamethyl-6-hydroxychroman

Other symbols are as shown in Example 1 and Example 2.

The mixing ratios were, as shown in Table 14, polypropylene (homopolymer) was 99.825 parts by weight, calcium stearate was 0.075 part by weight, the total amount of a phosphorus antioxidant (U626), a phenolic antioxidant (T-TT) and a 6-hydroxychroman compound (S-12) was 0.100 part by weight, S-12 was not added or added in a proportion of 0.0045 part by weight, and the U626 content and the T-TT content were calculated (both in parts by weight) to make the weight ratio of the phosphorus antioxidant: phenolic antioxidant 0:1, 1:9, 2:8, 1:1, 8:2, 9:1 or 1:0.

TABLE 13

| | | | | Amount added (parts by weight) | | | | | | | | Synergist (ppm) | | | | |
|---|---|---|---|---|---|---|---|---|---|---|---|---|---|---|---|---|
| | | | | | Antioxidant | | | | | | Synergist (wt %) in antioxidant | in organic polymer composition | | | | |
| | | | | (a) synergist (including Comp. Ex.) | | (b) phosphorus antioxidant | | (c) phenolic antioxidant | | (b):(c) weight ratio | Total amount added | | | | | | |
| | Mixtures | PP | Ca-St | kind | amount | kind | amount | kind | amount | | | | | MI1 | MI4 | YI1 | YI4 |
| Comp. Ex. | Mixture 1 | 99.825 | 0.075 | S-12 | 0 | U626 | 0.05000 | T-TT | 0.05000 | 1:1 | 0.100 | 0 | 0 | 3.2 | 10 | 1.5 | 8.6 |
| | Mixture 2 | 99.825 | 0.075 | S-12 | 0.0002 | U626 | 0.04990 | T-TT | 0.04990 | 1:1 | 0.100 | 0.2 | 2 | 2.6 | 7.0 | 1.5 | 7.8 |
| Ex. | Mixture 3 | 99.825 | 0.075 | S-12 | 0.0005 | U626 | 0.04975 | T-TT | 0.04975 | 1:1 | 0.100 | 0.5 | 5 | 2.5 | 5.8 | 1.5 | 7.3 |
| | Mixture 4 | 99.825 | 0.075 | S-12 | 0.0010 | U626 | 0.04950 | T-TT | 0.04950 | 1:1 | 0.100 | 1.0 | 10 | 2.4 | 5.0 | 1.5 | 7.1 |
| | Mixture 5 | 99.825 | 0.075 | S-12 | 0.0045 | U626 | 0.04775 | T-TT | 0.04775 | 1:1 | 0.100 | 4.5 | 45 | 2.3 | 4.4 | 1.8 | 7.4 |
| | Mixture 6 | 99.825 | 0.075 | S-12 | 0.0055 | U626 | 0.04725 | T-TT | 0.04725 | 1:1 | 0.100 | 5.5 | 55 | 2.3 | 4.2 | 1.8 | 7.4 |
| | Mixture 7 | 99.825 | 0.075 | S-12 | 0.0070 | U626 | 0.04650 | T-TT | 0.04650 | 1:1 | 0.100 | 7.0 | 70 | 2.2 | 4.2 | 2.0 | 7.9 |
| | Mixture 8 | 99.825 | 0.075 | S-12 | 0.0080 | U626 | 0.04600 | T-TT | 0.04600 | 1:1 | 0.100 | 8.0 | 80 | 2.3 | 4.3 | 2.5 | 8.2 |
| | Mixture 9 | 99.825 | 0.075 | S-12 | 0.0100 | U626 | 0.04500 | T-TT | 0.04500 | 1:1 | 0.100 | 10.0 | 100 | 2.3 | 4.3 | 3.2 | 9.0 |
| Comp. Ex. | Mixture 10 | 99.825 | 0.075 | S-12 | 0.0150 | U626 | 0.04250 | T-TT | 0.04250 | 1:1 | 0.100 | 15.0 | 150 | 2.5 | 5.2 | 4.9 | 16 |

Example 14

To examine the stability during processing of polypropylene, melt index (MI) was measured in the same manner as in Example 1.

From the results in Table 14, the following are known.

The composition of the present invention containing S-12 showed an effect from the concurrent use at the U626:T-TT weight ratio of 9:1–1:9, and the effect becomes more noticeable at the 4:1–1:4 weight ratio.

TABLE 14

|  | Mixtures | Amount added (parts by weight) | | | | | | | | Synergist (ppm) in | | | |
|---|---|---|---|---|---|---|---|---|---|---|---|---|---|
|  |  | PP | Ca-St | Antioxidant | | | | | | Synergist (wt %) in antioxidant | organic polymer composition | MI1 | MI4 |
|  |  |  |  | (a) synergist (including Comp. Ex.) | | (b) phosphorus antioxidant | | (c) phenolic antioxidant | | (b):(c) weight ratio | Total amount added | | |
|  |  |  |  | kind | amount | kind | amount | kind | amount |  |  |  |  |
| Comp. Ex. | Mixture 1 | 99.825 | 0.075 | S-12 | 0.0045 | — | — | T-TT | 0.09550 | 0:1 | 0.100 | 4.5 | 45 | 3.8 | 13 |
|  | Mixture 2 | 99.825 | 0.075 | S-12 | 0 | — | — | T-TT | 0.10000 | 0:1 | 0.100 | 0 | 0 | 5.3 | 19 |
| Ex. | Mixture 3 | 99.825 | 0.075 | S-12 | 0.0045 | U626 | 0.00955 | T-TT | 0.08595 | 1:9 | 0.100 | 4.5 | 45 | 2.9 | 8.6 |
| Comp. Ex. | Mixture 4 | 99.825 | 0.075 | S-12 | 0 | U626 | 0.01000 | T-TT | 0.09000 | 1:9 | 0.100 | 0 | 0 | 3.6 | 15 |
| Ex. | Mixture 5 | 99.825 | 0.075 | S-12 | 0.0045 | U626 | 0.01910 | T-TT | 0.07640 | 2:8 | 0.100 | 4.5 | 45 | 2.5 | 5.8 |
| Comp. Ex. | Mixture 6 | 99.825 | 0.075 | S-12 | 0 | U626 | 0.02000 | T-TT | 0.08000 | 2:8 | 0.100 | 0 | 0 | 3.3 | 12 |
| Ex. | Mixture 7 | 99.825 | 0.075 | S-12 | 0.0045 | U626 | 0.04775 | T-TT | 0.04775 | 1:1 | 0.100 | 4.5 | 45 | 2.4 | 4.5 |
| Comp. Ex. | Mixture 8 | 99.825 | 0.075 | S-12 | 0 | U626 | 0.05000 | T-TT | 0.05000 | 1:1 | 0.100 | 0 | 0 | 3.2 | 10 |
| Ex. | Mixture 9 | 99.825 | 0.075 | S-12 | 0.0045 | U626 | 0.07640 | T-TT | 0.01910 | 8:2 | 0.100 | 4.5 | 45 | 2.4 | 4.2 |
| Comp. Ex. | Mixture 10 | 99.825 | 0.075 | S-12 | 0 | U626 | 0.08000 | T-TT | 0.02000 | 8:2 | 0.100 | 0 | 0 | 3.6 | 14 |
| Ex. | Mixture 11 | 99.825 | 0.075 | S-12 | 0.0045 | U626 | 0.08595 | T-TT | 0.00955 | 9:1 | 0.100 | 4.5 | 45 | 3.6 | 10 |
| Comp. Ex. | Mixture 12 | 99.825 | 0.075 | S-12 | 0 | U626 | 0.09000 | T-TT | 0.01000 | 9:1 | 0.100 | 0 | 0 | 4.1 | 18 |
| Comp. Ex. | Mixture 13 | 99.825 | 0.075 | S-12 | 0.0045 | U626 | 0.09550 | — | — | 1:0 | 0.100 | 4.5 | 45 | 3.6 | X |
|  | Mixture 14 | 99.825 | 0.075 | S-12 | 0 | U626 | 0.10000 | — | — | 1:0 | 0.100 | 0 | 0 | 5.4 | X |

Example 15

To evaluate the heat stability of linear low density polyethylene (LLDPE) during processing, the torque increase start time was measured in the same manner as in Example 3.

The mixing ratio and the symbols used in Table 15 are explained in the following.

U626:bis(2,4-di-tert-butylphenyl) pentaerythritol diphosphite (manufactured by GE Specialty Chemicals, trademark: ULTRANOX 626)

P36:bis(2,6-di-tert-butyl-4-methylphenyl) pentaerythritol diphosphite (manufactured by ASAHI DENKA KOGYO K. K., trademark: PEP-36)

T-SS:n-octadecyl 3-(3,5-di-tert-butyl-4-hydroxyphenyl) propionate (manufactured by Yoshitomi Fine Chemicals Ltd., trademark: Tominox SS)

S-12:2,2,5,7,8-pentamethyl-6-hydroxychroman

Other symbols are as shown in Example 3.

The mixing ratios were, as shown in Table 15, that linear low density polyethylene was 99.825 parts by weight, calcium stearate was 0.075 part by weight, a 6-hydroxychroman compound was not added or added in a proportion of 0.003 part by weight, and the phosphorus antioxidant (U626 or P36) content and the phenolic antioxidant (T-SS) content were calculated to be equal according to "(0.100 part by weight-(S-12 content))÷2" (parts by weight).

From the results in Table 15, the following are known.

By the concurrent use of S-12 with a combination of T-SS and U626, or T-SS and P36, the heat stability during processing can be significantly improved.

TABLE 15

|  | Mixtures | Amount added (parts by weight) | | | | | | | | | Synergist (ppm) in | | Torque increase start time (min) |
|---|---|---|---|---|---|---|---|---|---|---|---|---|---|---|
|  |  | LLDPE | Ca—St | Antioxidant | | | | | | (b):(c) weight ratio | Total amount added | Synergist (wt %) in antioxidant | organic polymer composition | |
|  |  |  |  | (a) synergist (including Comp. Ex.) | | (b) phosphorus antioxidant | | (c) phenolic antioxidant | | | | | | |
|  |  |  |  | kind | amount | kind | amount | kind | amount |  |  |  |  |  |
| Ex. | Mixture 1 | 99.825 | 0.075 | S-12 | 0.003 | U626 | 0.0485 | T-SS | 0.0485 | 1:1 | 0.100 | 3.0 | 30 | 65 |
| Comp. Ex. | Mixture 2 | 99.825 | 0.075 | — | — | U626 | 0.0500 | T-SS | 0.0500 | 1:1 | 0.100 | 0 | 0 | 18 |
| Ex. | Mixture 3 | 99.825 | 0.075 | S-12 | 0.003 | P36 | 0.0485 | T-SS | 0.0485 | 1:1 | 0.100 | 3.0 | 30 | 70 |
| Comp. Ex. | Mixture 4 | 99.825 | 0.075 | — | — | P36 | 0.0500 | T-SS | 0.0500 | 1:1 | 0.100 | 0 | 0 | 21 |

Example 16

In the same manner as in Example 1, melt index (MI) was measured, wherein the temperature of die was set to 260° C. In the same manner as in Example 1, yellowness index (YI) was measured.

The mixing ratio and the symbols used in Table 16 are explained in the following.

U626:bis(2,4-di-tert-butylphenyl) pentaerythritol diphosphite (manufactured by GE Specialty Chemicals, trademark: ULTRANOX 626)

T-TT:tetrakis[3-(3,5-di-tert-butyl-4-hydroxyphenyl) propionyloxymethyl]methane (manufactured by Yoshitomi Fine Chemicals Ltd., trademark: Tominox TT)

Y-BB:4,4-butylidene bis(3-methyl-6-tert-butylphenol) (manufactured by Yoshitomi Fine Chemicals Ltd., trademark: Yoshinox BB)

YBHT:2,6-di-tert-butyl-4-methylphenol (manufactured by Yoshitomi Fine Chemicals Ltd., trademark: Yoshinox BHT)

S-12:2,2,5,7,8-pentamethyl-6-hydroxychroman

S-14:vitamin E (manufactured by TOKYO CHEMICAL INDUSTRY CORPORATION, reagent)

Other symbols are as shown in Example 1.

The mixing ratio is shown in Table 16. From the results in Table 16, the following is known.

By the addition of an extremely small amount of a 6-hydroxychroman compound represented by S-12 as a synergist for a processing stabilizer to a combination of a phosphorus antioxidant and a phenolic antioxidant, a composition hardly colored and having markedly improved stability during processing can be obtained.

Example 17

In the same manner as in Example 1, melt index (MI) and yellowness index (YI) were measured.

The mixing ratio and the symbols used in Table 17 are explained in the following.

HP10:2,2-methylenebis(4,6-di-tert-butylphenyl) 2-ethylhexyl phosphite (manufactured by ASAHI DENKA KOGYO K.K., trademark: Adekastab HP-10)

T-TT:tetrakis[3-(3,5-di-tert-butyl-4-hydroxyphenyl) propionyloxymethyl]methane (manufactured by Yoshitomi Fine Chemicals Ltd., trademark: Tominox TT)

S-12:2,2,5,7,8-pentamethyl-6-hydroxychroman

Other symbols are as shown in Example 1.

The mixing ratios were, as shown in Table 17, that polypropylene (homopolymer) was 99.825 parts by weight, calcium stearate was 0.075 part by weight, the total amount of a phosphorus antioxidant (HP10), a phenolic antioxidant (T-TT) and a 6-hydroxychroman compound (S-12) was 0.100 part by weight, S-12 was not added or added in 9 proportions within 0.0002 part by weight–0.0150 part by weight, and the phosphorus antioxidant content and the phenolic antioxidant content were calculated to be equal according to "(0.100 part by weight-(S-12 content))÷2" (parts by weight).

From the results in Table 17, the following are known.

(1) With regard to MI, an S-12 content of not less than 10 wt % relative to the total amount of S-12, T-TT and HP10 scarcely improves MI, the content of 0.5 wt % shows certain effect but not enough, the content of 0.2 wt % scarcely shows an effect. With regard to YI, the content of 15 wt % results in marked coloring. (2) Therefore, an S-12 content of 0.5–10 wt % provides a composition hardly colored and having markedly improved stability during processing.

TABLE 16

| | | Amount added (parts by weight) | | | | | | | | |
|---|---|---|---|---|---|---|---|---|---|---|
| | | | | Antioxidant | | | | | | |
| | Mixtures | PP | Ca—St | (a) synergist (including Comp. Ex.) | | (b) phosphorus antioxidant | | (c) phenolic antioxidant | | (b):(c) weight ratio | Total amount added |
| | | | | kind | amount | kind | amount | kind | amount | | |
| Ex. | Mixture 1 | 99.825 | 0.075 | S-12 | 0.0050 | U626 | 0.0475 | T-TT | 0.0475 | 1:1 | 0.100 |
| Comp. Ex. | Mixture 2 | 99.825 | 0.075 | S-14 | 0.0300 | — | — | Y-BB | 0.1000 | — | 0.130 |
| | Mixture 3 | 99.825 | 0.075 | S-14 | 0.0300 | — | — | T-TT YBHT | 0.1000 0.0050 | — | 0.135 |

| | Mixtures | Synergist (wt %) in antioxidant | Synergist (ppm) in organic polymer composition | MI1 | MI4 | YI1 | YI4 |
|---|---|---|---|---|---|---|---|
| Ex. | Mixture 1 | 5.0 | 50 | 2.3 | 4.0 | 2.7 | 8.0 |
| Comp. Ex. | Mixture 2 | 23.1 | 300 | 3.7 | 8.4 | 6.7 | 23 |
| | Mixture 3 | 22.2 | 300 | 3.3 | 6.4 | 3.9 | 20 |

TABLE 17

| | Mixtures | Amount added (parts by weight) | | | | | | | | |
|---|---|---|---|---|---|---|---|---|---|---|
| | | PP | Ca—St | Antioxidant | | | | | | |
| | | | | (a) synergist (including Comp. Ex.) | | (b) phosphorus antioxidant | | (c) phenolic antioxidant | | (b):(c) weight ratio | Total amount added |
| | | | | kind | amount | kind | amount | kind | amount | | |
| Com. Ex. | Mixture 1 | 99.825 | 0.075 | S-12 | 0 | HP10 | 0.05000 | T-TT | 0.05000 | 1:1 | 0.100 |
| | Mixture 2 | 99.825 | 0.075 | S-12 | 0.0002 | HP10 | 0.04990 | T-TT | 0.04990 | 1:1 | 0.100 |
| Ex. | Mixture 3 | 99.825 | 0.075 | S-12 | 0.0005 | HP10 | 0.04975 | T-TT | 0.04975 | 1:1 | 0.100 |
| | Mixture 4 | 99.825 | 0.075 | S-12 | 0.0010 | HP10 | 0.04950 | T-TT | 0.04950 | 1:1 | 0.100 |
| | Mixture 5 | 99.825 | 0.075 | S-12 | 0.0045 | HP10 | 0.04775 | T-TT | 0.04775 | 1:1 | 0.100 |
| | Mixture 6 | 99.825 | 0.075 | S-14 | 0.0055 | HP10 | 0.04725 | T-TT | 0.04725 | 1:1 | 0.100 |
| | Mixture 7 | 99.825 | 0.075 | S-12 | 0.0070 | HP10 | 0.04650 | T-TT | 0.04650 | 1:1 | 0.100 |
| | Mixture 8 | 99.825 | 0.075 | S-12 | 0.0080 | HP10 | 0.04600 | T-TT | 0.04600 | 1:1 | 0.100 |
| | Mixture 9 | 99.825 | 0.075 | S-12 | 0.0100 | HP10 | 0.04500 | T-TT | 0.04500 | 1:1 | 0.100 |
| Com. Ex. | Mixture 10 | 99.825 | 0.075 | S-12 | 0.0150 | HP10 | 0.04250 | T-TT | 0.04250 | 1:1 | 0.100 |

| | Mixtures | Synergist (wt %) in antioxidant | Synergist (ppm) in organic polymer composition | MI1 | MI4 | YI1 | YI4 |
|---|---|---|---|---|---|---|---|
| Com. Ex. | Mixture 1 | 0 | 0 | 4.1 | 13 | 1.9 | 11 |
| | Mixture 2 | 0.2 | 2 | 3.9 | 12 | 1.9 | 10 |
| Ex. | Mixture 3 | 0.5 | 5 | 3.7 | 10 | 1.9 | 9.7 |
| | Mixture 4 | 1.0 | 10 | 3.3 | 8.3 | 2.1 | 9.5 |
| | Mixture 5 | 4.5 | 45 | 3.0 | 6.7 | 2.5 | 9.5 |
| | Mixture 6 | 5.5 | 55 | 3.0 | 5.9 | 2.7 | 9.7 |
| | Mixture 7 | 7.0 | 70 | 2.9 | 5.9 | 2.7 | 10 |
| | Mixture 8 | 8.0 | 80 | 2.9 | 6.0 | 3.4 | 11 |
| | Mixture 9 | 10.0 | 100 | 2.7 | 6.2 | 4.0 | 12 |
| Com. Ex. | Mixture 10 | 15.0 | 150 | 3.5 | 7.8 | 6.1 | 22 |

Example 18

To examine the stability during processing of polypropylene, melt index (MI) was measured in the same manner as in Example 1.

The mixing ratio and the symbols used in Table 18 are explained in the following.
HP10: 2,2-methylenebis(4,6-di-tert-butylphenyl) 2-ethylhexyl phosphite (manufactured by ASAHI DENKA KOGYO K. K., trademark: Adekastab HP-10)
T-TT: tetrakis[3-(3,5-di-tert-butyl-4-hydroxyphenyl) propionyloxymethyl]methane (manufactured by Yoshitomi Fine Chemicals Ltd., trademark: Tominox TT)
S-12: 2,2,5,7,8-pentamethyl-6-hydroxychroman
Other symbols are as shown in Example 1 and Example 2.

The mixing ratios were, as shown in Table 18, polypropylene (homopolymer) was 99.825 parts by weight, calcium stearate was 0.075 part by weight, the total amount of a phosphorus antioxidant (HP10), a phenolic antioxidant (T-TT) and a 6-hydroxychroman compound (S-12) was 0.100 part by weight, S-12 was not added or added in a proportion of 0.0045 part by weight, and the HP10 content and the T-TT content were calculated (both in parts by weight) to make the weight ratio of the phosphorus antioxidant:phenolic antioxidant 0:1, 1:9, 2:8, 1:1, 8:2, 9:1 or 1:0.

From the results in Table 18, the following are known.

The composition the present invention containing S-12 showed an effect from the concurrent use at the HP10:T-TT weight ratio of 9:1–1:9, and the effect becomes more noticeable at the 4:1–1:4 weight ratio.

TABLE 18

| | Mixtures | PP | Ca—St | Antioxidant (a) synergist (including Comp. Ex.) kind | amount | (b) phosphorus antioxidant kind | amount | (c) phenolic antioxidant kind | amount | (b):(c) weight ratio | Total amount added | Synergist (wt %) in antioxidant | Synergist (ppm) in organic polymer composition | MI1 | MI4 |
|---|---|---|---|---|---|---|---|---|---|---|---|---|---|---|---|
| Comp. Ex. | Mixture 1 | 99.825 | 0.075 | S-12 | 0.0045 | — | — | T-TT | 0.09550 | 0:1 | 0.100 | 4.5 | 45 | 5.1 | x |
| | Mixture 2 | 99.825 | 0.075 | S-12 | 0 | — | — | T-TT | 0.10000 | 0:1 | 0.100 | 0 | 0 | 6.5 | x |
| Ex. | Mixture 3 | 99.825 | 0.075 | S-12 | 0.0045 | HP10 | 0.00955 | T-TT | 0.08595 | 1:9 | 0.100 | 4.5 | 45 | 3.8 | 14 |
| Comp. Ex. | Mixture 4 | 99.825 | 0.075 | S-12 | 0 | HP10 | 0.01000 | T-TT | 0.09000 | 1:9 | 0.100 | 0 | 0 | 4.7 | 18 |
| Ex. | Mixture 5 | 99.825 | 0.075 | S-12 | 0.0045 | HP10 | 0.01910 | T-TT | 0.07640 | 2:8 | 0.100 | 4.5 | 45 | 3.3 | 9.3 |
| Comp. Ex. | Mixture 6 | 99.825 | 0.075 | S-12 | 0 | HP10 | 0.02000 | T-TT | 0.08000 | 2:8 | 0.100 | 0 | 0 | 4.2 | 16 |
| Ex. | Mixture 7 | 99.825 | 0.075 | S-12 | 0.0045 | HP10 | 0.04775 | T-TT | 0.04775 | 1:1 | 0.100 | 4.5 | 45 | 2.8 | 6.3 |
| Comp. Ex. | Mixture 8 | 99.825 | 0.075 | S-12 | 0 | HP10 | 0.05000 | T-TT | 0.05000 | 1:1 | 0.100 | 0 | 0 | 4.1 | 13 |
| Ex. | Mixture 9 | 99.825 | 0.075 | S-12 | 0.0045 | HP10 | 0.07640 | T-TT | 0.01910 | 8:2 | 0.100 | 4.5 | 45 | 3.2 | 6.7 |
| Comp. Ex. | Mixture 10 | 99.825 | 0.075 | S-12 | 0 | HP10 | 0.08000 | T-TT | 0.02000 | 8:2 | 0.100 | 0 | 0 | 4.7 | 20 |
| Ex. | Mixture 11 | 99.825 | 0.075 | S-12 | 0.0045 | HP10 | 0.08595 | T-TT | 0.00955 | 9:1 | 0.100 | 4.5 | 45 | 3.5 | 8.7 |
| Comp. Ex. | Mixture 12 | 99.825 | 0.075 | S-12 | 0 | HP10 | 0.09000 | T-TT | 0.01000 | 9:1 | 0.100 | 0 | 0 | 5.6 | x |
| Comp. Ex. | Mixture 13 | 99.825 | 0.075 | S-12 | 0.0045 | HP10 | 0.09550 | — | — | 1:0 | 0.100 | 4.5 | 45 | 5.3 | x |
| | Mixture 14 | 99.825 | 0.075 | S-12 | 0 | HP10 | 0.10000 | — | — | 1:0 | 0.100 | 0 | 0 | 6.9 | x |

Example 19

To evaluate the heat stability of linear low density polyethylene (LLDPE) during processing, the torque increase start time was measured in the same manner as in Example 3.

The mixing ratio and the symbols used in Table 19 are explained in the following.

HP10: 2,2-methylenebis(4,6-di-tert-butylphenyl) 2-ethylhexylphosphite (manufactured by ASAHI DENKA KOGYO K. K., trademark: Adekastab HP-10)

T-SS: n-octadecyl 3-(3,5-di-tert-butyl-4-hydroxyphenyl) propionate (manufactured by Yoshitomi Fine Chemicals Ltd., trademark: Tominox SS)

S-12: 2,2,5,7,8-pentamethyl-6-hydroxychroman

Other symbols are as shown in Example 3.

The mixing ratios were, as shown in Table 19, that linear low density polyethylene was 99.825 parts by weight, calcium stearate was 0.075 part by weight, a 6-hydroxychroman compound (S-12) was not added or added in a proportion of 0.003 part by weight, and the phosphorus antioxidant (HP10) content and the phenolic antioxidant (T-SS) content were calculated to be equal according to "(0.100 part by weight- (S-12 content))÷2" (parts by weight).

From the results in Table 19, the following is known.

By the concurrent use of S-12 with a combination of T-SS and HP10, the heat stability during processing can be significantly improved.

TABLE 19

| | Mixtures | LLDPE | Ca—St | Antioxidant (a) synergist (including Comp. Ex.) kind | amount | (b) phosphorus antioxidant kind | amount | (c) phenolic antioxidant kind | amount | (b):(c) weight ratio | Total amount added | Synergist (wt %) in antioxidant | Synergist (ppm) in organic polymer composition | Torque increase start time (min) |
|---|---|---|---|---|---|---|---|---|---|---|---|---|---|---|
| Ex. | Mixture 1 | 99.825 | 0.075 | S-12 | 0.003 | HP10 | 0.0485 | T-SS | 0.0485 | 1:1 | 0.100 | 3.0 | 30 | 50 |

TABLE 19-continued

| | Mixtures | LLDPE | Ca—St | Antioxidant (a) synergist (including Comp. Ex.) kind | amount | (b) phosphorus antioxidant kind | amount | (c) phenolic antioxidant kind | amount | (b):(c) weight ratio | Total amount added | Synergist (wt %) in antioxidant | Synergist (ppm) in organic polymer composition | Torque increase start time (min) |
|---|---|---|---|---|---|---|---|---|---|---|---|---|---|---|
| Comp. Ex. | Mixture 2 | 99.825 | 0.075 | — | — | HP10 | 0.0500 | T-SS | 0.0500 | 1:1 | 0.100 | 0 | 0 | 12 |

Example 20

In this Example, it is shown that addition of a small amount of a 6-hydroxychroman compound can reduce the amounts of a phosphorus antioxidant and a phenolic antioxidant, and that a less amount of an antioxidant can achieve an equal stability improving effect.

In the same manner as in Example 1, melt index (MI) and yellowness index (YI) were measured, wherein the number of repeats was 3.

The mixing ratio and the symbols used in Table 20 are explained in the following.

T202: tris(2,4-di-tert-butylphenyl) phosphite (manufactured by Yoshitomi Fine Chemicals Ltd., trademark: Tomiphos 202)

T-TT: tetrakis[3-(3,5-di-tert-butyl-4-hydroxyphenyl) propionyloxymethyl]methane (manufactured by Yoshitomi Fine Chemicals Ltd., trademark: Tominox TT)

S-12: 2,2,5,7,8-pentamethyl-6-hydroxychroman

YI1: YI value of pellets obtained for the first time.

YI2: YI value of pellets obtained for the second time.

YI3: YI value of pellets obtained for the third time.

Other symbols are as shown in Example 4.

The mixing ratios were, as shown in Table 20, the total amount of the phosphorus antioxidant (T202) and the phenolic antioxidant (T-TT) was 0.100 part by weight (Mixtures 3, 9) or 0.060 part by weight (Mixture 6). In the Mixtures 1, 4 and 7, the total amount of the antioxidants was the same as in the above-mentioned Mixtures 3, 6 and 9 and a part thereof was substituted for a 6-hydroxychroman compound (S-12). The Mixtures 2, 5 and 8 did not contain a 6-hydroxychroman compound but contained the phosphorus antioxidant (T202) and the phenolic antioxidant (T-TT) in 1.5 times the amount thereof in Mixtures 3, 6 and 9 (about 1.67 times in Mixture 5).

From the results in Table 20, when Mixture 3 and Mixture 1, and Mixture 9 and Mixture 7, all having the same antioxidant content of 0.100 part by weight, are compared, Mixtures 1 and 7 using the inventive stabilizer composition containing the 6-hydroxychroman compound (S-12) showed remarkable effect as compared to Mixtures 3 and 9 without the 6-hydroxychroman compound. When Mixture 6 and Mixture 4 both having an antioxidant content of 0.060 part by weight are compared, Mixture 4 using the inventive stabilizer composition containing the 6-hydroxychroman compound (S-12) showed remarkable effect as compared to Mixture 6 without the 6-hydroxychroman compound.

When Mixture 2 containing an antioxidant in 1.5 times the amount thereof in Mixture 3 and Mixture 1 containing the same amount of an antioxidant added to Mixture 3 with a part thereof substituted for a 6-hydroxychroman compound are compared, Mixture 1 using the inventive stabilizer composition containing the 6-hydroxychroman compound (S-12) showed equal or somewhat better effect as compared to Mixture 2 without a 6-hydroxychroman compound but containing an antioxidant in 1.5 times greater weight. Similar effect was observed from the comparison of Mixture 5 and Mixture 4, and Mixture 8 and Mixture 7.

From the above, it is known that addition of a small amount of a 6-hydroxychroman compound results in an equal to or greater stability improving effect than a composition containing greater amounts of a phosphorus antioxidant and a phenolic antioxidant. In this way, the amount of an antioxidant to be added to an organic polymer material can be reduced.

TABLE 20

| | Mixtures | PP | Ca—St | Antioxidant (a) synergist (including Comp. Ex.) kind | amount | (b) phosphorus antioxidant kind | amount | (c) phenolic antioxidant kind | amount | (b):(c) weight ratio | Total amount added |
|---|---|---|---|---|---|---|---|---|---|---|---|
| Ex. | Mixture 1 | 99.825 | 0.075 | S-12 | 0.005 | T202 | 0.0475 | T-TT | 0.0475 | 1:1 | 0.100 |
| Com. Ex. | Mixture 2 | 99.775 | 0.075 | — | — | T202 | 0.0750 | T-TT | 0.0750 | 1:1 | 0.150 |
| | Mixture 3 | 99.825 | 0.075 | — | — | T202 | 0.0500 | T-TT | 0.0500 | 1:1 | 0.100 |

TABLE 20-continued

| | Mixtures | | | | | | | | | |
|---|---|---|---|---|---|---|---|---|---|---|
| Ex. | Mixture 4 | 99.865 | 0.075 | S-12 | 0.003 | T202 | 0.038 | T-TT | 0.019 | 2:1 | 0.060 |
| Com. Ex. | Mixture 5 | 99.825 | 0.075 | — | — | T202 | 0.067 | T-TT | 0.033 | 2:1 | 0.100 |
| | Mixture 6 | 99.865 | 0.075 | — | — | T202 | 0.040 | T-TT | 0.020 | 2:1 | 0.060 |
| Ex. | Mixture 7 | 99.825 | 0.075 | S-12 | 0.005 | T202 | 0.063 | T-TT | 0.032 | 2:1 | 0.100 |
| Com. Ex. | Mixture 8 | 99.775 | 0.075 | — | — | T202 | 0.100 | T-TT | 0.050 | 2:1 | 0.150 |
| | Mixture 9 | 99.825 | 0.075 | — | — | T202 | 0.067 | T-TT | 0.033 | 2:1 | 0.100 |

| | Mixtures | Synergist (wt %) in antioxidant | Synergist (ppm) in organic polymer composition | MI1 | MI2 | MI3 | YI1 | YI2 | YI3 |
|---|---|---|---|---|---|---|---|---|---|
| Ex. | Mixture 1 | 5 | 50 | 3.2 | 4.5 | 8.4 | 2.0 | 4.6 | 6.2 |
| Com. Ex. | Mixture 2 | 0 | 0 | 3.6 | 5.2 | 10 | 2.3 | 4.6 | 7.4 |
| | Mixture 3 | 0 | 0 | 4.5 | 11 | x | 2.0 | 4.5 | x |
| Ex. | Mixture 4 | 5 | 30 | 4.3 | 14 | x | 2.0 | 3.8 | x |
| Com. Ex. | Mixture 5 | 0 | 0 | 7.3 | x | x | 2.0 | x | x |
| | Mixture 6 | 0 | 0 | 11 | x | x | 1.4 | x | x |
| Ex. | Mixture 7 | 5 | 50 | 3.1 | 4.6 | 11 | 1.6 | 4.5 | 6.9 |
| Com. Ex. | Mixture 8 | 0 | 0 | 4.0 | 8.0 | 25 | 2.0 | 4.6 | 7.2 |
| | Mixture 9 | 0 | 0 | 7.3 | x | x | 2.0 | x | x |

Example 21

In this Example, it is shown that addition of a small amount of a 6-hydroxychroman compound can reduce the amounts of a phosphorus antioxidant and a phenolic antioxidant, and that a less amount of an antioxidant can achieve an equal stability improving effect.

In the same manner as in Example 1, melt index (MI) was measured, wherein the number of repeats was 3.

The mixing ratio and the symbols used in Table 21 are explained in the following.

PEPQ: tetrakis(2,4-di-tert-butylphenyl)-4,4'-biphenylenediphosphonite (manufactured by Clariant, trademark: Sandostab P-EPQ)
T-TT: tetrakis[3-(3,5-di-tert-butyl-4-hydroxyphenyl) propionyloxymethyl]methane (manufactured by Yoshitomi Fine Chemicals Ltd., trademark: Tominox TT)
S-12: 2,2,5,7,8-pentamethyl-6-hydroxychroman Other symbols are as shown in Example 4.

The mixing ratio is shown in Table 21, which was similar to the mixing ratio in Example 20 except that PEPQ was used as a phosphorus antioxidant.

From the results in Table 21, when Mixture 3 and Mixture 1, and Mixture 9 and Mixture 7, all having the same antioxidant content of 0.100 part by weight, are compared, Mixtures 1 and 7 using the inventive stabilizer composition containing the 6-hydroxychroman compound (S-12) showed remarkable effect as compared to Mixtures 3 and 9 without the 6-hydroxychroman compound. When Mixture 6 and Mixture 4 both having an antioxidant content of 0.060 part by weight are compared, Mixture 4 using the inventive stabilizer composition containing the 6-hydroxychroman compound (S-12) showed remarkable effect as compared to Mixture 6 without the 6-hydroxychroman compound.

When Mixture 2 containing an antioxidant in 1.5 times the amount thereof in Mixture 3 and Mixture 1 containing the same amount of an antioxidant added to Mixture 3 with a part thereof substituted for a 6-hydroxychroman compound are compared, Mixture 1 using the inventive stabilizer composition containing the 6-hydroxychroman compound (S-12) showed equal or somewhat better effect as compared to Mixture 2 without a 6-hydroxychroman compound but containing an antioxidant in 1.5 times greater weight. Similar effect was observed from the comparison of Mixture 5 and Mixture 4, and Mixture 8 and Mixture 7.

From the above, it is known that addition of a small amount of a 6-hydroxychroman compound results in an equal to or greater stability improving effect than a composition containing greater amounts of a phosphorus antioxidant and a phenolic antioxidant. In this way, the amount of an antioxidant to be added to an organic polymer material can be reduced.

TABLE 21

| | | | | Amount added (parts by weight) | | | | | | | Synergist (ppm) in | | | |
|---|---|---|---|---|---|---|---|---|---|---|---|---|---|---|
| | | | | Antioxidant | | | | | | Synergist | organic | | | |
| | | | | (a) synergist (including Comp. Ex.) | | (b) phosphorus antioxidant | | (c) phenolic antioxidant | | (b):(c) | Total | (wt %) in antioxi- | poly- mer compo- | | | |
| | Mixtures | PP | Ca—St | kind | amount | kind | amount | kind | amount | weight ratio | amount added | dant | sition | MI1 | MI2 | MI3 |
| Ex. | Mixture 1 | 99.825 | 0.075 | S-12 | 0.005 | PEPQ | 0.0475 | T-TT | 0.0475 | 1:1 | 0.100 | 5 | 50 | 2.7 | 3.0 | 3.6 |
| Com. Ex. | Mixture 2 | 99.775 | 0.075 | — | — | PEPQ | 0.0750 | T-TT | 0.0750 | 1:1 | 0.150 | 0 | 0 | 2.7 | 3.0 | 3.6 |
| | Mixture 3 | 99.825 | 0.075 | — | — | PEPQ | 0.0500 | T-TT | 0.0500 | 1:1 | 0.100 | 0 | 0 | 3.1 | 4.9 | 7.9 |
| Ex. | Mixture 4 | 99.865 | 0.075 | S-12 | 0.003 | PEPQ | 0.038 | T-TT | 0.019 | 2:1 | 0.060 | 5 | 30 | 2.8 | 4.1 | 5.9 |
| Com. Ex. | Mixture 5 | 99.825 | 0.075 | — | — | PEPQ | 0.067 | T-TT | 0.033 | 2:1 | 0.100 | 0 | 0 | 3.2 | 6.0 | x |
| | Mixture 6 | 99.865 | 0.075 | — | — | PEPQ | 0.040 | T-TT | 0.020 | 2:1 | 0.060 | 0 | 0 | 3.2 | 11 | x |
| Ex. | Mixture 7 | 99.825 | 0.075 | S-12 | 0.005 | PEPQ | 0.063 | T-TT | 0.032 | 2:1 | 0.100 | 5 | 50 | 2.8 | 3.2 | 4.5 |
| Com. Ex. | Mixture 8 | 99.775 | 0.075 | — | — | PEPQ | 0.100 | T-TT | 0.050 | 2:1 | 0.150 | 0 | 0 | 3.1 | 4.5 | 7.4 |
| | Mixture 9 | 99.825 | 0.075 | — | — | PEPQ | 0.067 | T-TT | 0.033 | 2:1 | 0.100 | 0 | 0 | 3.2 | 6.0 | x |

Example 22

In this Example, it is shown that addition of a small amount of a 6-hydroxychroman compound can reduce the amounts of a phosphorus antioxidant and a phenolic antioxidant, and that a less amount of an antioxidant can achieve an equal stability improving effect.

In the same manner as in Example 1, melt index (MI) was measured, wherein the number of repeats was 3.

The mixing ratio and the symbols used in Table 22 are explained in the following.
P101: tetrakis(2,4-di-tert-butyl-5-methylphenyl)-4,4'-biphenylenediphosphonite (manufactured by Yoshitomi Fine Chemicals Ltd., trademark: GSY-P101)
T-TT: tetrakis[3-(3,5-di-tert-butyl-4-hydroxyphenyl)propionyloxymethyl]methane (manufactured by Yoshitomi Fine Chemicals Ltd., trademark: Tominox TT)
S-12: 2,2,5,7,8-pentamethyl-6-hydroxychroman
Other symbols are as shown in Example 4.

The mixing ratio is shown in Table 22, which was similar to the mixing ratio in Example 20 except that P101 was used as a phosphorus antioxidant.

From the results in Table 22, when Mixture 3 and Mixture 1, and Mixture 9 and Mixture 7, all having the same antioxidant content of 0.100 part by weight, are compared, Mixtures 1 and 7 using the inventive stabilizer composition containing the 6-hydroxychroman compound (S-12) showed remarkable effect as compared to Mixtures 3 and 9 without the 6-hydroxychroman compound. When Mixture 6 and Mixture 4 both having an antioxidant content of 0.060 part by weight are compared, Mixture 4 using the inventive stabilizer composition containing the 6-hydroxychroman compound (S-12) showed remarkable effect as compared to Mixture 6 without the 6-hydroxychroman compound.

When Mixture 2 containing an antioxidant in 1.5 times the amount thereof in Mixture 3 and Mixture 1 containing the same amount of an antioxidant added to Mixture 3 with a part thereof substituted for a 6-hydroxychroman compound are compared, Mixture 1 using the inventive stabilizer composition containing the 6-hydroxychroman compound (S-12) showed equal effect as compared to Mixture 2 without a 6-hydroxychroman compound but containing an antioxidant in 1.5 times greater weight. Similar or somewhat better effect was observed from the comparison of Mixture 5 and Mixture 4, and Mixture 8 and Mixture 7.

From the above, it is known that addition of a small amount of a 6-hydroxychroman compound results in an equal to or greater stability improving effect than a composition containing greater amounts of a phosphorus antioxidant and a phenolic antioxidant. In this way, the amount of an antioxidant to be added to an organic polymer material can be reduced.

TABLE 22

| | Mixtures | Amount added (parts by weight) | | | | | | | | | Synergist (wt %) in antioxidant | Synergist (ppm) in organic polymer | MI1 | MI2 | MI3 |
|---|---|---|---|---|---|---|---|---|---|---|---|---|---|---|---|
| | | PP | Ca—St | (a) synergist (including Comp. Ex.) kind | amount | (b) phosphorus antioxidant kind | amount | (c) phenolic antioxidant kind | amount | (b):(c) weight ratio | Total amount added | | | | | |
| Ex. | Mixture 1 | 99.825 | 0.075 | S-12 | 0.005 | P101 | 0.0475 | T-TT | 0.0475 | 1:1 | 0.100 | 5 | 50 | 2.6 | 3.0 | 3.6 |
| Com. Ex. | Mixture 2 | 99.775 | 0.075 | — | — | P101 | 0.0750 | T-TT | 0.0750 | 1:1 | 0.150 | 0 | 0 | 2.7 | 3.2 | 3.8 |
| | Mixture 3 | 99.825 | 0.075 | — | — | P101 | 0.0500 | T-TT | 0.0500 | 1:1 | 0.100 | 0 | 0 | 3.1 | 4.1 | 6.0 |
| Ex. | Mixture 4 | 99.865 | 0.075 | S-12 | 0.003 | P101 | 0.038 | T-TT | 0.019 | 2:1 | 0.060 | 5 | 30 | 2.8 | 3.6 | 5.4 |
| Com. Ex. | Mixture 5 | 99.825 | 0.075 | — | — | P101 | 0.067 | T-TT | 0.033 | 2:1 | 0.100 | 0 | 0 | 3.1 | 5.8 | x |
| | Mixture 6 | 99.865 | 0.075 | — | — | P101 | 0.040 | T-TT | 0.020 | 2:1 | 0.060 | 0 | 0 | 3.2 | 10 | x |
| Ex. | Mixture 7 | 99.825 | 0.075 | S-12 | 0.005 | P101 | 0.063 | T-TT | 0.032 | 2:1 | 0.100 | 5 | 50 | 2.8 | 3.4 | 4.6 |
| Com. Ex. | Mixture 8 | 99.775 | 0.075 | — | — | P101 | 0.100 | T-TT | 0.050 | 2:1 | 0.150 | 0 | 0 | 3.0 | 4.0 | 7.1 |
| | Mixture 9 | 99.825 | 0.075 | — | — | P101 | 0.067 | T-TT | 0.033 | 2:1 | 0.100 | 0 | 0 | 3.1 | 5.8 | x |

Example 23

The Mixtures shown in Table 23 were dry-mixed for 5 min in a tumbler mixer and extruded from a 20 mm diameter extruder (die temperature set to 280° C.) to give strands, which were cooled with water and cut into pellets. This step was repeated 4 times. The stability during processing was evaluated by measuring, according to JIS K 7210, MI of the pellets extruded each time. The temperature for measurement was 230° C. and measurement load was 2.16 kgf. For Mixture 3 of Comparative Example, the following benzofuranone compound (R-10) was used instead of 6-hydroxychroman compound.

The symbols used in Table 23 are explained below.
PP: polypropylene (homopolymer)
Ca-St: calcium stearate
T202: tris(2,4-di-tert-butylphenyl) phosphite (manufactured by Yoshitomi Fine Chemicals Ltd., trademark: Tomiphos 202)
T-TT: tetrakis[3-(3,5-di-tert-butyl-4-hydroxyphenyl)propionyloxymethyl]methane (manufactured by Yoshitomi Fine Chemicals Ltd., trademark: Tominox TT)
S-2: 2,2,5-trimethyl-7-tert-butyl-6-hydroxychroman
S-12: 2,2,5,7,8-pentamethyl-6-hydroxychroman
R-10: 3-(3,4-dimethylphenyl)-5,7-di-tert-butyl-3H-benzofuran-2-one (synthesized according to the method described in JP-A-7-233160)
MI1: MI value of pellets obtained for the first time.
MI2: MI value of pellets obtained for the second time.
MI3: MI value of pellets obtained for the third time.
MI4: MI value of pellets obtained for the fourth time.
X: means that the resin was degraded and pellets could not be obtained after extrusion of strands.

From the results shown in Table 23, the compositions (Mixtures 1, 2) of the present invention containing 6-hydroxychroman compound (S-2 or S-12) were superior in stability during processing as compared to Comparative Example composition (Mixture 3) containing the same amount of benzofuranone compound (R-10).

TABLE 23

| | Mixtures | Amount added (parts by weight) | | | | | | | | |
|---|---|---|---|---|---|---|---|---|---|---|
| | | PP | Ca—St | (a) synergist (including Comp. Ex.) kind | amount | (b) phosphorus antioxidant kind | amount | (c) phenolic antioxidant kind | amount | (b):(c) weight ratio | Total amount added |
| Ex. | Mixture 1 | 99.795 | 0.100 | S-2 | 0.005 | T202 | 0.050 | T-TT | 0.050 | 1:1 | 0.105 |
| | Mixture 2 | 99.795 | 0.100 | S-12 | 0.005 | T202 | 0.050 | T-TT | 0.050 | 1:1 | 0.105 |
| Comp. Ex. | Mixture 3 | 99.795 | 0.100 | R-10 | 0.005 | T202 | 0.050 | T-TT | 0.050 | 1:1 | 0.105 |

TABLE 23-continued

|  | Mixtures | Synergist (wt %) in antioxidant | Synergist (ppm) in organic polymer composition | MI1 | MI2 | MI3 | MI4 |
|---|---|---|---|---|---|---|---|
| Ex. | Mixture 1 | 4.76 | 50 | 3.2 | 4.4 | 7.5 | 16 |
|  | Mixture 2 | 4.76 | 50 | 3.2 | 4.3 | 6.3 | 11 |
| Comp. Ex. | Mixture 3 | 4.76 | 50 | 4.1 | 11 | x | x |

Example 24

EVA (ethylene-vinyl acetate copolymer) was mixed in a beaker according to the compositions shown in Table 24. Using Labo Plastomill (type 50C-150, manufactured by TOYOSEIKI CORPORATION), the torque increase start time was measured by mixing at 210° C., 50 rpm. For Mixture 2 and Mixture 3 in Comparative Examples, the following benzofuranone compound (R-10) was used instead of 6-hydroxychroman compound.

The symbols used in Table 24 are explained below.
EVA: ethylene-vinyl acetate copolymer
T202: tris(2,4-di-tert-butylphenyl) phosphite (manufactured by Yoshitomi Fine Chemicals Ltd., trademark: Tomiphos 202)
T-SS: n-octadecyl 3-(3,5-di-tert-butyl-4-hydroxyphenyl) propionate (manufactured by Yoshitomi Fine Chemicals Ltd., trademark: Tominox SS)
S-12: 2,2,5,7,8-pentamethyl-6-hydroxychroman
R-10: 3-(3,4-dimethylphenyl)-5,7-di-tert-butyl-3H-benzofuran-2-one (synthesized according to the method described in JP-A-7-233160)

From Table 24, it is evident that the composition (Mixture 1) of the present invention containing 6-hydroxychroman compound was extremely superior in heat stability during processing using Labo Plastomill as compared to the composition (Comparative Example Mixture 2) containing the same amount of 3-(3,4-dimethylphenyl)-5,7-di-tert-butyl-3H-benzofuran-2-one (R-10), the composition (Comparative Example Mixture 3) containing a three-fold amount of R-10 and the composition (Comparative Example Mixture 4) without 6-hydroxychroman compound.

Example 25

The Mixtures shown in Table 25-1 and 25-2 were dry-mixed for 5 min in a tumbler mixer and extruded from a 20 mm diameter extruder (die temperature set to 260° C.) to give strands, which were cooled with water and cut into pellets. This step was repeated 4 times. The stability during processing was evaluated by measuring, according to JIS K 7210, MI of the pellets extruded each time. The temperature for measurement was 230° C. and measurement load was 2.16 kgf. In Comparative Examples, the following 6-acetoxychroman compound (S-4) and benzofuranone compound (R-10) were used instead of 6-hydroxychroman compound.

The symbols used in Tables 25-1 and 25-2 mean the following.
PP: polypropylene (homopolymer)
Ca-St: calcium stearate
T202: tris(2,4-di-tert-butylphenyl) phosphite (manufactured by Yoshitomi Fine Chemicals Ltd., trademark: Tomiphos 202)
T-TT: tetrakis[3-(3,5-di-tert-butyl-4-hydroxyphenyl) propionyloxymethyl]methane (manufactured by Yoshitomi Fine Chemicals Ltd., trademark: Tominox TT)
S-1: 2,2-dimethyl-6-hydroxychroman
S-2: 2,2,5-trimethyl-7-tert-butyl-6-hydroxychroman
S-3: 2,2,5-trimethyl-8-tert-butyl-6-hydroxychroman
S-5: 2,2,7,8-tetramethyl-6-hydroxychroman
S-6: 2,2,5,7-tetramethyl-6-hydroxychroman
S-7: 2,2,5,8-tetramethyl-6-hydroxychroman
S-8: 2,2-dimethyl-7-tert-butyl-6-hydroxychroman
S-9: 4-isopropyl-2,2,5-trimethyl-7-tert-butyl-6-hydroxychroman
S-12: 2,2,5,7,8-pentamethyl-6-hydroxychroman
S-4: 2,2,5,7,8-pentamethyl-6-acetoxychroman

TABLE 24

| | | Amount added (parts by weight) | | | | | | | | | Synergist | | |
|---|---|---|---|---|---|---|---|---|---|---|---|---|---|
| | | | | Antioxidant | | | | | | | | | |
| | | | | (a) synergist (including Comp. Ex.) | | (b) phosphorus antioxidant | | (c) phenolic antioxidant | | (b):(c) weight | Total amount | Synergist (wt %) in | (ppm) in organic polymer | Torque increase start time |
| | Mixtures | EVA | Ca—St | kind | amount | kind | amount | kind | amount | ratio | added | antioxidant | composition | (min) |
| Ex. | Mixture 1 | 99.9 | — | S-12 | 0.005 | T202 | 0.063 | T-SS | 0.032 | 2:1 | 0.100 | 5 | 50 | 62 |
| Comp. Ex. | Mixture 2 | 99.9 | — | R-10 | 0.005 | T202 | 0.063 | T-SS | 0.032 | 2:1 | 0.100 | 5 | 50 | 30 |
| | Mixture 3 | 99.9 | — | R-10 | 0.015 | T202 | 0.057 | T-SS | 0.028 | 2:1 | 0.100 | 15 | 150 | 44 |
| | Mixture 4 | 99.9 | — | — | — | T202 | 0.067 | T-SS | 0.033 | 2:1 | 0.100 | 0 | 0 | 15 |

R-10: 3-(3,4-dimethylphenyl)-5,7-di-tert-butyl-3H-benzofuran-2-one (synthesized according to the method described in JP-A-7-233160)
MI1: MI value of pellets obtained for the first time.
MI2: MI value of pellets obtained for the second time.
MI3: MI value of pellets obtained for the third time.
MI4: MI value of pellets obtained for the fourth time.

From the results in Table 25-1, it is evident that the compositions (Mixtures 2–10) of the present invention containing 6-hydroxychroman compound showed superior stability during processing as compared to a composition without a 6-hydroxychroman compound (Mixture 1), and Comparative Example compositions (Mixtures 11, 12) containing the same amount of a 6-acetoxychroman compound (S-4) or benzofuranone compound (R-10). The composition containing a 6-acetoxychroman compound (S-4) (Mixture 11) showed the same level of stability during processing as the composition without a 6-hydroxychroman compound (Mixture 1). Similar results were obtained from the compositions (Mixtures 13–21) containing a half amount (0.0025 part by weight) of the 6-hydroxychroman compound (Table 25-2).

TABLE 25-1

| | | | | Amount added (parts by weight) | | | | | | |
|---|---|---|---|---|---|---|---|---|---|---|
| | | | | Antioxidant | | | | | | |
| | Mixtures | PP | Ca—St | (a) synergist (including Comp. Ex.) kind | amount | (b) phosphorus antioxidant kind | amount | (c) phenolic antioxidant kind | amount | (b):(c) weight ratio | Total amount added |
| Comp. Ex. | Mixture 1 | 99.89 | 0.05 | — | — | T202 | 0.030 | T-TT | 0.030 | 1:1 | 0.060 |
| Ex. | Mixture 2 | 99.895 | 0.05 | S-1 | 0.005 | T202 | 0.025 | T-TT | 0.025 | 1:1 | 0.055 |
| | Mixture 3 | 99.895 | 0.05 | S-2 | 0.005 | T202 | 0.025 | T-TT | 0.025 | 1:1 | 0.055 |
| | Mixture 4 | 99.895 | 0.05 | S-3 | 0.005 | T202 | 0.025 | T-TT | 0.025 | 1:1 | 0.055 |
| | Mixture 5 | 99.895 | 0.05 | S-5 | 0.005 | T202 | 0.025 | T-TT | 0.025 | 1:1 | 0.055 |
| | Mixture 6 | 99.895 | 0.05 | S-6 | 0.005 | T202 | 0.025 | T-TT | 0.025 | 1:1 | 0.055 |
| | Mixture 7 | 99.895 | 0.05 | S-7 | 0.005 | T202 | 0.025 | T-TT | 0.025 | 1:1 | 0.055 |
| | Mixture 8 | 99.895 | 0.05 | S-8 | 0.005 | T202 | 0.025 | T-TT | 0.025 | 1:1 | 0.055 |
| | Mixture 9 | 99.895 | 0.05 | S-9 | 0.005 | T202 | 0.025 | T-TT | 0.025 | 1:1 | 0.055 |
| | Mixture 10 | 99.895 | 0.05 | S-12 | 0.005 | T202 | 0.025 | T-TT | 0.025 | 1:1 | 0.055 |
| Comp. Ex. | Mixture 11 | 99.895 | 0.05 | S-4 | 0.005 | T202 | 0.025 | T-TT | 0.025 | 1:1 | 0.055 |
| | Mixture 12 | 99.895 | 0.05 | R-10 | 0.005 | T202 | 0.025 | T-TT | 0.025 | 1:1 | 0.055 |

| | Mixtures | Synergist (wt %) in antioxidant | Synergist (ppm) in organic polymer composition | MI1 | MI4 | YI1 | YI4 |
|---|---|---|---|---|---|---|---|
| Comp. Ex. | Mixture 1 | 0 | 0 | 4.3 | 6.3 | 9.8 | 15.8 |
| Ex. | Mixture 2 | 9.1 | 50 | 3.9 | 5.4 | 7.0 | 9.3 |
| | Mixture 3 | 9.1 | 50 | 3.2 | 3.6 | 4.8 | 6.3 |
| | Mixture 4 | 9.1 | 50 | 3.7 | 4.8 | 6.2 | 8.2 |
| | Mixture 5 | 9.1 | 50 | 3.4 | 4.5 | 5.7 | 7.5 |
| | Mixture 6 | 9.1 | 50 | 3.3 | 4.4 | 5.3 | 6.8 |
| | Mixture 7 | 9.1 | 50 | 3.4 | 4.8 | 5.9 | 7.9 |
| | Mixture 8 | 9.1 | 50 | 3.3 | 4.1 | 4.9 | 6.3 |
| | Mixture 9 | 9.1 | 50 | 3.4 | 4.3 | 5.7 | 7.5 |
| | Mixture 10 | 9.1 | 50 | 3.0 | 3.4 | 4.5 | 6.1 |

TABLE 25-1-continued

| | | | | | | | | |
|---|---|---|---|---|---|---|---|---|
| Comp. Ex. | Mixture 11 | 9.1 | 50 | 4.8 | 7.0 | 10.2 | 14.2 | |
| | Mixture 12 | 9.1 | 50 | 4.5 | 6.4 | 8.0 | 10.4 | |

TABLE 25-2

| | | | | | Amount added (parts by weight) | | | | | | |
|---|---|---|---|---|---|---|---|---|---|---|---|
| | | | | | | Antioxidant | | | | | |
| | Mixtures | PP | Ca—St | (a) synergist (including Comp. Ex.) kind | amount | (b) phosphorus antioxidant kind | amount | (c) phenolic antioxidant kind | amount | (b):(c) weight ratio | Total amount added |
| Ex. | Mixture 13 | 99.898 | 0.05 | S-1 | 0.0025 | T202 | 0.025 | T-TT | 0.025 | 1:1 | 0.0525 |
| | Mixture 14 | 99.898 | 0.05 | S-2 | 0.0025 | T202 | 0.025 | T-TT | 0.025 | 1:1 | 0.0525 |
| | Mixture 15 | 99.898 | 0.05 | S-3 | 0.0025 | T202 | 0.025 | T-TT | 0.025 | 1:1 | 0.0525 |
| | Mixture 16 | 99.898 | 0.05 | S-5 | 0.0025 | T202 | 0.025 | T-TT | 0.025 | 1:1 | 0.0525 |
| | Mixture 17 | 99.898 | 0.05 | S-6 | 0.0025 | T202 | 0.025 | T-TT | 0.025 | 1:1 | 0.0525 |
| | Mixture 18 | 99.898 | 0.05 | S-7 | 0.0025 | T202 | 0.025 | T-TT | 0.025 | 1:1 | 0.0525 |
| | Mixture 19 | 99.898 | 0.05 | S-8 | 0.0025 | T202 | 0.025 | T-TT | 0.025 | 1:1 | 0.0525 |
| | Mixture 20 | 99.898 | 0.05 | S-9 | 0.0025 | T202 | 0.025 | T-TT | 0.025 | 1:1 | 0.0525 |
| | Mixture 21 | 99.898 | 0.05 | S-12 | 0.0025 | T202 | 0.025 | T-TT | 0.025 | 1:1 | 0.0525 |
| Comp. Ex. | Mixture 22 | 99.898 | 0.05 | S-4 | 0.0025 | T202 | 0.025 | T-TT | 0.025 | 1:1 | 0.0525 |
| | Mixture 23 | 99.898 | 0.05 | R-10 | 0.0025 | T202 | 0.025 | T-TT | 0.025 | 1:1 | 0.0525 |

| | | Mixtures | Synergist (wt %) in antioxidant | Synergist (ppm) in organic polymer composition | MI1 | MI2 | MI3 | MI4 |
|---|---|---|---|---|---|---|---|---|
| Ex. | | Mixture 13 | 4.8 | 25 | 4.1 | 5.7 | 7.3 | 9.5 |
| | | Mixture 14 | 4.8 | 25 | 3.3 | 3.7 | 5.1 | 7.0 |
| | | Mixture 15 | 4.8 | 25 | 3.9 | 5.2 | 7.0 | 9.1 |
| | | Mixture 16 | 4.8 | 25 | 3.9 | 5.0 | 6.1 | 7.9 |
| | | Mixture 17 | 4.8 | 25 | 3.7 | 4.9 | 5.8 | 8.0 |
| | | Mixture 18 | 4.8 | 25 | 3.8 | 5.2 | 6.3 | 8.5 |
| | | Mixture 19 | 4.8 | 25 | 3.7 | 4.8 | 5.7 | 6.9 |
| | | Mixture 20 | 4.8 | 25 | 3.9 | 4.9 | 6.0 | 7.7 |
| | | Mixture 21 | 4.8 | 25 | 3.3 | 4.0 | 5.4 | 6.5 |
| Comp. Ex. | | Mixture 22 | 4.8 | 25 | 5.0 | 7.5 | 10.7 | 16.0 |
| | | Mixture 23 | 4.8 | 25 | 4.8 | 6.6 | 8.7 | 10.9 |

Example 26

The Mixtures shown in Table 26 were dry-mixed for 5 min in a tumbler mixer and extruded from a 20 mm diameter extruder (die temperature set to 280° C.) to give strands, which were cooled with water and cut into pellets. This step was repeated 3 times. The stability during processing was evaluated by measuring, according to JIS K 7210, MI of the pellets extruded each time. The temperature for measurement was 230° C. and measurement load was 2.16 kgf. In Comparative Examples, the following phenolic antioxidant (YBHT) or benzofuranone compound (R-10) was used instead of 6-hydroxychroman compound.

The symbols used in Table 26 mean the following.
PP: polypropylene (homopolymer)
Ca-St: calcium stearate
T202: tris(2,4-di-tert-butylphenyl) phosphite (manufactured by Yoshitomi Fine Chemicals Ltd., trademark: Tomiphos 202)
T-TT: tetrakis[3-(3,5-di-tert-butyl-4-hydroxyphenyl)propionyloxymethyl]methane (manufactured by Yoshitomi Fine Chemicals Ltd., trademark: Tominox TT)
YBHT: 2,6-di-tert-butyl-4-methylphenol (manufactured by Yoshitomi Fine Chemicals Ltd., trademark: Yoshinox BHT)
S-2: 2,2,5-trimethyl-7-tert-butyl-6-hydroxychroman
S-6: 2,2,5,7-tetramethyl-6-hydroxychroman
S-8: 2,2-dimethyl-7-tert-butyl-6-hydroxychroman
R-10: 3-(3,4-dimethylphenyl)-5,7-di-tert-butyl-3H-benzofuran-2-one (synthesized according to the method described in JP-A-7-233160)

MI1: MI value of pellets obtained for the first time.
MI2: MI value of pellets obtained for the second time.
MI3: MI value of pellets obtained for the third time.

X: means that the resin was degraded and pellets could not be obtained after extrusion of strands.

From Table 26, it is evident that the compositions (Mixtures 2–4) of the present invention showed markedly smaller MI values than Mixture 1 without 6-hydroxychroman compound and superior stability during processing as compared to Comparative Examples. The compositions (Mixtures 2–4) of the present invention containing 6-hydroxychroman compounds (S-2, S-6, S-8) as synergists showed a fine improving effect on the stability during processing as compared to the compositions (Mixtures 5, 6) containing the same amounts of 2,6-di-tert-butyl-4-methylphenol (YBHT) or 3-(3,4-dimethylphenyl)-5,7-di-tert-butyl-3H-benzofuran-2-one (R-10) as synergists. Similar results were obtained from the compositions (Mixtures 7–9) containing a half amount (0.0025 part by weight) of the 6-hydroxychroman compound.

TABLE 26

| | | Amount added (parts by weight) | | | | | | | | |
|---|---|---|---|---|---|---|---|---|---|---|
| | | | | Antioxidant | | | | | | |
| | Mixtures | PP | Ca—St | (a) synergist (including Comp. Ex.) | | (b) phosphorus antioxidant | | (c) phenolic antioxidant | | (b):(c) weight ratio | Total amount added |
| | | | | kind | amount | kind | amount | kind | amount | | |
| Com. Ex. | Mixture 1 | 99.890 | 0.05 | — | — | T202 | 0.030 | T-TT | 0.030 | 1:1 | 0.060 |
| Ex. | Mixture 2 | 99.895 | 0.05 | S-2 | 0.005 | T202 | 0.025 | T-TT | 0.025 | 1:1 | 0.055 |
| | Mixture 3 | 99.895 | 0.05 | S-6 | 0.005 | T202 | 0.025 | T-TT | 0.025 | 1:1 | 0.055 |
| | Mixture 4 | 99.895 | 0.05 | S-8 | 0.005 | T202 | 0.025 | T-TT | 0.025 | 1:1 | 0.055 |
| Com. Ex. | Mixture 5 | 99.895 | 0.05 | YBHT | 0.005 | T202 | 0.025 | T-TT | 0.025 | 1:1 | 0.055 |
| | Mixture 6 | 99.895 | 0.05 | R-10 | 0.005 | T202 | 0.025 | T-TT | 0.025 | 1:1 | 0.055 |
| Ex. | Mixture 7 | 99.898 | 0.05 | S-2 | 0.0025 | T202 | 0.025 | T-TT | 0.025 | 1:1 | 0.0525 |
| | Mixture 8 | 99.898 | 0.05 | S-6 | 0.0025 | T202 | 0.025 | T-TT | 0.025 | 1:1 | 0.0525 |
| | Mixture 9 | 99.898 | 0.05 | S-8 | 0.0025 | T202 | 0.025 | T-TT | 0.025 | 1:1 | 0.0525 |
| Com. Ex. | Mixture 10 | 99.898 | 0.05 | YBHT | 0.0025 | T202 | 0.025 | T-TT | 0.025 | 1:1 | 0.0525 |
| | Mixture 11 | 99.898 | 0.05 | R-10 | 0.0025 | T202 | 0.025 | T-TT | 0.025 | 1:1 | 0.0525 |

| | Mixtures | Synergist (wt %) in antioxidant | Synergist (ppm) in organic polymer composition | MI1 | MI2 | MI3 |
|---|---|---|---|---|---|---|
| Com. Ex. | Mixture 1 | 0 | 0 | 8.8 | 26 | x |
| Ex. | Mixture 2 | 9.1 | 50 | 3.9 | 7.6 | 21 |
| | Mixture 3 | 9.1 | 50 | 4.7 | 9.4 | 27 |
| | Mixture 4 | 9.1 | 50 | 4.8 | 9.8 | 28 |
| Com. Ex. | Mixture 5 | 9.1 | 50 | 8.7 | 21 | x |
| | Mixture 6 | 9.1 | 50 | 6.6 | 18 | 35 |
| Ex. | Mixture 7 | 4.8 | 25 | 4.8 | 9.9 | 25 |

TABLE 26-continued

|     |           |     |    |     |      |    |
|-----|-----------|-----|----|-----|------|----|
|     | Mixture 8 | 4.8 | 25 | 5.6 | 12.1 | 31 |
|     | Mixture 9 | 4.8 | 25 | 5.8 | 13.2 | 33 |
| Com. Ex. | Mixture 10 | 4.8 | 25 | 8.8 | 25 | x |
|     | Mixture 11 | 4.8 | 25 | 7.0 | 20 | x |

Example 27

The Mixtures shown in Table 27A were dry-mixed for 5 min in a tumbler mixer and extruded from a 20 mm diameter extruder (die temperature set to 280° C.) to give strands, which were cooled with water and cut into pellets. This step was repeated 5 times. The stability during processing was evaluated by measuring, according to JIS K 7210, MI of the pellets extruded each time. The temperature for measurement was 230° C. and measurement load was 2.16 kgf.

The symbols used in Tables 27A and 27B mean the following.
PP: polypropylene (homopolymer)
Ca-St: calcium stearate
T202: tris(2,4-di-tert-butylphenyl) phosphite (manufactured by Yoshitomi Fine Chemicals Ltd., trademark: Tomiphos 202)
T-TT: tetrakis[3-(3,5-di-tert-butyl-4-hydroxyphenyl)propionyloxymethyl]methane (manufactured by Yoshitomi Fine Chemicals Ltd., trademark: Tominox TT)
S-12: 2,2,5,7,8-pentamethyl-6-hydroxychroman
MI1: MI value of pellets obtained for the first time.
MI2: MI value of pellets obtained for the second time.
MI3: MI value of pellets obtained for the third time.
MI5: MI value of pellets obtained for the fifth time.
X: means that the resin was degraded and pellets could not be obtained after extrusion of strands.

The compositions (Mixtures 1, 2, 3, 4) of the present invention respectively contained an antioxidant (T202/T-TT/S-12=47.5/47.5/5, containing 6-hydroxychroman compound at a concentration of 5 wt %) at concentrations of 0.05 wt %, 0.10 wt %, 0.30 wt % and 0.50 wt % of the polypropylene composition. The compositions (Mixtures 6, 7, 8, 9) of Comparative Examples respectively contained an antioxidant (T202/T-TT=1/1) without 6-hydroxychroman compound at concentrations of 0.05 wt %, 0.10 wt %, 0.30 wt % and 0.50 wt % of the polypropylene composition.

The relationship between MI and concentration of antioxidant is shown in Table 27B. The symbols used in Table 27B mean the following.

← composition without 6-hydroxychroman compound, which was degraded to the degree pellets were not obtainable.

⊚ composition containing 6-hydroxychroman compound, which showed markedly smaller MI value as compared to the composition without 6-hydroxychroman compound.

○ composition containing 6-hydroxychroman compound, which showed almost the same level of MI value, but lower in MI value by 0.2 point or more when the compound was contained.

Δ composition containing 6-hydroxychroman compound, which showed almost the same level of MI value as the composition without the 6-hydroxychroman compound, wherein the difference from the value without 6-hydroxychroman compound was 0.1.

= No difference between addition and otherwise of 6-hydroxychroman compound.

As is evident from the results shown in Table 27B, the composition (6-hydroxychroman compound contained in polypropylene composition at 0.0025 wt %–0.025 wt %) containing an antioxidant (proportion of 6-hydroxychroman compound was 5 wt % of the total amount of antioxidants contained in polypropylene composition) containing 6-hydroxychroman compound in a proportion of 0.05 wt %–0.50 wt % showed markedly smaller MI value as compared to the composition containing the same amount of an antioxidant without 6-hydroxychroman compound, and therefore, particularly superior stability during processing.

TABLE 27A

| | | Amount added (parts by weight) | | | | | | | | |
|---|---|---|---|---|---|---|---|---|---|---|
| | | | | Antioxidant | | | | | | |
| | | | | (a) synergist (including Comp. Ex.) | | (b) phosphorus antioxidant | | (c) phenolic antioxidant | | (b):(c) weight | Total amount |
| | Mixtures | PP | Ca—St | kind | amount | kind | amount | kind | amount | ratio | added |
| Ex. | Mixture 1 | 99.875 | 0.075 | S-12 | 0.0025 | T202 | 0.02375 | T-TT | 0.02375 | 1:1 | 0.0500 |
| | Mixture 2 | 99.825 | 0.075 | S-12 | 0.0050 | T202 | 0.04750 | T-TT | 0.04750 | 1:1 | 0.1000 |
| | Mixture 3 | 99.625 | 0.075 | S-12 | 0.0150 | T202 | 0.14250 | T-TT | 0.14250 | 1:1 | 0.3000 |
| | Mixture 4 | 99.425 | 0.075 | S-12 | 0.0250 | T202 | 0.23750 | T-TT | 0.23750 | 1:1 | 0.5000 |
| Comp. Ex. | Mixture 5 | 99.925 | 0.075 | — | — | T202 | 0 | T-TT | 0 | — | — |
| | Mixture 6 | 99.875 | 0.075 | — | — | T202 | 0.0250 | T-TT | 0.0250 | — | 0.0500 |

TABLE 27A-continued

| | | | | | | | | | | |
|---|---|---|---|---|---|---|---|---|---|---|
| Mixture 6 | | | | | | | | | | |
| Mixture 7 | 99.825 | 0.075 | — | — | T202 | 0.0500 | T-TT | 0.0500 | — | 0.1000 |
| Mixture 8 | 99.625 | 0.075 | — | — | T202 | 0.1500 | T-TT | 0.1500 | — | 0.3000 |
| Mixture 9 | 99.425 | 0.075 | — | — | T202 | 0.2500 | T-TT | 0.2500 | — | 0.5000 |

| | | Mixtures | Synergist (wt %) in antioxidant | Synergist (ppm) in organic polymer composition | MI1 | MI2 | MI3 | MI5 |
|---|---|---|---|---|---|---|---|---|
| Ex. | | Mixture 1 | 5 | 25 | 4.2 | 9.3 | 15 | 26 |
| | | Mixture 2 | 5 | 50 | 3.2 | 4.5 | 6.1 | 9.1 |
| | | Mixture 3 | 5 | 150 | 2.7 | 3.1 | 3.5 | 4.6 |
| | | Mixture 4 | 5 | 250 | 2.6 | 2.9 | 3.3 | 4.2 |
| Comp. Ex. | | Mixture 5 | 0 | 0 | 15 | x | x | x |
| | | Mixture 6 | 0 | 0 | 8.8 | 20 | x | x |
| | | Mixture 7 | 0 | 0 | 4.5 | 7.1 | 12 | 24 |
| | | Mixture 8 | 0 | 0 | 3.0 | 3.3 | 3.9 | 5.0 |
| | | Mixture 9 | 0 | 0 | 2.7 | 3.0 | 3.4 | 4.2 |

Example 28

EVA (ethylene-vinyl acetate copolymer) was mixed in a beaker according to the compositions shown in Table 28. Using Labo Plastomill, the torque increase start time was measured by mixing at 210° C., 50 rpm and resin amount of 40 g. In Comparative Examples, the following benzofuranone compound (R-10) was used instead of 6-hydroxychroman compound.

The symbols used in Table 28 mean the following.
EVA: ethylene-vinyl acetate copolymer
T202: tris(2,4-di-tert-butylphenyl) phosphite (manufactured by Yoshitomi Fine Chemicals Ltd., trademark: Tomiphos 202)
T-SS: n-octadecyl 3-(3,5-di-tert-butyl-4-hydroxyphenyl) propionate (manufactured by Yoshitomi Fine Chemicals Ltd., trademark: Tominox SS)
S-2: 2,2,5-trimethyl-7-tert-butyl-6-hydroxychroman
R-10: 3-(3,4-dimethylphenyl)-5,7-di-tert-butyl-3H-benzofuran-2-one (synthesized according to the method described in JP-A-7-233160)

From Table 28, it is evident that the composition (Mixture 1) of the present invention containing 6-hydroxychroman compound showed about 2 times longer torque increase start time than Comparative Example Mixture 2 containing the same amount of benzofuranone compound (R-10) and Comparative Example Mixture 3 without 6-hydroxychroman compound, and therefore, fine heat stability during processing.

TABLE 28

| | | | | Amount added (parts by weight) | | | | | | | | Synergist | | |
|---|---|---|---|---|---|---|---|---|---|---|---|---|---|---|
| | | | | | Antioxidant | | | | | | | Synergist | (ppm) in | Torque |
| | | | | (a) synergist (including Comp. Ex.) | | (b) phosphorus antioxidant | | (c) phenolic antioxidant | | (b):(c) weight | Total amount | (wt %) in antioxidant | organic polymer composition | increase start time |
| | Mixtures | EVA | Ca-St | kind | amount | kind | amount | kind | amount | ratio | added | | | (min) |
| Ex. | Mixture 1 | 100 | — | S-2 | 0.005 | T202 | 0.0475 | T-SS | 0.0475 | 1:1 | 0.100 | 5 | 50 | 43 |
| Comp. Ex. | Mixture 2 | 100 | — | R-10 | 0.005 | T202 | 0.0475 | T-SS | 0.0475 | 1:1 | 0.100 | 5 | 50 | 24 |
| | Mixture 3 | 100 | — | — | — | T202 | 0.0500 | T-SS | 0.0500 | 1:1 | 0.100 | 0 | 0 | 18 |

Example 29

The heat stability during processing was evaluated using a phenolic antioxidant and a phosphorus antioxidant at different weight ratios.

The mixtures shown in Table 29 were accurately weighed and mixed in beakers. Using Labo Plastomill (type 50C-150, manufactured by TOYOSEIKI CORPORATION), the torque increase start time was measured by mixing at 210° C., 60 rpm.

The symbols used in Table 29 mean the following.
LLDPE: linear low density polyethylene
T202: tris(2,4-di-tert-butylphenyl) phosphite (manufactured by Yoshitomi Fine Chemicals Ltd., trademark: Tomiphos 202)
T-SS: n-octadecyl 3-(3,5-di-tert-butyl-4-hydroxyphenyl) propionate (manufactured by Yoshitomi Fine Chemicals Ltd., trademark: Tominox SS)
S-12: 2,2,5,7,8-pentamethyl-6-hydroxychroman From Table 29, it is evident that the compositions (Mixtures 1–3) of the present invention containing 6-hydroxychroman compound showed about 3 times longer torque increase start time than did the compositions (Comparative Example Mixtures 4–6) without 6-hydroxychroman compound, and therefore, superior heat stability during processing.

Comparative Examples, the following benzofuranone compound (R-10) was used instead of 6-hydroxychroman compound.

The symbols used in Table 30 mean the following.
PP: polypropylene (homopolymer)
Ca-St: calcium stearate
T202: tris(2,4-di-tert-butylphenyl) phosphite (manufactured by Yoshitomi Fine Chemicals Ltd., trademark: Tomiphos 202)
T-TT: tetrakis[3-(3,5-di-tert-butyl-4-hydroxyphenyl) propionyloxymethyl]methane (manufactured by Yoshitomi Fine Chemicals Ltd., trademark: Tominox TT)
S-12: 2,2,5,7,8-pentamethyl-6-hydroxychroman
R-10: 3-(3,4-dimethylphenyl)-5,7-di-tert-butyl-3H-benzofuran-2-one (synthesized according to the method described in JP-A-7-233160)
MI1: MI value of pellets obtained for the first time.
MI2: MI value of pellets obtained for the second time.
MI3: MI value of pellets obtained for the third time.

TABLE 29

| | | | | Amount added (parts by weight) | | | | | | | Synergist | | |
|---|---|---|---|---|---|---|---|---|---|---|---|---|---|
| | | | | | Antioxidant | | | | | | Synergist | (ppm) in | Torque |
| | | | | (a) synergist (including Comp. Ex.) | | (b) phosphorus antioxidant | | (c) phenolic antioxidant | | (b):(c) weight | Total amount | (wt %) in antioxidant | organic polymer | increase start time |
| | Mixtures | LLDPE | Ca-St | kind | amount | kind | amount | kind | amount | ratio | added | | composition | (min) |
| Ex. | Mixture 1 | 99.9 | — | S-12 | 0.005 | T202 | 0.032 | T-SS | 0.063 | 1:2 | 0.100 | 5 | 50 | 45 |
| | Mixture 2 | 99.9 | — | S-12 | 0.005 | T202 | 0.0475 | T-SS | 0.0475 | 1:1 | 0.100 | 5 | 50 | 43 |
| | Mixture 3 | 99.9 | — | S-12 | 0.005 | T202 | 0.063 | T-SS | 0.032 | 2:1 | 0.100 | 5 | 50 | 42 |
| Comp. Ex. | Mixture 4 | 99.9 | — | — | — | T202 | 0.033 | T-SS | 0.067 | 1:2 | 0.100 | 0 | 0 | 14 |
| | Mixture 5 | 99.9 | — | — | — | T202 | 0.05 | T-SS | 0.05 | 1:1 | 0.100 | 0 | 0 | 14 |
| | Mixture 6 | 99.9 | — | — | — | T202 | 0.067 | T-SS | 0.033 | 2:1 | 0.100 | 0 | 0 | 13 |

Example 30

The Mixtures shown in Table 30 were dry-mixed for 5 min in a tumbler mixer and extruded from a 20 mm diameter extruder (die temperature set to 280° C.) to give strands, which were cooled with water and cut into pellets. This step was repeated 4 times. The stability during processing was evaluated by measuring, according to JIS K 7210, MI of the pellets extruded each time. The temperature for measurement was 230° C. and measurement load was 2.16 kgf. In MI4: MI value of pellets obtained for the fourth time.

From Table 30, it is evident that the compositions (Mixtures 1–6) of the present invention had superior stability during processing as compared to Comparative Example compositions (Mixtures 7–13). In addition, 6-hydroxychroman compound to be used in the present invention showed a superior stabilizing effect as compared to 3-(3,4-dimethylphenyl)-5,7-di-tert-butyl-3H-benzofuran-2-one (R-10).

TABLE 30

| | | | | Amount added (parts by weight) | | | | | | | |
|---|---|---|---|---|---|---|---|---|---|---|---|
| | | | | | Antioxidant | | | | | | |
| | | | | (a) synergist (including Comp. Ex.) | | (b) phosphorus antioxidant | | (c) phenolic antioxidant | | (b):(c) weight | Total amount |
| | Mixtures | PP | Ca-St | kind | amount | kind | amount | kind | amount | ratio | added |
| Ex. | Mixture 1 | 99.8 | 0.100 | S-12 | 0.001 | T202 | 0.0495 | T-TT | 0.0495 | 1:1 | 0.100 |
| | Mixture 2 | 99.8 | 0.100 | S-12 | 0.003 | T202 | 0.0485 | T-TT | 0.0485 | 1:1 | 0.100 |
| | Mixture 3 | 99.8 | 0.100 | S-12 | 0.005 | T202 | 0.0475 | T-TT | 0.0475 | 1:1 | 0.100 |
| | Mixture 4 | 99.8 | 0.100 | S-12 | 0.007 | T202 | 0.0465 | T-TT | 0.0465 | 1:1 | 0.100 |
| | Mixture 5 | 99.8 | 0.100 | S-12 | 0.009 | T202 | 0.0455 | T-TT | 0.0455 | 1:1 | 0.100 |

TABLE 30-continued

|  | Mixtures | | | | | | | | | |
|---|---|---|---|---|---|---|---|---|---|---|
|  | Mixture 6 | 99.8 | 0.100 | S-12 | 0.015 | T202 | 0.0425 | T-TT | 0.0425 | 1:1 | 0.100 |
| Comp. | Mixture 7 | 99.8 | 0.100 | — | — | T202 | 0.0500 | T-TT | 0.0500 | 1:1 | 0.100 |
| Ex. | Mixture 8 | 99.8 | 0.100 | R-10 | 0.001 | T202 | 0.0495 | T-TT | 0.0495 | 1:1 | 0.100 |
|  | Mixture 9 | 99.8 | 0.100 | R-10 | 0.003 | T202 | 0.0485 | T-TT | 0.0485 | 1:1 | 0.100 |
|  | Mixture 10 | 99.8 | 0.100 | R-10 | 0.005 | T202 | 0.0475 | T-TT | 0.0475 | 1:1 | 0.100 |
|  | Mixture 11 | 99.8 | 0.100 | R-10 | 0.007 | T202 | 0.0465 | T-TT | 0.0465 | 1:1 | 0.100 |
|  | Mixture 12 | 99.8 | 0.100 | R-10 | 0.009 | T202 | 0.0455 | T-TT | 0.0455 | 1:1 | 0.100 |
|  | Mixture 13 | 99.8 | 0.100 | R-10 | 0.015 | T202 | 0.0425 | T-TT | 0.0425 | 1:1 | 0.100 |

|  | Mixtures | Synergist (wt %) in antioxidant | Synergist (ppm) in organic polymer composition | MI1 | MI2 | MI3 | MI4 |
|---|---|---|---|---|---|---|---|
| Ex. | Mixture 1 | 1 | 10 | 4.1 | 6.2 | 10 | × |
|  | Mixture 2 | 3 | 30 | 3.5 | 5.0 | 7.1 | 10 |
|  | Mixture 3 | 5 | 50 | 3.2 | 4.3 | 5.9 | 8.0 |
|  | Mixture 4 | 7 | 70 | 3.1 | 3.9 | 5.3 | 7.3 |
|  | Mixture 5 | 9 | 90 | 3.1 | 3.7 | 5.2 | 7.0 |
|  | Mixture 6 | 15 | 150 | 3.0 | 3.6 | 4.9 | 7.0 |
| Comp. | Mixture 7 | 0 | 0 | 4.5 | 7.1 | 12 | × |
| Ex. | Mixture 8 | 1 | 10 | 4.4 | 7.1 | 12 | × |
|  | Mixture 9 | 3 | 30 | 4.2 | 6.7 | 12 | × |
|  | Mixture 10 | 5 | 50 | 4.1 | 6.4 | 11 | × |
|  | Mixture 11 | 7 | 70 | 3.8 | 6.1 | 11 | × |
|  | Mixture 12 | 9 | 90 | 3.6 | 5.7 | 11 | × |
|  | Mixture 13 | 15 | 150 | 3.1 | 4.9 | 10 | × |

Example 31

The Mixtures shown in Table 31 were dry-mixed for 5 min in a tumbler mixer and extruded from a 20 mm diameter extruder (die temperature set to 280° C.) to give strands, which were cooled with water and cut into pellets. The pellets (15 g) were placed in a 50 mm diameter dish, and heat-treated in a gear oven set to 160° C. for a predetermined time. The pellets after the heat treatment were measured for yellowness index (YI) by a colorimeter. A smaller variation in YI value means superior heat stability in use.

The symbols used in Table 31 mean the following.

PP: polypropylene (homopolymer)
Ca-St: calcium stearate
T202: tris(2,4-di-tert-butylphenyl) phosphite (manufactured by Yoshitomi Fine Chemicals Ltd., trademark: Tomiphos 202)
T-TT: tetrakis[3-(3,5-di-tert-butyl-4-hydroxyphenyl)propionyloxymethyl]methane (manufactured by Yoshitomi Fine Chemicals Ltd., trademark: Tominox TT)
S-12: 2,2,5,7,8-pentamethyl-6-hydroxychroman
R-10: 3-(3,4-dimethylphenyl)-5,7-di-tert-butyl-3H-benzofuran-2-one (synthesized according to the method described in JP-A-7-233160)
X: By visual observation of polypropylene composition, it was red-brown.

From Table 31, it is evident that the compositions (Mixtures 1, 2) of the present invention showed extremely superior heat stability when in use as compared to Comparative Example compositions (Mixtures 3–5). In addition, 6-hydroxychroman compound to be used in the present invention showed a superior effect of thermal stabilization when in use as compared to 3-(3,4-dimethylphenyl)-5,7-di-tert-butyl-3H-benzofuran-2-one (R-10).

TABLE 31

| | | Amount added (parts by weight) | | | | | | | | | |
|---|---|---|---|---|---|---|---|---|---|---|---|
| | | | | Antioxidant | | | | | | | |
| | | | | (a) synergist (including Comp. Ex.) | | (b) phosphorus antioxidant | | (c) phenolic antioxidant | | (b):(c) weight ratio | Total amount added |
| | Mixtures | PP | Ca-St | kind | amount | kind | amount | kind | amount | | |
| Ex. | Mixture 1 | 99.825 | 0.075 | S-12 | 0.003 | T202 | 0.0653 | T-TT | 0.0327 | 2:1 | 0.100 |
|  | Mixture 2 | 99.825 | 0.075 | S-12 | 0.005 | T202 | 0.0633 | T-TT | 0.0316 | 2:1 | 0.100 |
| Com. | Mixture 3 | 99.825 | 0.075 | R-10 | 0.015 | T202 | 0.0567 | T-TT | 0.0283 | 2:1 | 0.100 |
| Ex. | Mixture 4 | 99.825 | 0.075 | — | — | T202 | 0.0667 | T-TT | 0.0333 | 2:1 | 0.100 |
|  | Mixture 5 | 99.775 | 0.075 | — | — | T202 | 0.1000 | T-TT | 0.050 | 2:1 | 0.150 |

TABLE 31-continued

|  | Mixtures | Synergist (wt %) in antioxidant | Synergist (ppm) in organic polymer composition | Un-treated | YI 5 hr | YI 12 hr | YI 19 hr | YI 27 hr | YI 34 hr |
|---|---|---|---|---|---|---|---|---|---|
| Ex. | Mixture 1 | 2 | 20 | 1.3 | 2.1 | 5.3 | 26.9 | × | × |
|  | Mixture 2 | 5 | 50 | 1.5 | 2.7 | 3.6 | 4.9 | 6.8 | 11.9 |
| Com. | Mixture 3 | 15 | 150 | 2.3 | 80.7 | × | × | × | × |
| Ex. | Mixture 4 | 0 | 0 | 2.0 | 87.1 | × | × | × | × |
|  | Mixture 5 | 0 | 0 | 2.4 | 5.5 | 43.5 | × | × | × |

Example 32

The Mixtures shown in Table 32 were dry-mixed for 5 min in a tumbler mixer and extruded from a 20 mm diameter extruder (die temperature set to 280° C.) to give strands, which were cooled with water and cut into pellets. The pellets (15 g) were placed in a 50 mm diameter dish, and heat-treated in a gear oven set to 160° C. for a predetermined time. The pellets after the heat treatment were measured for yellowness index (YI) by a colorimeter. A smaller variation in YI value means superior heat stability in use.

From Table 32, it is evident that the compositions (Mixtures 1, 2) of the present invention showed extremely superior heat stability when in use as compared to Comparative Example compositions (Mixtures 3–5). In addition, 6-hydroxychroman compound to be used in the present invention showed a superior effect of thermal stabilization when in use as compared to 3-(3,4-dimethylphenyl)-5,7-di-tert-butyl-3H-benzofuran-2-one (R-10).

TABLE 32

| | | | | Amount added (parts by weight) | | | | | | |
|---|---|---|---|---|---|---|---|---|---|---|
| | | | | Antioxidant | | | | | | |
| | | | | (a) synergist (including Comp. Ex.) | | (b) phosphorus antioxidant | | (c) phenolic antioxidant | | (b):(c) weight ratio | Total amount added |
| | Mixtures | PP | Ca-St | kind | amount | kind | amount | kind | amount | | |
| Ex. | Mixture 1 | 99.825 | 0.075 | S-12 | 0.002 | T202 | 0.049 | T-TT | 0.049 | 1:1 | 0.100 |
|  | Mixture 2 | 99.825 | 0.075 | S-12 | 0.005 | T202 | 0.0475 | T-TT | 0.0475 | 1:1 | 0.100 |
| Com. | Mixture 3 | 99.825 | 0.075 | R-10 | 0.015 | T202 | 0.0425 | T-TT | 0.0425 | 1:1 | 0.100 |
| Ex. | Mixture 4 | 99.825 | 0.075 | — | — | T202 | 0.050 | T-TT | 0.050 | 1:1 | 0.100 |
|  | Mixture 5 | 99.775 | 0.075 | — | — | T202 | 0.075 | T-TT | 0.075 | 1:1 | 0.150 |

|  | Mixtures | Synergist (wt %) in antioxidant | Synergist (ppm) in organic polymer composition | Un-treated | YI 5 hr | YI 12 hr | YI 19 hr | YI 27 hr | YI 34 hr |
|---|---|---|---|---|---|---|---|---|---|
| Ex. | Mixture 1 | 2 | 20 | 2.9 | 4.0 | 5.3 | 7.0 | 8.5 | 10.3 |
|  | Mixture 2 | 5 | 50 | 2.1 | 3.6 | 4.6 | 5.5 | 7.1 | 10.8 |
| Com. | Mixture 3 | 15 | 150 | 1.8 | 3.6 | 11.6 | 30.6 | × | × |
| Ex. | Mixture 4 | 0 | 0 | 1.6 | 3.5 | 24 | × | × | × |
|  | Mixture 5 | 0 | 0 | 2.6 | 3.3 | 6.1 | 12.9 | 25.7 | 43 |

The symbols used in Table 32 mean the following.

PP: polypropylene (homopolymer)

Ca-St: calcium stearate

T202: tris(2,4-di-tert-butylphenyl) phosphite (manufactured by Yoshitomi Fine Chemicals Ltd., trademark: Tomiphos 202)

T-TT: tetrakis[3-(3,5-di-tert-butyl-4-hydroxyphenyl) propionyloxymethyl]methane (manufactured by Yoshitomi Fine Chemicals Ltd., trademark: Tominox TT)

S-12: 2,2,5,7,8-pentamethyl-6-hydroxychroman

R-10: 3-(3,4-dimethylphenyl)-5,7-di-tert-butyl-3H-benzofuran-2-one (synthesized according to the method described in JP-A-7-233160)

X: By visual observation of polypropylene composition, it was red-brown.

Example 33

The Mixtures shown in Table 33 were dry-mixed for 5 min in a tumbler mixer and extruded from a 20 mm diameter extruder (die temperature set to 280° C.) to give strands, which were cooled with water and cut into pellets. This step was repeated 5 times. The stability during processing was evaluated by measuring, according to JIS K 7210, MI of the pellets extruded each time. The temperature for measurement was 230° C. and measurement load was 2.16 kgf.

The symbols used in Table 33 mean the following.

PP: polypropylene (homopolymer)

Ca-St: calcium stearate

P36: bis(2,6-di-tert-butyl-4-methylphenyl) pentaerythritol diphosphite (manufactured by ASAHI DENKA KOGYO K.K., trademark: Adekastab PEP-36)

U626: bis(2,4-di-tert-butylphenyl) pentaerythritol diphosphite (manufactured by GE Specialty Chemicals, trademark: Ultranox 626)

T-TT: tetrakis[3-(3,5-di-tert-butyl-4-hydroxyphenyl) propionyloxymethyl]methane (manufactured by Yoshitomi Fine Chemicals Ltd., trademark: Tominox TT)
S-12: 2,2,5,7,8-pentamethyl-6-hydroxychroman
MI1: MI value of pellets obtained for the first time.
MI3: MI value of pellets obtained for the third time.
MI5: MI value of pellets obtained for the fifth time.

From Table 33, it is evident that the compositions (Mixtures 1, 3) of the present invention containing 6-hydroxychroman compound were fine in the stability during processing of repeat extrusion in the following comparisons, as compared to the Comparative Example compositions (Mixtures 2, 4).

Comparison (A): the present invention composition Mixture 1 and Comparative Example composition Mixture 2

Comparison (B): the present invention composition Mixture 3 and Comparative Example composition Mixture 4

In this Example, tetrakis[3-(3,5-di-tert-butyl-4-hydroxyphenyl)propionyloxymethyl]methane (T-TT) was used as a phenolic antioxidant, and as a phosphorus antioxidant, bis(2,6-di-tert-butyl-4-methylphenyl) pentaerythritol diphosphite (P36) was used in Comparison (A), bis(2,4-di-tert-butylphenyl) pentaerythritol diphosphite (U626) was used in Comparison (B). When various phosphorus antioxidants were used, the composition of the present invention containing 6-hydroxychroman compound showed superior stability during processing.

PP: polypropylene
Ca-St: calcium stearate
S-12: 2,2,5,7,8-pentamethyl-6-hydroxychroman
T-TT: tetrakis[3-(3,5-di-tert-butyl-4-hydroxyphenyl) propionyloxymethyl]methane (manufactured by Yoshitomi Fine Chemicals Ltd., trademark: Tominox TT)
T202: tris(2,4-di-tert-butylphenyl) phosphite (manufactured by Yoshitomi Fine Chemicals Ltd., trademark: Tomiphos 202)
MI1: MI value of pellets obtained for the first time.
MI4: MI value of pellets obtained for the fourth time.
YI1: YI value of pellets obtained for the first time.
YI4: YI value of pellets obtained for the fourth time.
X: means that the resin was degraded and pellets could not be obtained after extrusion of strands.

The mixing ratios were, as shown in Table 34, polypropylene (homopolymer) was 99.825 parts by weight, calcium stearate was 0.075 part by weight, a 6-hydroxychroman compound (S-12) was 0.005 part by weight, a phosphorus antioxidant (T202, U626, PEPQ) was 0.0475 part by weight, and the total amount of a phenolic antioxidant (T-TT) was 0.0475 part by weight. The stabilizer composition (Mixtures 1, 8, 9) for organic polymer material of the present invention having the above mixing ratios were used as Examples. As Comparative Examples, a mixture (Mixture 2) containing the 6-hydroxychroman compound (S-12) and the phosphorus antioxidant (T202), a mixture (Mixture 3) containing the 6-hydroxychroman compound (S-12) and the phenolic antioxidant (T-TT), a mixture (Mixture 4) containing the phosphorus antioxidant (T202) and the phenolic antioxidant

TABLE 33

| | | | | Amount added (parts by weight) | | | | | | | |
|---|---|---|---|---|---|---|---|---|---|---|---|
| | | | | | Antioxidant | | | | | | |
| | | | | (a) synergist (including Comp. Ex.) | | (b) phosphorus antioxidant | | (c) phenolic antioxidant | | (b):(c) weight | Total amount |
| | Mixtures | PP | Ca-St | kind | amount | kind | amount | kind | amount | ratio | added |
| Ex. | Mixture 1 | 99.800 | 0.100 | S-12 | 0.0025 | P36 | 0.0500 | T-TT | 0.0475 | 20:19 | 0.100 |
| Comp. Ex. | Mixture 2 | 99.800 | 0.100 | — | — | P36 | 0.0500 | T-TT | 0.0500 | 20:20 | 0.100 |
| Ex. | Mixture 3 | 99.800 | 0.100 | S-12 | 0.0025 | U626 | 0.0500 | T-TT | 0.0475 | 20:19 | 0.100 |
| Comp. Ex. | Mixture 4 | 99.800 | 0.100 | — | — | U626 | 0.0500 | T-TT | 0.0500 | 20:20 | 0.100 |

| | Mixtures | Synergist (wt %) in antioxidant | Synergist (ppm) in organic polymer composition | MI1 | MI3 | MI5 |
|---|---|---|---|---|---|---|
| Ex. | Mixture 1 | 2.5 | 25 | 3.0 | 3.5 | 7.5 |
| Comp. Ex. | Mixture 2 | 0 | 0 | 3.2 | 4.4 | 8.5 |
| Ex. | Mixture 3 | 2.5 | 25 | 3.0 | 3.6 | 7.6 |
| Comp. Ex. | Mixture 4 | 0 | 0 | 3.2 | 4.5 | 8.7 |

Example 34

A Mixture shown in Table 34 was dry mixed in a tumbler mixer for 5 minutes. Using a 20 mm diameter extruder (die temperature of 280° C.), strands were extruded. After cooling with water, the strands were cut to give pellets. This step was repeated 4 times. The pellets extruded at each time were measured for melt index (MI) according to JIS K 7210 at measurement temperature 230° C., measurement load 2.16 kgf to examine stability during processing. The pellets extruded at each time were measured for yellowness index (YI) according to JIS K 7103.

The measurement results are shown in Table 34.
The symbols used in Table 34 are explained below.

(T-TT), a mixture (Mixture 5) containing the 6-hydroxychroman compound (S-12) alone, a mixture (Mixture 6) containing the phosphorus antioxidant (T202) alone, and a mixture (Mixture 7) containing the phenolic antioxidant (T-TT) alone, wherein the total amount of the 6-hydroxychroman compound, the phosphorus antioxidant and the phenolic antioxidant was the same as in Examples and was 0.100 part by weight, were subjected to the same test as in Examples.

From the results in Table 34, the following are known.

The inventive composition (Mixture 1) containing a phosphorus antioxidant (T202), a phenolic antioxidant (T-TT)

and a small amount of a 6-hydroxy compound showed an extremely small degree of coloring and was superior in stability during processing, as compared to the compositions without a 6-hydroxy compound (Mixtures 4, 6, 7), a composition containing a large amount of a 6-hydroxy compound (0.100 part by weight per 100 parts by weight of organic polymer) alone (Mixture 5) and the compositions containing two kinds of antioxidants of a 6-hydroxychroman compound and a phosphorus antioxidant or phenolic antioxidant (Mixtures 2, 3).

The compositions (Mixtures 8, 9) containing U626 or PEPQ as a phosphorus antioxidant also showed a small degree of coloring and were superior in stability during processing.

propoxy]-2,4,8,10-tetra-tert-butyldibenzo[d,f][1,3,2]dioxaphosphepin
T-TT: tetrakis[3-(3,5-di-tert-butyl-4-hydroxyphenyl)propionyloxymethyl]methane (manufactured by Yoshitomi Fine Chemicals Ltd., trademark: Tominox TT)
S-12: 2,2,5,7,8-pentamethyl-6-hydroxychroman
MI1: MI value of pellets obtained for the first time.
MI4: MI value of pellets obtained for the fourth time.
YI1: YI value of pellets obtained for the first time.
YI4: YI value of pellets obtained for the fourth time.

The mixing ratios were, as shown in Table 35, that polypropylene (homopolymer) was 99.825 parts by weight, calcium stearate was 0.075 part by weight, the total amount of a phosphorus antioxidant (P-7), a phenolic antioxidant

TABLE 34

| | | | | Amount added (parts by weight) | | | | | | |
|---|---|---|---|---|---|---|---|---|---|---|
| | | | | Antioxidant | | | | | | |
| | | | | (a) synergist (including Comp. Ex.) | | (b) phosphorus antioxidant | | (c) phenolic antioxidant | (b):(c) weight | Total amount |
| | Mixtures | PP | Ca-St | kind | amount | kind | amount | kind | amount | ratio | added |
| Ex. | Mixture 1 | 99.825 | 0.075 | S-12 | 0.005 | T202 | 0.0475 | T-TT | 0.0475 | 1:1 | 0.100 |
| Comp. Ex. | Mixture 2 | 99.825 | 0.075 | S-12 | 0.050 | T202 | 0.050 | — | — | 1:0 | 0.100 |
| | Mixture 3 | 99.825 | 0.075 | S-12 | 0.050 | — | — | T-TT | 0.050 | 0:1 | 0.100 |
| | Mixture 4 | 99.825 | 0.075 | — | — | T202 | 0.050 | T-TT | 0.050 | 1:1 | 0.100 |
| | Mixture 5 | 99.825 | 0.075 | S-12 | 0.100 | — | — | — | — | — | 0.100 |
| | Mixture 6 | 99.825 | 0.075 | — | — | T202 | 0.100 | — | — | 1:0 | 0.100 |
| | Mixture 7 | 99.825 | 0.075 | — | — | — | — | T-TT | 0.100 | 0:1 | 0.100 |
| Ex. | Mixture 8 | 99.825 | 0.075 | S-12 | 0.005 | U626 | 0.0475 | T-TT | 0.0475 | 1:1 | 0.100 |
| | Mixture 9 | 99.825 | 0.075 | S-12 | 0.005 | PEPQ | 0.0475 | T-TT | 0.0475 | 1:1 | 0.100 |

| | Mixtures | Synergist (wt %) in antioxidant | Synergist (ppm) in organic polymer composition | MI1 | MI4 | YI1 | YI4 |
|---|---|---|---|---|---|---|---|
| Ex. | Mixture 1 | 5 | 50 | 2.6 | 4.7 | 3.0 | 12 |
| Comp. Ex. | Mixture 2 | 50 | 500 | 3.0 | 5.7 | 8.2 | 33 |
| | Mixture 3 | 50 | 500 | 3.0 | 6.5 | 8.1 | 38 |
| | Mixture 4 | 0 | 0 | 3.1 | 6.2 | 3.1 | 20 |
| | Mixture 5 | 100 | 1000 | 3.2 | 7.0 | 14 | 38 |
| | Mixture 6 | 0 | 0 | 3.5 | × | 2.0 | × |
| | Mixture 7 | 0 | 0 | 3.6 | 7.8 | 3.5 | 22 |
| Ex. | Mixture 8 | 5 | 50 | 2.3 | 4.0 | 2.7 | 8.0 |
| | Mixture 9 | 5 | 50 | 2.4 | 4.3 | 2.8 | 10 |

Example 35

A Mixture shown in Table 35 was dry mixed in a tumbler mixer for 5 minutes. Using a 20 mm diameter extruder (die temperature of 280° C.), strands were extruded. After cooling with water, the strands were cut to give pellets. This step was repeated 4 times. The pellets extruded at each time were measured for melt index (MI) according to JIS K 7210 at measurement temperature 230° C., measurement load 2.16 kgf to examine stability during processing. The pellets extruded at each time were measured for yellowness index (YI) according to JIS K 7103.

The symbols used in Table 35 are explained below.
PP: polypropylene(homopolymer)
Ca-St: calcium stearate
P-7: 6-[3-(3-tert-butyl-4-hydroxy-5-methylphenyl)

(T-TT) and a 6-hydroxychroman compound (S-12) was 0.100 part by weight, S-12 was not added or added in a proportion of 0.001 part by weight–0.005 part by weight, and the phosphorus antioxidant content and the phenolic antioxidant content were calculated to be equal according to "(0.100 part by weight-(S-12 content))÷2" (parts by weight).

From the results in Table 35, the Example compositions (Mixtures 1, 2, 3) containing a 6-hydroxychroman compound (S-12) in a proportion of 1.0, 3.0 or 5.0 wt % of the antioxidants showed smaller MI and YI than the Comparative Example composition (Mixture 4) without a 6-hydroxychroman compound (S-12). Therefore, they are known to be superior in stability during processing and inhibition of coloring during processing.

TABLE 35

| | | Amount added (parts by weight) | | | | | | | | |
|---|---|---|---|---|---|---|---|---|---|---|
| | | | | Antioxidant | | | | | | |
| | | | | (a) synergist (including Comp. Ex.) | | (b) phosphorus antioxidant | | (c) phenolic antioxidant | (b):(c) weight ratio | Total amount added |
| | | PP | Ca-St | kind | amount | kind | amount | kind | amount | |
| Ex. | Mixture 1 | 99.825 | 0.075 | S-12 | 0.001 | P-7 | 0.0495 | T-TT | 0.0495 | 1:1 | 0.100 |
| | Mixture 2 | 99.825 | 0.075 | S-12 | 0.003 | P-7 | 0.0485 | T-TT | 0.0485 | 1:1 | 0.100 |
| | Mixture 3 | 99.825 | 0.075 | S-12 | 0.005 | P-7 | 0.0475 | T-TT | 0.0475 | 1:1 | 0.100 |
| Comp. Ex. | Mixture 4 | 99.825 | 0.075 | — | — | P-7 | 0.0500 | T-TT | 0.0500 | 1:1 | 0.100 |

| | | Mixtures | Synergist (wt %) in antioxidant | Synergist (ppm) in organic polymer composition | MI1 | MI4 | YI1 | YI4 |
|---|---|---|---|---|---|---|---|---|
| Ex. | | Mixture 1 | 1.0 | 10 | 2.4 | 4.5 | 1.5 | 7.1 |
| | | Mixture 2 | 3.0 | 30 | 2.3 | 4.3 | 1.6 | 7.0 |
| | | Mixture 3 | 5.0 | 50 | 2.1 | 4.2 | 1.6 | 7.1 |
| Comp. Ex. | | Mixture 4 | — | — | 3.3 | 9.7 | 1.7 | 9.8 |

Example 36

To evaluate the heat stability of linear low density polyethylene (LLDPE) during processing, the torque increase start time was measured in the following manner. The Mixture shown in Table 36 was weighed and mixed in a beaker. Using Labo Plastomill (type 50C-150, manufactured by TOYOSEIKI CORPORATION), the torque increase start time was measured by mixing at 210° C., 60 rpm.

The symbols used in Table 36 are explained below.
LLDPE: linear low density polyethylene
Ca-St: calcium stearate
P-7: 6-[3-(3-tert-butyl-4-hydroxy-5-methylphenyl)propoxy]-2,4,8,10-tetra-tert-butyldibenzo[d,f][1,3,2]dioxaphosphepin
PEPQ: tetrakis(2,4-di-tert-butylphenyl)-4,4'-biphenylenediphosphonite (manufactured by Clariant, trademark: Sandostab P-EPQ)
T202: tris(2,4-di-tert-butylphenyl) phosphite (manufactured by Yoshitomi Fine Chemicals Ltd., trademark: Tomiphos 202)
U626: bis(2,4-di-tert-butylphenyl)pentaerythritol diphosphite (manufactured by GE Specialty Chemicals, trademark: ULTRANOX 626)
HP10: 2,2-methylenebis(4,6-di-tert-butylphenyl) 2-ethylhexyl phosphite (manufactured by ASAHI DENKA KOGYO K.K., trademark: Adekastab HP-10)
T-SS: n-octadecyl 3-(3,5-di-tert-butyl-4-hydroxyphenyl)propionate (manufactured by Yoshitomi Fine Chemicals Ltd., trademark: Tominox SS)
S-12: 2,2,5,7,8-pentamethyl-6-hydroxychroman The mixing ratios were, as shown in Table 36, that LLDPE was 99.825 parts by weight, calcium stearate was 0.075 part by weight, the total amount of a phosphorus antioxidant, a phenolic antioxidant (T-SS) and a 6-hydroxychroman compound (S-12) was 0.100 part by weight, S-12 was not added or added in a proportion of 0.001 part by weight–0.005 part by weight, and the phosphorus antioxidant content and the phenolic antioxidant content were calculated to be equal according to "(0.100 part by weight-(S-12 content))÷2" (parts by weight).

From the results in Table 36, the Example compositions (Mixtures 1–7) containing a 6-hydroxychroman compound (S-12) in a proportion of 1.0, 3.0 or 5.0 wt % of the antioxidants showed a longer torque increase start time than the Comparative Example composition (Mixture 8) without a 6-hydroxychroman compound (S-12). Therefore, they are known to be superior in heat stability during processing.

TABLE 36

| | Mixtures | LLDPE | Amount added (parts by weight) | | | | | | | | Synergist (wt %) in antioxidant | Synergist (ppm) in organic polymer composition | Torque increase start time (min) |
|---|---|---|---|---|---|---|---|---|---|---|---|---|---|
| | | | Antioxidant | | | | | | | | | | |
| | | | (a) synergist (including Comp. Ex.) | | (b) phosphorus antioxidant | | (c) phenolic antioxidant | | (b):(c) weight ratio | Total amount added | | | |
| | | | kind | amount | kind | amount | kind | amount | | | | | |
| Ex. | Mixture 1 | 99.825 | S-12 | 0.001 | P-7 | 0.0495 | T-SS | 0.0495 | 1:1 | 0.100 | 1.0 | 10 | 66 |
| | Mixture 2 | 99.825 | S-12 | 0.003 | P-7 | 0.0485 | T-SS | 0.0485 | 1:1 | 0.100 | 3.0 | 30 | 70 |
| | Mixture 3 | 99.825 | S-12 | 0.005 | P-7 | 0.0475 | T-SS | 0.0475 | 1:1 | 0.100 | 5.0 | 50 | 72 |
| | Mixture 4 | 99.825 | S-12 | 0.003 | PEPQ | 0.0485 | T-SS | 0.0485 | 1:1 | 0.100 | 3.0 | 30 | 60 |
| | Mixture 5 | 99.825 | S-12 | 0.003 | T202 | 0.0485 | T-SS | 0.0485 | 1:1 | 0.100 | 3.0 | 30 | 34 |

TABLE 36-continued

| | | | Amount added (parts by weight) | | | | | | | Synergist | | |
|---|---|---|---|---|---|---|---|---|---|---|---|---|
| | | | Antioxidant | | | | | | | Synergist | Synergist (ppm) in | Torque |
| | Mix-tures | LLDPE | (a) synergist (including Comp. Ex.) | | (b) phosphorus antioxidant | | (c) phenolic antioxidant | | (b):(c) weight ratio | Total amount added | (wt %) in antioxidant | organic polymer composition | increase start time (min) |
| | | | kind | amount | kind | amount | kind | amount | | | | | |
| | Mixture 6 | 99.825 | S-12 | 0.003 | U626 | 0.0485 | T-SS | 0.0485 | 1:1 | 0.100 | 3.0 | 30 | 63 |
| | Mixture 7 | 99.825 | S-12 | 0.003 | HP10 | 0.0485 | T-SS | 0.0485 | 1:1 | 0.100 | 3.0 | 30 | 48 |
| Comp. Ex. | Mixture 8 | 99.825 | — | — | P-7 | 0.0500 | T-SS | 0.0500 | 1:1 | 0.100 | — | — | 14 |

Added to all Mixtures: Ca-St (0.075 part by weight)

In the following Examples 37–39, a composition containing a 6-hydroxychroman compound and a composition containing vitamin E were compared for storage stability.

The symbols used in Examples mean as follows.

T-SS: n-octadecyl 3-(3,5-di-tert-butyl-4-hydroxyphenyl) propionate (manufactured by Yoshitomi Fine Chemicals, Ltd., trademark: Tominox SS)

P101: tetrakis(2,4-di-tert-butyl-5-methylphenyl)-4,4'-biphenylenediphosphonite (manufactured by Yoshitomi Fine Chemicals, Ltd., trademark: GSY-P101)

PEPQ: tetrakis(2,4-di-tert-butylphenyl)-4,4'-biphenylenediphosphonite (manufactured by Clariant, trademark: Sandostab P-EPQ)

S-12: 2,2,5,7,8-pentamethyl-6-hydroxychroman vitamin E:DL-α-tocopherol (manufactured by Waco Pure Chemical Industries, Ltd., reagent grade 1)

Example 37

A composition containing T-SS and P101 in a weight ratio (T-SS:P101) of 1:2 was prepared. Thereto was added S-12 (6-hydroxychroman compound) or vitamin E at the percentage by weight of the total amount of T-SS, P101 and S-12 (6-hydroxychroman compound) or vitamin E, as set out in Table 37, and they were mixed in a mortar. The mixture (5 g) was packed in a 0.04 mm thick polyethylene (single layer) bag (70 mm long, 50 mm wide) and the bag was heat sealed. It was preserved in a thermostat at 30° C., RH 75% and the stabilizer composition was touched periodically to see if the composition was felt sticky. The test results are shown in Table 37.

From the results shown in Table 37, it has been found that the stabilizer composition of the present invention is easy to handle as compared to Comparative Examples, and shows superior preservation stability.

Example 38

A composition having an S-12 (6-hydroxychroman compound) or vitamin E:PEPQ:T-SS weight ratio of 1:9:10 was prepared and mixed in an osterizing blender. The mixture (5 g) was packed in a polyethylene bag (single layer) having a length of 70 mm, a width of 50 mm and a thickness of 0.04 mm and the bag was heat sealed. It was placed in a thermostat at 30° C. and relative humidity of 75%, and stored for 15 days and 30 days. The content of tetrakis(2,4-di-tert-butylphenyl)-4,4'-biphenylenediphosphonite, which is the main component of PEPQ, before and after preservation was determined by high performance liquid chromatography (gel filtration chromatography (GPC), peak area ratio), shown by residual rate relative to the initial value as 100 and used as an index of long term storage stability. A higher residual rate of the main component means superior long term storage stability.

The GPC analysis conditions were as follows.

column: TSKgel GMHXL-L 7.8T×300 mm, 2 columns
mobile phase: tetrahydrofuran
detector: differential refractometer (RI)
flow rate: 1 ml/min
column temperature: 40° C.

TABLE 37

| | wt % of S-12 or vitamin E relative to total amount | 0 | 1 week | 2 weeks | 3 weeks | 4 weeks | 2 months |
|---|---|---|---|---|---|---|---|
| Inventive stabilizer composition (S-12) | 5 | ○ | ○ | ○ | ○ | ○ | ○ |
| | 6 | ○ | ○ | ○ | ○ | ○ | ○ |
| | 7 | ○ | ○ | ○ | ○ | ○ | ○ |
| | 9 | ○ | ○ | ○ | ○ | ○ | ○ |
| Comparative Ex. (vitamin E) | 5 | ○ | ○ | ○ | ○ | ○ | × |
| | 6 | ○ | ○ | ○ | × | × | × |
| | 7 | ○ | ○ | × | × | × | × |
| | 9 | ○ | × | × | × | × | × |

○: no stickiness
×: stickiness found

The results are shown in Table 38.

TABLE 38

|  | weight ratio | Day 0 | Day 15 | Day 30 |
|---|---|---|---|---|
| Inventive stabilizer composition (S-12) | S-12/PEPQ/T-SS = 1/9/10 | 100% | 100% | 100% |
| Comparative Example (vitamin E) | vitamin E/PEPQ/T-SS = 1/9/10 | 100% | 90.6% | 82.5% |

As is evident from the results in Table 38, the stabilizer composition of the present invention maintained the content of the main component of PEPQ after 30 days of preservation. In contrast, the composition of Comparative Example containing vitamin E showed a lower content of the main component of PEPQ. The stabilizer composition of the present invention showed fine long term storage stability as compared to the composition of Comparative Example.

Example 39

To confirm the long term storage stability of the stabilizer composition of the present invention, the stabilizer composition of Example 38 was compared for the stability during processing of linear low density polyethylene (LLDPE) before and after preservation.

Each component was weighed and mixed in a beaker at the following mixing ratio. Using Labo Plastomill (type 50C-150, manufactured by TOYOSEIKI CORPORATION), the torque increase start time was measured by mixing 40 g of a sample at 210° C., 50 rpm.

Separately, each component was weighed and mixed in a different beaker at the following mixing ratio. Using Labo Plastomill (type 50C-150, manufactured by TOYOSEIKI CORPORATION), 40 g of a sample was mixed at 210° C., 50 rpm. The mixture was press formed by a single acting type 37 t press to give a 3 mm thick test piece. YI was measured using a color meter (SM-7-CH type, manufactured by SUGA TEST INSTRUMENTS CORPORATION) by reflection method.

Mixing Ratio
LLDPE 99.8 parts by weight
stabilizer composition 0.1 part by weight
calcium stearate 0.1 part by weight As is evident from the results in Table 39, the stabilizer composition of the present invention showed only small changes in torque increase start time and YI before and after preservation as compared to Comparative Example. Accordingly, the stabilizer composition of the present invention showed superior long term storage stability of the stabilizer composition itself.

The stabilizer composition of the present invention is characterized by the addition of a small amount of a 6-hydroxychroman compound of the formula (1) to phenolic and phosphorus antioxidants widely used now. The use of the stabilizer composition of the present invention as a stabilizer for organic polymer materials affords an industrially extremely useful stabilized organic polymer material composition superior in heat stability during processing.

The stabilizer composition of the present invention is free from stickiness or blocking phenomenon even after a long term storage and is stable. The stabilizer composition of the present invention inhibits decrease in the antioxidant component content. It is superior in the improvement of stability during processing after a long term storage, while retaining coloring preventive effect, and is superior in the preservation stability of the stabilizer composition itself.

This application is based on Japanese patent application Nos. 269735/1997, 108260/1998, 181174/1998, 258012/1999, 70793/2000 and 99052/2000, and international application Nos. PCT/JP98/04462, PCT/JP98/05829 and PCT/JP99/01999, the contents of which are hereby incorporated by reference.

What is claimed is:
1. A stabilizer composition for an organic polymer material, which comprises:
(a) a compound of the formula

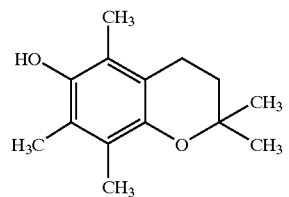

(b) a phosphorus antioxidant; and
(c) a phenolic antioxidant;
wherein the component (a) is contained in a proportion of 0.5 wt %–10 wt %, and wherein the total amount of the component (b) and the component (c) is in a proportion of

TABLE 39

|  | weight ratio | torque increase start time (min) | | | YI | | |
|---|---|---|---|---|---|---|---|
|  |  | Day 0 | Day 15 | Day 30 | Day 0 | Day 15 | Day 30 |
| Inventive stabilizer composition (S-12) | S-12/PEPQ/T-SS = 1/9/10 | 22.5 | 22.3 | 21.2 | 17 | 17 | 18 |
| Comparative Example (vitamin E) | vitamin E/PEPQ/T-SS = 1/9/10 | 20.1 | 15.8 | 4.8 | 16 | 23 | 25 |

99.5 wt %–90 wt %, of the total amount of the components (a), (b) and (c); wherein the component (b) is at least one member selected from the group consisting of:

(b-1) a compound of the formula (2)

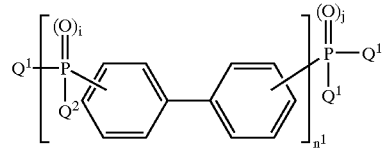

wherein $Q^1$ is a group of the formula (3)

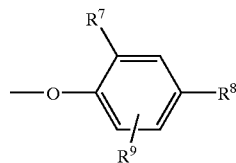

wherein $R^7$ and $R^8$ are the same or different and each is alkyl having 1 to 4 carbon atoms, and $R^9$ is hydrogen atom or methyl, $Q^2$ is, independently from other repeating units, a group of the formula (3)

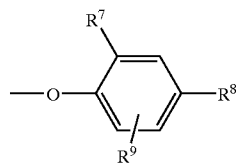

wherein each symbol is as defined above, i is, independently from other repeating units, 0 or 1, j is 0 or 1, and n is an integer of 1 to 10, or of the formula (4)

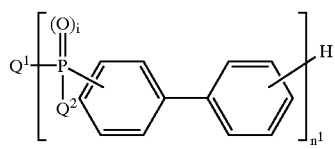

wherein each symbol is as defined above;

(b-2) a compound of the formula (5)

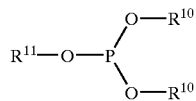

wherein each $R^{10}$ is the same or different and is alkyl having 1 to 18 carbon atoms, phenyl, phenyl substituted by alkyl having 1 to 9 carbon atoms, a group of the formula (6)

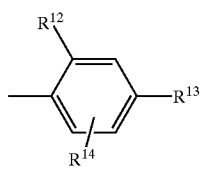

wherein $R^{12}$ and $R^{13}$ are the same or different and each is alkyl having 1 to 4 carbon atoms, and $R^{14}$ is hydrogen atom or methyl, and $R^{11}$ is alkyl having 1 to 18 carbon atoms, phenylalkyl having 7 to 9 carbon atoms, cyclohexyl, phenyl, phenyl substituted by alkyl having 1 to 9 carbon atoms, a group of the formula (6)

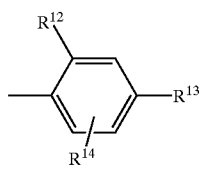

wherein $R^{12}$ and $R^{13}$ are the same or different and each is alkyl having 1 to 4 carbon atoms, and $R^{14}$ is hydrogen atom or methyl, or of the formula (7)

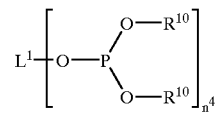

wherein $R^{10}$ is as defined above, $n^4$ is 3, and $L^1$ is 1,1,3-butanetriyl;

(b-3) a compound of the formula (8)

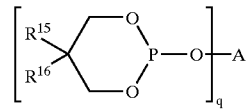

or of the formula (9)

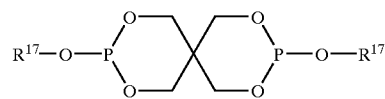

wherein q is 1 or 2, wherein, when q is 1, A is a group of the formula (10)

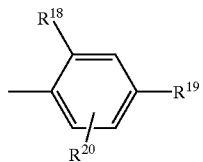

wherein $R^{18}$ and $R^{19}$ are the same or different and each is alkyl having 1 to 4 carbon atoms, and $R^{20}$ is hydrogen atom or alkyl having 1 to 4 carbon atoms, and when q is 2, A is alkylene having 2 to 18 carbon atoms, p-phenylene or p-biphenylene, $R^{15}$ and $R^{16}$ are each independently alkyl having 1 to 4 carbon atoms, and each $R^{17}$ is independently alkyl having 1 to 18 carbon atoms, phenylalkyl having 7 to 9 carbon atoms, cyclohexyl, phenyl, or a group of the formula (11)

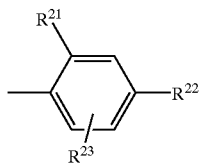

wherein $R^{21}$ and $R^{22}$ are the same or different and each is alkyl having 1 to 4 carbon atoms or phenylalkyl having 7 to 9 carbon atoms, and $R^{23}$ is hydrogen atom or alkyl having 1 to 4 carbon atoms;

(b-4) a compound of the formula (12)

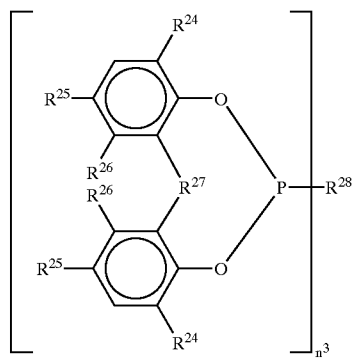

wherein each $R^{24}$ is the same or different and is alkyl having 1 to 5 carbon atoms, each $R^{25}$ is the same or different and is hydrogen atom or alkyl having 1 to 5 carbon atoms, each $R^{26}$ is the same or different and is hydrogen atom or methyl, $R^{27}$ is direct bond, methylene, —CH($R^{29}$)— wherein $R^{29}$ is alkyl having 1 to 4 carbon atoms or sulfur atom, and $n^3$ is 1 or 3, wherein when $n^3$ is 3, $R^{28}$ is a group of the formula N(CH$_2$CH$_2$O—)$_3$, and when n3 is 1, $R^{28}$ is alkyl having 1 to 18 carbon atoms, halogen atom, hydroxy or alkoxy having 1 to 8 carbon atoms; and (b-5) a compound of the formula (17)

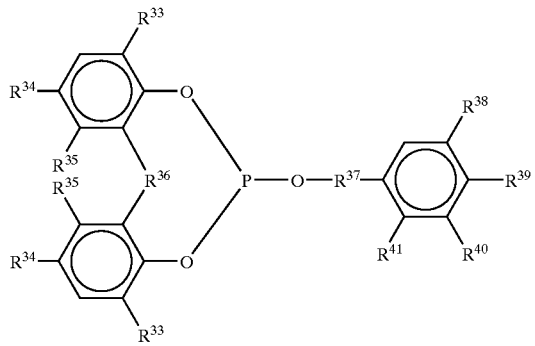

wherein
$R^{33}$ and $R^{34}$ are the same or different and each is hydrogen atom, alkyl having 1 to 8 carbon atoms, cycloalkyl having 5 to 8 carbon atoms, cycloalkyl having 5 to 8 carbon atoms substituted by alkyl having 1 to 4 carbon atoms, aralkyl having 7 to 12 carbon atoms or phenyl;

each $R^{35}$ is the same or different and is hydrogen atom or alkyl having 1 to 8 carbon atoms;

$R^{36}$ is a direct bond, methylene, —CH($R^{42}$)— wherein $R^{42}$ is alkyl having 1 to 7 carbon atoms or cycloalkyl having 5 to 8 carbon atoms, or sulfur atom;

$R^{37}$ is alkylene having 2 to 8 carbon atoms, *—$R^{43}$—O—CO—$R^{44}$— or *—CO—$R^{44}$— wherein $R^{43}$ is alkylene having 1 to 8 carbon atoms, $R^{44}$ is a direct bond or alkylene having 1 to 8 carbon atoms and * means bond on the oxygen atom side;

$R^{38}$ and $R^{40}$ are the same or different and each is hydrogen atom, alkyl having 1 to 8 carbon atoms, cycloalkyl having 5 to 8 carbon atoms, cycloalkyl having 5 to 8 carbon atoms substituted by alkyl having 1 to 4 carbon atoms, aralkyl having 7 to 12 carbon atoms or phenyl; and one of $R^{39}$ and $R^{41}$ is hydroxyl group, alkoxy having 1 to 8 carbon atoms or aralkyloxy having 7 to 12 carbon atoms and the other is hydrogen atom or alkyl having 1 to 8 carbon atoms; and the component (c) is a compound having one or more structures shown by the following formula (16)

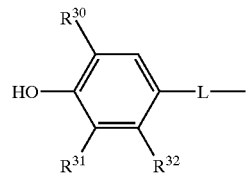

wherein $R^{30}$ is alkyl having 1 to 5 carbon atoms, $R^{31}$ is alkyl having 1 to 4 carbon atoms, $R^{32}$ is hydrogen atom or methyl, and L is

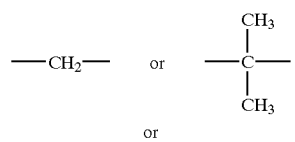

or

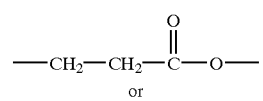

or

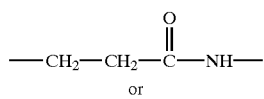

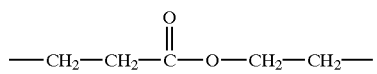

in a molecule.

2. The composition of claim 1, wherein the component (a) is contained in a proportion of 1.0 wt %–6.5 wt %, and the total amount of the component (b) and the component (c) is in a proportion of 99.0 wt %–93.5 wt %, of the total amount of the components (a), (b) and (c).

3. The composition of claim 1, wherein the component (a) is contained in a proportion of 1.0 wt %–4.5 wt %, and the total amount of the component (b) and the component (c) is in a proportion of 99.0 wt %–95.5 wt %, of the total amount of the components (a), (b) and (c).

4. The composition of any of claim 1, wherein the component (b) is at least one member from the compounds of the formula (2)

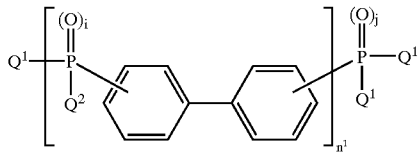

wherein $Q^1$ is a group of the formula (3)

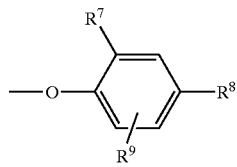

wherein $R^7$ and $R^8$ are the same or different and each is alkyl having 1 to 4 carbon atoms, and $R^9$ is hydrogen atom or methyl, $Q^2$ is, independently from other repeating units, a group of the formula (3)

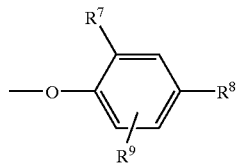

wherein each symbol is as defined above, i is, independently from other repeating units, 0 or 1, j is 0 or 1, and $n^1$ is an integer of 1 to 10, or of the formula (4)

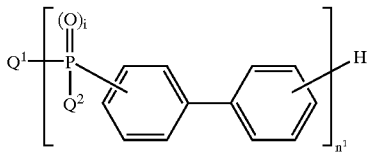

wherein each symbol is as defined above.

5. The composition of any of claim 1, wherein the component (b) is at least one member from the compounds of the formula (13)

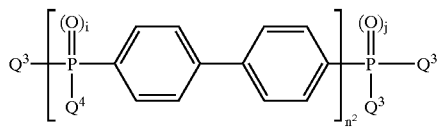

wherein $Q^3$ is a group of the formula (14)

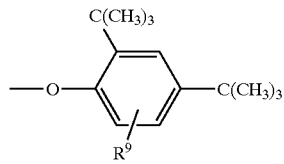

wherein $R^9$ is hydrogen atom or methyl, $Q^4$ is, independently from other repeating units, a group of the formula (14)

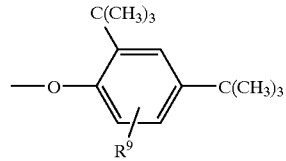

wherein $R^9$ is hydrogen atom or methyl, i is, independently from other repeating units, 0 or 1, j is 0 or 1, and $n^2$ is an integer of 1 to 3, or of the formula (15)

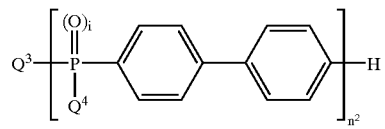

wherein each symbol is as defined above.

6. The composition of any of claim 1, wherein the component (b) is at least one member selected from the group consisting of tetrakis(2,4-di-tert-butylphenyl)-4,4'-biphenylenediphosphonite, tetrakis(2,4-di-tert-butyl-5-methylphenyl)-4,4'-biphenylenediphosphonite, (2,4-di-tert-butylphenoxy)bis{4'-(bis(2,4-di-tert-butylphenoxy)phosphino)biphenyl-4-yl}phosphine, and (2,4-di-tert-butyl-5-methylphenoxy)bis{4'-(bis(2,4-di-tert-butyl-5-methylphenoxy)phosphino)biphenyl-4-yl}phosphine.

7. The composition of any of claim 1, wherein the component (b) is at least one member from compounds of the formula (5)

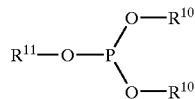

wherein each $R^{10}$ is the same or different and is alkyl having 1 to 18 carbon atoms, phenyl, phenyl substituted by alkyl having 1 to 9 carbon atoms, a group of the formula (6)

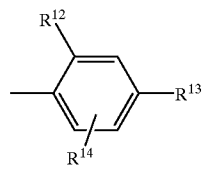

wherein $R^{12}$ and $R^{13}$ are the same or different and each is alkyl having 1 to 4 carbon atoms, and $R^{14}$ is hydrogen atom or methyl, and $R^{11}$ is alkyl having 1 to 18 carbon atoms, phenylalkyl having 7 to 9 carbon atoms, cyclohexyl, phenyl, phenyl substituted by alkyl having 1 to 9 carbon atoms, a group of the formula (6)

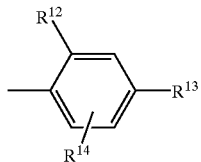

wherein $R^{12}$ and $R^{13}$ are the same or different and each is alkyl having 1 to 4 carbon atoms, and $R^{14}$ is hydrogen atom or methyl, or of the formula (7)

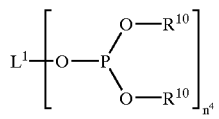

wherein $R^{10}$ is as defined above, $n^4$ is 3, and $L^1$ is 1,1,3-butanetriyl.

8. The composition of any of claim 1, wherein the component (b) is at least one member selected from the group consisting of tris(2,4-di-tert-butylphenyl) phosphite, bis(2,4-di-tert-butyl-6-methylphenyl) ethyl phosphite, triphenyl phosphite, diphenyl alkyl phosphite, phenyl dialkyl phosphite, tris(nonylphenyl) phosphite, trilauryl phosphite, trioctadecyl phosphite and bis(2,4-di-tert-butyl-6-methylphenyl) methyl phosphite.

9. The composition of any of claim 1, wherein the component (b) is at least one member from the compounds of the formula (8)

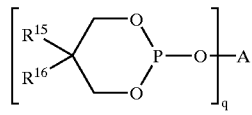

or of the formula (9)

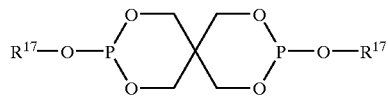

wherein q is 1 or 2, wherein, when q is 1, A is a group of the formula (10)

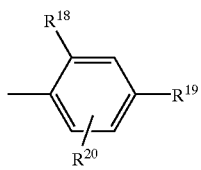

wherein $R^{18}$ and $R^{19}$ are the same or different and each is alkyl having 1 to 4 carbon atoms, and $R^{20}$ is hydrogen atom or alkyl having 1 to 4 carbon atoms, and when q is 2, A is alkylene having 2 to 18 carbon atoms, p-phenylene or p-biphenylene, $R^{15}$ and $R^{16}$ are each independently alkyl having 1 to 4 carbon atoms, and each $R^{17}$ is independently alkyl having 1 to 18 carbon atoms, phenylalkyl having 7 to 9 carbon atoms, cyclohexyl, phenyl, or a group of the formula (11)

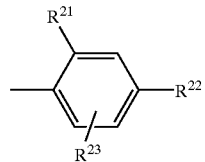

wherein $R^{21}$ and $R^{22}$ are the same or different and each is alkyl having 1 to 4 carbon atoms or phenylalkyl having 7 to 9 carbon atoms, and $R^{23}$ is hydrogen atom or alkyl having 1 to 4 carbon atoms.

10. The composition of any of claim 1, wherein the component (b) is at least one member selected from the group consisting of bis(2,4-di-tert-butylphenyl) pentaerythritol diphosphite, bis(2,6-di-tert-butyl-4-methylphenyl) pentaerythritol diphosphite, distearyl pentaerythritol diphosphite, bis(2,4-di(1-phenyl-1,1-dimethylmethyl)phenyl) pentaerythritol diphosphite, (2,4,6-tri-tert-butylphenyl)-2-butyl-2-ethyl-1,3-propanediol phosphite, bisisodecyl pentaerythritol diphosphite and bis(2,4,6-tri-tert-butylphenyl) pentaerythritol diphosphite.

11. The composition of any of claim 1, wherein the component (b) is at least one member from the compounds of the formula (12)

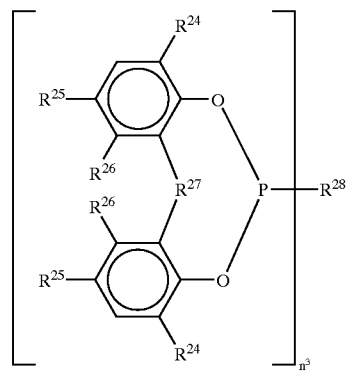

wherein each $R^{24}$ is the same or different and is alkyl having 1 to 5 carbon atoms, each $R^{25}$ is the same or different and is hydrogen atom or alkyl having 1 to 5 carbon atoms, each $R^{26}$ is the same or different and is hydrogen atom or methyl, $R^{27}$ is direct bond, methylene, —CH($R^{29}$)— ($R^{29}$ is alkyl having 1 to 4 carbon atoms) or sulfur atom, and $n^3$ is 1 or 3, wherein when $n^3$ is 3, $R^{28}$ is a group of the formula N(CH$_2$CH$_2$—)$_3$, and when $n^3$ is 1, $R^{28}$ is alkyl having 1 to 18 carbon atoms, halogen atom, hydroxy or alkoxy having 1 to 8 carbon atoms.

12. The composition of any of claim 1, wherein the component (b) is at least one member selected from the group consisting of 2,2-methylenebis(4,6-di-tert-butylphenyl)-2-ethylhexyl phosphite, 6-fluoro-2,4,8,10-tetra-tert-butyl-12-methyl-dibenzo[d,g]-1,3,2-dioxaphosphocin and 2,2',2''-nitrilo[triethyltris(3,3',5,5'-tetra-tert-butyl-1,1'-biphenyl-2,2'-diyl)phosphite].

13. The composition of any of claim 1, wherein the component (b) is at least one member from the compounds of the formula (17)

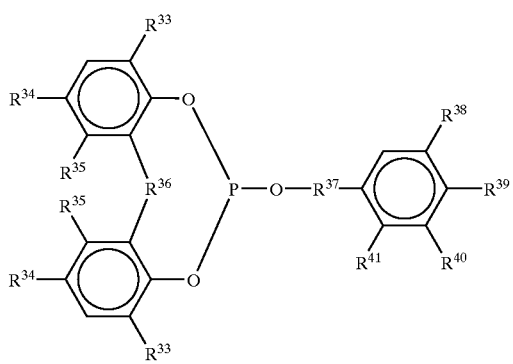

wherein

R$^{33}$ and R$^{34}$ are the same or different and each is hydrogen atom, alkyl having 1 to 8 carbon atoms, cycloalkyl having 5 to 8 carbon atoms, cycloalkyl having 5 to 8 carbon atoms substituted by alkyl having 1 to 4 carbon atoms, aralkyl having 7 to 12 carbon atoms or phenyl; each R$^{35}$ is the same or different and is hydrogen atom or alkyl having 1 to 8 carbon atoms;

R$^{36}$ is a direct bond, methylene, —CH(R$^{42}$)— wherein R$^{42}$ is alkyl having 1 to 7 carbon atoms or cycloalkyl having 5 to 8 carbon atoms, or sulfur atom;

R$^{37}$ is alkylene having 2 to 8 carbon atoms, *—R$^{43}$—O—CO—R$^{44}$— or *—CO—R$^{44}$— wherein R$^{43}$ is alkylene having 1 to 8 carbon atoms, R$^{44}$ is a direct bond or alkylene having 1 to 8 carbon atoms and * means bond on the oxygen atom side;

R$^{38}$ and R$^{40}$ are the same or different and each is hydrogen atom, alkyl having 1 to 8 carbon atoms, cycloalkyl having 5 to 8 carbon atoms, cycloalkyl having 5 to 8 carbon atoms substituted by alkyl having 1 to 4 carbon atoms, aralkyl having 7 to 12 carbon atoms or phenyl; and one of R$^{39}$ and R$^{41}$ is hydroxyl group, alkoxy having 1 to 8 carbon atoms or aralkyloxy having 7 to 12 carbon atoms and the other is hydrogen atom or alkyl having 1 to 8 carbon atoms.

14. The composition of any of claims 1, wherein the component (b) is 6-[3-(3-tert-butyl-4-hydroxy-5-methylphenyl)propoxy]-2,4,8,10-tetra-tert-butyldibenzo[d,f][1,3,2]dioxaphosphepin.

15. The composition of any of claim 1, wherein the component (c) is at least one member selected from the group consisting of tetrakis[3-(3,5-di-tert-butyl-4-hydroxyphenyl)propionyloxymethyl]methane, n-octadecyl 3-(3,5-di-tert-butyl-4-hydroxyphenyl)propionate, 1,3,5-tris(3,5-di-tert-butyl-4-hydroxybenzyl) isocyanurate and 1,3,5-trimethyl-2,4,6-tris(3,5-di-tert-butyl-4-hydroxybenzyl) benzene.

16. The composition of any of claim 1, wherein the component (c) is at least one member selected from the group consisting of tetrakis[3-(3,5-di-tert-butyl-4-hydroxyphenyl)propionyloxymethyl]methane and n-octadecyl 3-(3,5-di-tert-butyl-4-hydroxyphenyl) propionate.

17. The composition of any of claim 1, wherein the weight ratio of the component (b):component (c) is 9:1–1:9.

18. The composition of any of claim 1, further comprising a sulfuric antioxidant, or a light stabilizer, or a sulfuric antioxidant and a light stabilizer.

19. An organic polymer material composition comprising:

(a) a compound of the formula

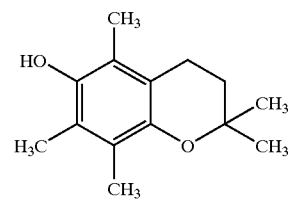

wherein R$^1$ is alkyl having 1 to 5 carbon atoms or alkenyl having 2 to 5 carbon atoms, R$^2$ is alkyl having 1 to 5 carbon atoms, R$^3$, R$^4$ and R$^5$ are the same or different and each is hydrogen atom or alkyl having 1 to 4 carbon atoms, and R$^6$ is hydrogen atom or alkyl having 1 to 5 carbon atoms;

(b) a phosphorus antioxidant;

(c) a phenolic antioxidant; and (d) an organic polymer;

wherein the component (a) is contained in a proportion of 0.0005 part by weight–0.025 part by weight per 100 parts by weight of the organic polymer material composition; wherein the component (b) is at least one member selected from the group consisting of:

(b-1) a compound of the formula (2)

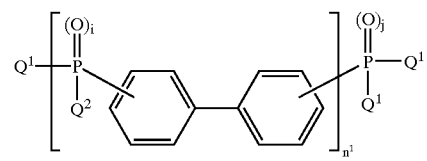

wherein Q$^1$ is a group of the formula (3)

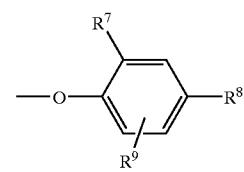

wherein R$^7$ and R$^8$ are the same or different and each is alkyl having 1 to 4 carbon atoms, and R$^9$ is hydrogen atom or methyl, Q$^2$ is, independently from other repeating units, a group of the formula (3)

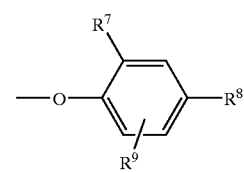

wherein each symbol is as defined above, i is, independently from other repeating units, 0 or 1, j is 0 or 1, and n$^1$ is an integer of 1 to 10, or of the formula (4)

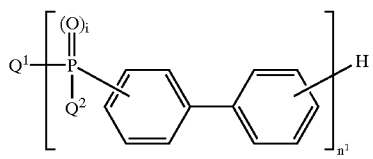

wherein each symbol is as defined above;
(b-2) a compound of the formula (5)

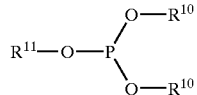

wherein each $R^{10}$ is the same or different and is alkyl having 1 to 18 carbon atoms, phenyl, phenyl substituted by alkyl having 1 to 9 carbon atoms, a group of the formula (6)

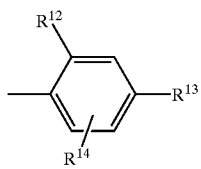

wherein $R^{12}$ and $R^{13}$ are the same or different and each is alkyl having 1 to 4 carbon atoms, and $R^{14}$ is hydrogen atom or methyl, and $R^{11}$ is alkyl having 1 to 18 carbon atoms, phenylalkyl having 7 to 9 carbon atoms, cyclohexyl, phenyl, phenyl substituted by alkyl having 1 to 9 carbon atoms, a group of the formula (6)

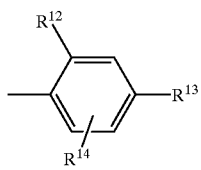

wherein $R^{12}$ and $R^{13}$ are the same or different and each is alkyl having 1 to 4 carbon atoms, and $R^{14}$ is hydrogen atom or methyl, or of the formula (7)

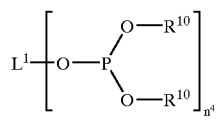

wherein $R^{10}$ is as defined above, $n^4$ is 3, and $L^1$ is 1,1,3-butanetriyl;
(b-3) a compound of the formula (8)

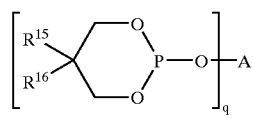

or of the formula (9)

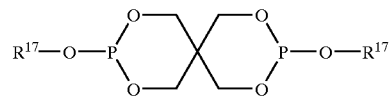

wherein q is 1 or 2, wherein, when q is 1, A is a group of the formula (10)

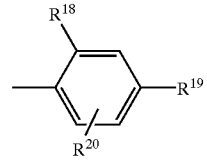

wherein $R^{18}$ and $R^{19}$ are the same or different and each is alkyl having 1 to 4 carbon atoms, and $R^{20}$ is hydrogen atom or alkyl having 1 to 4 carbon atoms, and when q is 2, A is alkylene having 2 to 18 carbon atoms, p-phenylene or p-biphenylene, $R^{15}$ and $R^{16}$ are each independently alkyl having 1 to 4 carbon atoms, and each $R^{17}$ is independently alkyl having 1 to 18 carbon atoms, phenylalkyl having 7 to 9 carbon atoms, cyclohexyl, phenyl, or a group of the formula (11)

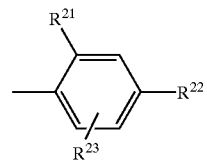

wherein $R^{21}$ and $R^{22}$ are the same or different and each is alkyl having 1 to 4 carbon atoms or phenylalkyl having 7 to 9 carbon atoms, and $R^{23}$ is hydrogen atom or alkyl having 1 to 4 carbon atoms;
(b-4) a compound of the formula (12)

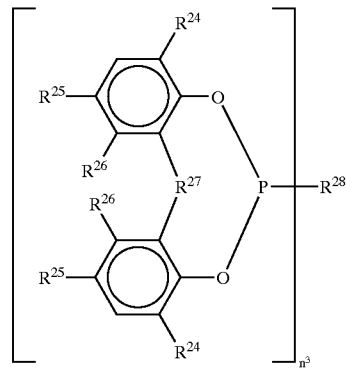

wherein each $R^{24}$ is the same or different and is alkyl having 1 to 5 carbon atoms, each $R^{25}$ is the same or different and is hydrogen atom or alkyl having 1 to 5 carbon atoms, each $R^{26}$ is the same or different and is hydrogen atom or methyl, $R^{27}$ is direct bond, methylene, —CH($R^{29}$)— wherein $R^{29}$ is alkyl having 1 to 4 carbon atoms or sulfur atom, and $n^3$ is 1 or 3, wherein when $n^3$ is 3, $R^{28}$ is a group of the formula $N(CH_2CH_2O—)_3$, and when $n^3$ is 1, $R^{28}$ is alkyl having 1 to 18 carbon atoms, halogen atom, hydroxy or alkoxy having 1 to 8 carbon atoms; and (b-5) a compound of the formula (17)

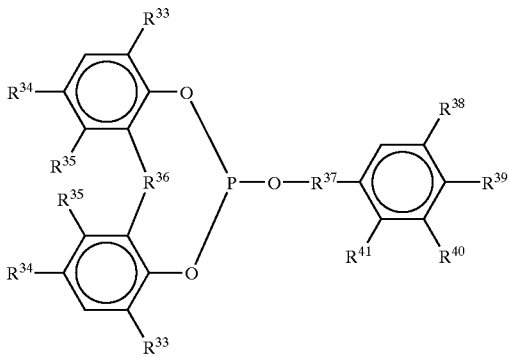

wherein $R^{33}$ and $R^{34}$ are the same or different and each is hydrogen atom, alkyl having 1 to 8 carbon atoms, cycloalkyl having 5 to 8 carbon atoms, cycloalkyl having 5 to 8 carbon atoms substituted by alkyl having 1 to 4 carbon atoms, aralkyl having 7 to 12 carbon atoms or phenyl;

each $R^{35}$ is the same or different and is hydrogen atom or alkyl having 1 to 8 carbon atoms;

$R^{36}$ is a direct bond, methylene, —CH($R^{42}$)— wherein $R^{42}$ is alkyl having 1 to 7 carbon atoms or cycloalkyl having 5 to 8 carbon atoms, or sulfur atom;

$R^{37}$ is alkylene having 2 to 8 carbon atoms, *—$R^{43}$—O—CO$R^{44}$— or *—CO—$R^{44}$— wherein $R^4$ is alkylene having 1 to 8 carbon atoms, $R^{44}$ is a direct bond or alkylene having 1 to 8 carbon atoms and * means bond on the oxygen atom side;

$R^{38}$ and $R^{40}$ are the same or different and each is hydrogen atom, alkyl having 1 to 8 carbon atoms, cycloalkyl having 5 to 8 carbon atoms, cycloalkyl having 5 to 8 carbon atoms substituted by alkyl having 1 to 4 carbon atoms, aralkyl having 7 to 12 carbon atoms or phenyl; and one of $R^{39}$ and $R^{41}$ is hydroxyl group, alkoxy having 1 to 8 carbon atoms or aralkyloxy having 7 to 12 carbon atoms and the other is hydrogen atom or alkyl having 1 to 8 carbon atoms; and the component (c) is a compound having one or more structures shown by the following formula (16)

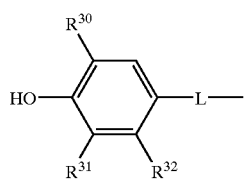

wherein $R^{30}$ is alkyl having 1 to 5 carbon atoms, $R^{31}$ is alkyl having 1 to 4 carbon atoms, $R^{32}$ is hydrogen atom or methyl, and L is

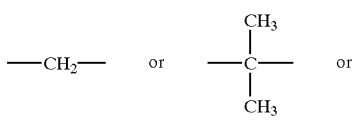

-continued

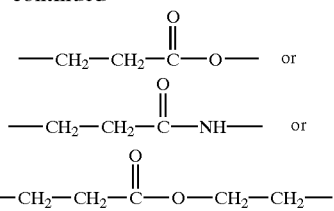

in a molecule.

20. The composition of claim 19, wherein the component (a) is contained in a proportion of 0.0005 part by weight–0.010 part by weight per 100 parts by weight of the organic polymer material composition.

21. The composition of claim 19, wherein the component (b) is at least one member from the compounds of the formula (2)

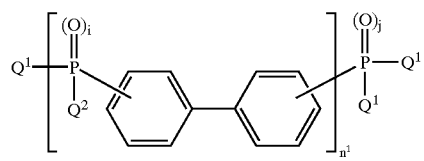

wherein $Q^1$ is a group of the formula (3)

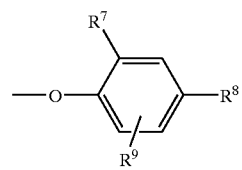

wherein $R^7$ and $R^8$ are the same or different and each is alkyl having 1 to 4 carbon atoms, and $R^9$ is hydrogen atom or methyl, $Q^2$ is, independently from other repeating units, a group of the formula (3)

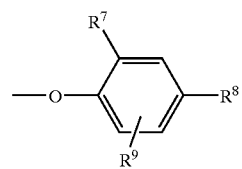

wherein each symbol is as defined above, i is, independently from other repeating units, 0 or 1, j is 0 or 1, and $n^1$ is an integer of 1 to 10, or of the formula (4)

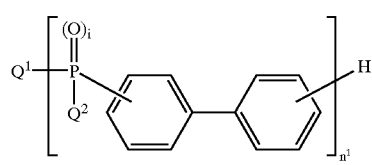

wherein each symbol is as defined above.

22. The composition of claim 19, wherein the component (b) is at least one member from the compounds of the formula (13)

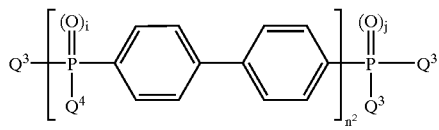

wherein $Q^3$ is a group of the formula (14)

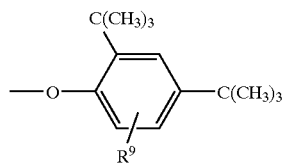

wherein $R^9$ is hydrogen atom or methyl, $Q^4$ is, independently from other repeating units, a group of the formula (14)

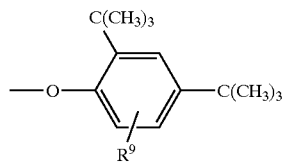

wherein $R^9$ is hydrogen atom or methyl, i is, independently from other repeating units, 0 or 1, j is 0 or 1, and $n^2$ is an integer of 1 to 3, or of the formula (15)

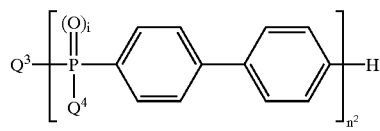

wherein each symbol is as defined above.

23. The composition of claim 19, wherein the component (b) is at least one member selected from the group consisting of tetrakis(2,4-di-tert-butylphenyl)-4,4'-biphenylenediphosphonite, tetrakis(2,4-di-tert-butyl-5-methylphenyl)-4,4'-biphenylenediphosphonite, (2,4-di-tert-butylphenoxy)bis{4'-(bis(2,4-di-tert-butylphenoxy)phosphino)biphenyl-4-yl}phosphine, and (2,4-di-tert-butyl-5-methylphenoxy)bis{4'-(bis(2,4-di-tert-butyl-5-methylphenoxy)phosphino)biphenyl-4-yl}phosphine.

24. The composition of claim 19, wherein the component (b) is at least one member from the compounds of the formula (5)

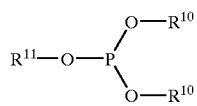

wherein each $R^{10}$ is the same or different and is alkyl having 1 to 18 carbon atoms, phenyl, phenyl substituted by alkyl having 1 to 9 carbon atoms, or a group of the formula (6)

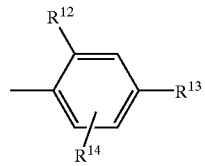

wherein $R^{12}$ and $R^{13}$ are the same or different and each is alkyl having 1 to 4 carbon atoms, and $R^{14}$ is hydrogen atom or methyl, and $R^{11}$ is alkyl having 1 to 18 carbon atoms, phenylalkyl having 7 to 9 carbon atoms, cyclohexyl, phenyl, phenyl substituted by alkyl having 1 to 9 carbon atoms, or a group of the formula (6)

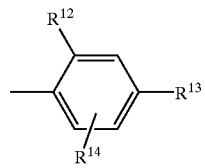

wherein $R^{12}$ and $R^{13}$ are the same or different and each is alkyl having 1 to 4 carbon atoms, and $R^{14}$ is hydrogen atom or methyl, or of the formula (7)

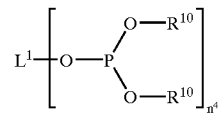

wherein $R^{10}$ is as defined above, $n^4$ is 3, and $L^1$ is 1,1,3-butanetriyl.

25. The composition of claim 19, wherein the component (b) is at least one member selected from the group consisting of tris(2,4-di-tert-butylphenyl) phosphite, bis(2,4-di-tert-butyl-6-methylphenyl) ethyl phosphite, triphenyl phosphite, diphenyl alkyl phosphite, phenyl dialkyl phosphite, tris (nonylphenyl) phosphite, trilauryl phosphite, trioctadecyl phosphite and bis(2,4-di-tert-butyl-6-methylphenyl) methyl phosphite.

26. The composition of claim 19, wherein the component (b) is at least one member from the compounds of the formula (8)

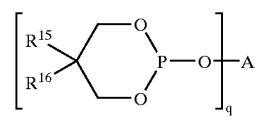

and compounds of the formula (9)

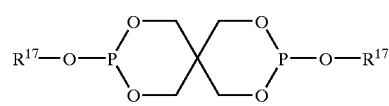

wherein q is 1 or 2, wherein, when q is 1, A is a group of the formula (10)

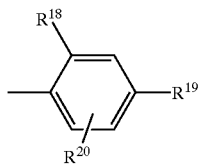

wherein $R^{18}$ and $R^{19}$ are the same or different and each is alkyl having 1 to 4 carbon atoms, and $R^{20}$ is hydrogen atom or alkyl having 1 to 4 carbon atoms, and when q is 2, A is alkylene having 2 to 18 carbon atoms, p-phenylene or p-biphenylene, $R^{15}$ and $R^{16}$ are each independently alkyl having 1 to 4 carbon atoms, and each $R^{17}$ is independently alkyl having 1 to 18 carbon atoms, phenylalkyl having 7 to 9 carbon atoms, cyclohexyl, phenyl, or a group of the formula (11)

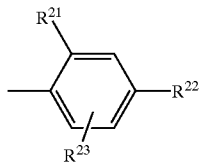

wherein $R^{21}$ and $R^{22}$ are the same or different and each is alkyl having 1 to 4 carbon atoms or phenylalkyl having 7 to 9 carbon atoms, and $R^{23}$ is hydrogen atom or alkyl having 1 to 4 carbon atoms.

27. The composition of claim 19, wherein the component (b) is at least one member selected from the group consisting of bis(2,4-di-tert-butylphenyl) pentaerythritol diphosphite, bis(2,6-di-tert-butyl-4-methylphenyl) pentaerythritol diphosphite, distearyl pentaerythritol diphosphite, bis(2,4-di(1-phenyl-1,1-dimethylmethyl)phenyl) pentaerythritol diphosphite, (2,4,6-tri-tert-butylphenyl)-2-butyl-2-ethyl-1,3-propanediol phosphite, bisisodecyl pentaerythritol diphosphite and bis(2,4,6-tri-tert-butylphenyl) pentaerythritol diphosphite.

28. The composition of claim 19, wherein the component (b) is at least one member from the compounds of the formula (12)

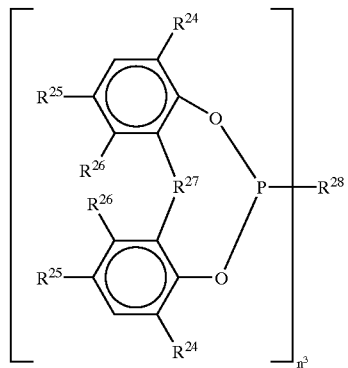

wherein each $R^{24}$ is the same or different and is alkyl having 1 to 5 carbon atoms, each $R^{25}$ is the same or different and is hydrogen atom or alkyl having 1 to 5 carbon atoms, each $R^{26}$ is the same or different and is hydrogen atom or methyl, $R^{27}$ is direct bond, methylene, —CH($R^{29}$)— ($R^{29}$ is alkyl having 1 to 4 carbon atoms) or sulfur atom, and $n^3$ is 1 or 3, wherein when $n^3$ is 3, $R^{28}$ is a group of the formula N(CH$_2$CH$_2$O—)$_3$, and when n3 is 1, $R^{28}$ is alkyl having 1 to 18 carbon atoms, halogen atom, hydroxy or alkoxy having 1 to 8 carbon atoms.

29. The composition of claim 19, wherein the component (b) is at least one member selected from the group consisting of 2,2-methylenebis(4,6-di-tert-butylphenyl)-2-ethylhexyl phosphite, 6-fluoro-2,4,8,10-tetra-tert-butyl-12-methyl-dibenzo[d,g]-1,3,2-dioxaphosphocin and 2,2',2''-nitrilo[triethyltris(3,3',5,5'-tetra-tert-butyl-1,1'-biphenyl-2,2'-diyl) phosphite].

30. The composition of claim 19, wherein the component (b) is at least one member from the compounds of the formula (17)

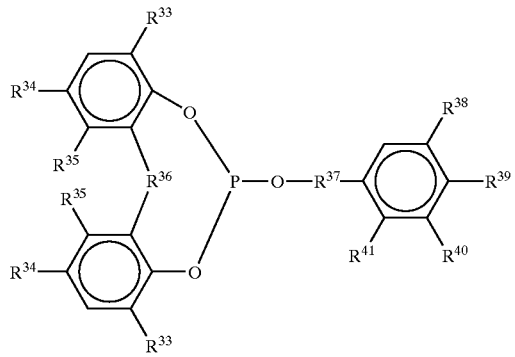

wherein
$R^{33}$ and $R^{34}$ are the same or different and each is hydrogen atom, alkyl having 1 to 8 carbon atoms, cycloalkyl having 5 to 8 carbon atoms, cycloalkyl having 5 to 8 carbon atoms substituted by alkyl having 1 to 4 carbon atoms, aralkyl having 7 to 12 carbon atoms or phenyl;
each $R^{35}$ is the same or different and is hydrogen atom or alkyl having 1 to 8 carbon atoms;
$R^{36}$ is a direct bond, methylene, —CH($R^{42}$)— wherein $R^{42}$ is alkyl having 1 to 7 carbon atoms or cycloalkyl having 5 to 8 carbon atoms, or sulfur atom;
$R^{37}$ is Alkylene having 2 to 8 carbon atoms, *—$R^{43}$—O—CO—$R^{44}$— or *—CO—$R^{44}$— wherein $R^{43}$ is alkylene having 1 to 8 carbon atoms, $R^{44}$ is a direct bond or alkylene having 1 to 8 carbon atoms and * means bond on the oxygen atom side;
$R^{38}$ and $R^{40}$ are the same or different and each is hydrogen atom, alkyl having 1 to 8 carbon atoms, cycloalkyl having 5 to 8 carbon atoms, cycloalkyl having 5 to 8 carbon atoms substituted by alkyl having 1 to 4 carbon atoms, aralkyl having 7 to 12 carbon atoms or phenyl; and one of $R^{39}$ and $R^{41}$ is hydroxyl group, alkoxy having 1 to 8 carbon atoms or aralkyloxy having 7 to 12 carbon atoms and the other is hydrogen atom or alkyl having 1 to 8 carbon atoms.

31. The composition of claim 19, wherein the component (b) is 6-[3-(3-tert-butyl-4-hydroxy-5-methylphenyl) propoxy]-2,4,8,10-tetra-tert-butyldibenzo[d,f][1,3,2] dioxaphosphepin.

32. The composition of claim 19, wherein the component (c) is at least one member selected from the group consisting of tetrakis[3-(3,5-di-tert-butyl-4-hydroxyphenyl) propionyloxymethyl]methane, n-octadecyl 3-(3,5-di-tert-butyl-4-hydroxyphenyl)propionate, 1,3,5-tris(3,5-di-tert-butyl-4-hydroxybenzyl) isocyanurate and 1,3,5-trimethyl-2,4,6-tris(3,5-di-tert-butyl-4-hydroxybenzyl)benzene.

33. The composition of claim 19, wherein the component (c) is at least one member selected from the group consisting of tetrakis[3-(3,5-di-tert-butyl-4-hydroxyphenyl)

propionyloxymethyl]methane and n-octadecyl 3-(3,5-di-tert-butyl-4-hydroxyphenyl)propionate.

34. The composition of claim 19, wherein the weight ratio of component (b):component (c) is 9:1–1:9.

35. The composition of claim 19, wherein the organic polymer is a synthetic resin.

36. The composition of claim 19, wherein the organic polymer is a polyolefin resin.

37. The composition of claim 19, wherein the organic polymer is a polyethylene resin, a polypropylene resin, a mixture or a compatible polymer of a polyethylene resin and a polypropylene resin, a compatible polymer containing a polyethylene resin and/or a polypropylene resin, an ethylene-vinyl acetate copolymer or an ethylene-propylene copolymer.

38. The composition of claim 19, further comprising a sulfur antioxidant, or a light stabilizer, or a sulfur antioxidant and a light stabilizer.

39. An organic polymer material composition comprising an organic polymer and the stabilizer composition of any of claim 1.

40. An organic polymer material composition comprising a synthetic resin and the composition of claim 17.

41. An organic polymer material composition comprising a polyolefin resin and the composition of claim 17.

42. The composition of claim 41, wherein the component (c) is at least one member selected from the group consisting of tetrakis[3-(3,5-di-tert-butyl-4-hydroxyphenyl)propionyloxymethyl]methane and n-octadecyl 3-(3,5-di-tert-butyl-4-hydroxyphenyl)propionate.

43. The composition of claim 42, wherein the component (b) is at least one member selected from the group consisting of tetrakis(2,4-di-tert-butylphenyl)-4,4'-biphenylenediphosphonite and tetrakis(2,4-di-tert-butyl-5-methylphenyl)-4,4'-biphenylenediphosphonite.

44. The composition of claim 42, wherein the component (b) is tetrakis(2,4-di-tert-butylphenyl)-4,4'-biphenylenediphosphonite.

45. The composition of claim 42, wherein the component (b) is tetrakis(2,4-di-tert-butyl-5-methylphenyl)-4,4'-biphenylenediphosphonite.

* * * * *